US011109059B2

(12) United States Patent
Liu et al.

(10) Patent No.: US 11,109,059 B2
(45) Date of Patent: Aug. 31, 2021

(54) CLIPPING OF UPDATED MV OR DERIVED MV

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/098,962

(22) Filed: Nov. 16, 2020

(65) Prior Publication Data

US 2021/0067783 A1 Mar. 4, 2021

Related U.S. Application Data

(63) Continuation of application No. PCT/IB2019/056641, filed on Aug. 5, 2019.

(30) Foreign Application Priority Data

Aug. 4, 2018 (WO) ................ PCT/CN2018/098691
Oct. 6, 2018 (WO) ................ PCT/CN2018/109250

(51) Int. Cl.
*H04N 19/52* (2014.01)
*H04N 19/176* (2014.01)
(Continued)

(52) U.S. Cl.
CPC ........... *H04N 19/52* (2014.11); *H04N 19/105* (2014.11); *H04N 19/132* (2014.11);
(Continued)

(58) Field of Classification Search
CPC .. H04N 19/137; H04N 19/105; H04N 19/132; H04N 19/176
See application file for complete search history.

(56) References Cited

U.S. PATENT DOCUMENTS

2015/0189313 A1  7/2015 Shimada et al.
2015/0195562 A1  7/2015 Li et al.
(Continued)

FOREIGN PATENT DOCUMENTS

CN      1325220 A    12/2001
CN    101340578 A     1/2009
(Continued)

OTHER PUBLICATIONS

Akula et al. "Description of SDR, HDR and 360° Video Coding Technology Proposal Considering Mobile Application Scenario by Samsung, Huawei, GoPro, and HiSilicon" Joint Video Exploration Team (JVET) of ITU-T SG 16 WP 3 and ISO/IEC JTC 1/SC 29/WG 11, 10th Meeting, document JVET-J0024, 2018.
(Continued)

*Primary Examiner* — Hesham K Abouzahra
(74) *Attorney, Agent, or Firm* — Perkins Coie LLP

(57) ABSTRACT

Devices, systems and methods for digital video coding, which includes motion prediction based on updated motion vectors generated using two-step inter-prediction, are described. Methods for clipping of updated MV or derived MV are described. An exemplary method for video coding includes: determining original motion information for a current block; updating original motion vectors of the original motion information for the current block based on a refining method; clipping the updated motion vectors to be within a range; and performing a conversion between the
(Continued)

current block and a bitstream representation of a video including the current block, based on the clipped updated motion vectors.

18 Claims, 42 Drawing Sheets

(51) Int. Cl.
    *H04N 19/184* (2014.01)
    *H04N 19/70* (2014.01)
    *H04N 19/105* (2014.01)
    *H04N 19/132* (2014.01)
    *H04N 19/137* (2014.01)
    *H04N 19/56* (2014.01)
    *H04N 19/96* (2014.01)

(52) U.S. Cl.
    CPC ......... *H04N 19/137* (2014.11); *H04N 19/176* (2014.11); *H04N 19/184* (2014.11); *H04N 19/56* (2014.11); *H04N 19/70* (2014.11); *H04N 19/96* (2014.11)

(56) References Cited

U.S. PATENT DOCUMENTS

| | | | |
|---|---|---|---|
| 2017/0150165 | A1 | 5/2017 | Na et al. |
| 2018/0098087 | A1 | 4/2018 | Li et al. |
| 2018/0192071 | A1* | 7/2018 | Chuang ................ H04N 19/517 |
| 2018/0199057 | A1 | 7/2018 | Chuang et al. |
| 2019/0045215 | A1* | 2/2019 | Chen ................... H04N 19/577 |
| 2019/0058896 | A1 | 2/2019 | Huang et al. |
| 2020/0128258 | A1* | 4/2020 | Chen ................... H04N 19/533 |
| 2020/0221117 | A1 | 7/2020 | Liu et al. |

FOREIGN PATENT DOCUMENTS

| | | |
|---|---|---|
| CN | 103907346 A | 7/2014 |
| CN | 104221379 A | 12/2014 |
| CN | 104838656 A | 8/2015 |
| CN | 105900420 A | 8/2016 |
| CN | 106303543 A | 1/2017 |
| CN | 107396102 A | 11/2017 |
| CN | 107592972 A | 1/2018 |
| CN | 107710761 A | 2/2018 |
| CN | 107801041 A | 3/2018 |
| CN | 108293131 A | 7/2018 |
| WO | 2018113658 A1 | 6/2017 |
| WO | 2017133661 A1 | 8/2017 |
| WO | 2017134957 A1 | 8/2017 |
| WO | 2017147765 A1 | 9/2017 |
| WO | 2018121506 A1 | 7/2018 |

OTHER PUBLICATIONS

An et al. "Progressive MV Resolution" Joint Collaborative Team on Video Coding (JCT-VC) of ITU-T SG16 WP3 and ISO/IEC JTC1/SC29/WG11, 6th Meeting: Torino, IT, Jul. 14-22, 2011, document JCTVC-F125, 2011.
Bross et al. "Versatile Video Coding (Draft 2)," Joint Video Experts Team (JVET) ITU-T SG 16 WP 3 and ISO/IEC JTC 1/SC 29/WG 11, 11th Meeting, Ljubljana, SI, 10-18, Jul. 2018, document JVET-K1001, 2018.
Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.
Bross et al. "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M1001, 2019.
Chen et al. "Algorithm Description of Joint Exploration Test Model 5 (JEM 5)" Joint Video Exploration Team (JVET) of ITU-T SG 16 WP 3 and ISO/IEC JTC 1/SC 29/WG 11, 5th Meeting, Geneva, CH, Jan. 12-20, 2017, document JVET-E1001, 2017.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting; Torino, IT, Jul. 13-21, 2017, Document JVET-G1001, 2017.
Chen et al. "Description of SDR, HDR and 360° video coding technology proposal by Huawei, GoPro, HiSilicon, and Samsung" Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0025, 2018.
Chen et al. Algorithm Description for Versatile Video Coding and Test Model 2 (VTM 2), Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1002, 2018.
Chen et al. "Algorithm Description for Versatile Video Coding and Test Model 3 (VTM 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1002, 2018.
Chen et al. "Algorithm Description for Versatile Video Coding and Test Model 4 (VTM 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1002, 2019.
Chen et al. "Description of Core Experiment 2 (CE2): Sub-Block Based Motion Prediction," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1022, 2019.
Chuang et al. "EE2-related: A Simplified Gradient Filter for Bi-Directional Optical Flow (BIO)," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-G0083, 2017.
H.265/HEVC, https://www.itu.int/rec/T-REC-H.265 (website) (Accessed on May 19, 2020).
ITU-T H.265 "High efficiency video coding" Series H: Audiovisual and Multimedia Systems Infrastructure of audiovisual services—Coding of moving video,Telecommunication Standardization Sector of ITU, (Feb. 2018).
Esenlik et al. "Description of Core Experiment 9 (CE9): Decoder Side Motion Vector Derivation," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J1029, 2018.
He et al. "CE4-Related: Adaptive Precision for Affine MVD Coding," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0259, 2018.
Kang et al. "Description of SDR Video Coding Technology Proposal by ETRI and Sejong University," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J0013, 2018.
JEM—7.0:—https://jvet.hhi.fraunhofer.de/svn/svn_HMJEMSoftware/tags/ HM-16.6-38JEM-7.0 (website) (Accessed on Apr. 21, 2020).
Lai et al. "CE4.3.4: Removal of AMVR Flag Constraint" Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0247, 2018.
Liu et al. "CE4-related: Adaptive Motion Vector Resolution for Affine Inter Mode" Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0332, 2018.
Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.
Rosewarne et al. "High Efficiency Video Coding (HEVC) Test Model 16 (HM 16) Improved Encoder Description Update 7," Joint

(56) References Cited

OTHER PUBLICATIONS

Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

Sullivan et al. "Overview of the High Efficiency Video Coding (HEVC) Standard" IEEE Transactions on Circuits and Systems for Video Technology, vol. 22, No. 12, (2012), pp. 1649-1668.

Xiu et al "CE9-Related: Addressing the Decoding Latency Issue for Decoder-Side Motion Vector Refinement (DMVR)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0347, 2018.

Yang et al. "Description of Core Experiment 4 (CE4): Inter Prediction and Motion Vector Coding" Joint Video Experts Team (JVET) of ITU-T SG 16 WP 3 and ISO/IEC JTC 1/SC 29/WG 11, 10th Meeting, San Diego, US, Apr. 10-20, 2018, document JVET-J1024, 2018.

Zhang et al. "Adaptive Motion Vector Resolution Rounding Align" Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0377, 2018.

International Search Report and Written Opinion from PCT/IB2019/056640 dated Jan. 2, 2020 (20 pages).

International Search Report and Written Opinion from PCT/IB2019/056641 dated Jan. 2, 2020 (21 pages).

International Search Report and Written Opinion from PCT/IB2019/056642 dated Jan. 28, 2020 (17 pages).

International Search Report and Written Opinion from PCT/IB2019/056644 dated Feb. 26, 2020 (23 pages).

International Search Report and Written Opinion from PCT/IB2019/056645 dated Nov. 15, 2019 (16 pages).

International Search Report and Written Opinion from PCT/IB2019/057520 dated Jan. 7, 2020, (16 pages).

International Search Report and Written Opinion from PCT/IB2019/058278 dated Feb. 25, 2020, (23 pages).

Non-Final Office Action from U.S. Appl. No. 16/820,542 dated Apr. 30, 2020.

\* cited by examiner

CLIPPING OF UPDATED MV OR DERIVED MV

CROSS-REFERENCE TO RELATED APPLICATION

This application is a continuation of International Application No. PCT/IB2019/056641, filed on Aug. 5, 2019, which claims the priority to and benefits of International Patent Application No. PCT/CN2018/098691, filed on Aug. 4, 2018 and International Patent Application No. PCT/CN2018/109250, filed on Oct. 6, 2018. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, motion refinement based on updated motion vectors that are generated based on two-step inter-prediction are described. The described methods may be applied to both the existing video coding standards (e.g., High Efficiency Video Coding (HEVC)) and future video coding standards or video codecs.

In one representative aspect, a video processing method is provided, comprising: determining original motion information for a current block; scaling original motion vectors of the original motion information and derived motion vectors derived based on the original motion vectors to a same target precision; generating updated motion vectors from the scaled original and derived motion vectors; and performing a conversion between the current block and the bitstream representation of a video including the current block, based on the updated motion vectors.

In another representative aspect, a video processing method is provided, comprising: determining original motion information for a current block; updating original motion vectors of the original motion information for the current block based on a refining method; clipping the updated motion vectors to be within a range; and performing a conversion between the current block and a bitstream representation of a video including the current block, based on the clipped updated motion vectors.

In yet another representative aspect, the disclosed technology may be used to provide a method for video processing, comprising: determining original motion information associated with a current block; generating updated motion information based on specific prediction mode; and performing, based on the updated motion information, a conversion between the current block and a bitstream representation of a video data including the current block, wherein the specific prediction mode includes one or more of bi-directional optical flow (BIO) refinement, a decoder-side motion vector refinement (DMVR), frame-rate up conversion (FRUC) techniques or a template matching technique.

In yet another representative aspect, a video processing method is provided, comprising: determining a motion vector difference (MVD) precision for a current block processed with affine mode from an MVD precision set; performing, based on the determined MVD precision, a conversion between the current block and a bitstream representation of a video including the current block.

In yet another representative aspect, a video processing method is provided, comprising: determining non-updated motion information associated with a current block; updating the non-updated motion information based on multiple decoder-side motion vector derivation (DMVD) methods to generate updated motion information for the current block; and performing, based on the updated motion information, a conversion between the current block and a bitstream representation of a video including the current block.

In yet another representative aspect, the disclosed technology may be used to provide a method for video coding. This method includes receiving a bitstream representation of a current block of video data, generating updated first and second reference motion vectors based on a weighted sum of a first scaled motion vector and first and second scaled reference motion vectors, respectively, where a first motion vector is derived based on a first reference motion vector from a first reference block and a second reference motion vector from a second reference block, where the current block is associated with the first and second reference blocks with the first scaled motion vector being generated by scaling the first motion vector to a target precision, and the first and second scaled reference motion vectors being generated by scaling the first and second reference motion vectors to the target precision, respectively, and processing the bitstream representation based on the updated first and second reference motion vectors to generate the current block.

In yet another representative aspect, the disclosed technology may be used to provide a method for video coding. This method includes generating, for a current block, an intermediate prediction based on a first motion information associated with the current block, updating the first motion information to a second motion information, and generating a final prediction for the current block based on the intermediate prediction or the second motion information.

In yet another representative aspect, the disclosed technology may be used to provide a method for video coding. This method includes receiving a bitstream representation of a current block of video data, generating intermediate motion information based on motion information associated with the current block, generating updated first and second reference motion vectors based on first and second reference motion vectors, respectively, where the current block is associated with first and second reference blocks, and where the first and second reference motion vectors are associated with the first and second reference blocks, respectively, and processing the bitstream representation based on the intermediate motion information or the updated first and second reference motion vectors to generate the current block.

In yet another representative aspect, the disclosed technology may be used to provide a method for video coding. This method includes generating, for a current block, an intermediate prediction based on a first motion information associated with the current block, updating the first motion information to a second motion information, and generating a final prediction for the current block based on the intermediate prediction or the second motion information.

In yet another representative aspect, the disclosed technology may be used to provide a method for video coding. This method includes receiving a bitstream representation of a current block of video data, generating intermediate motion information based on motion information associated with the current block, generating updated first and second reference motion vectors based on first and second reference motion vectors, respectively, where the current block is associated with first and second reference blocks, and where the first and second reference motion vectors are associated with the first and second reference blocks, respectively, and processing the bitstream representation based on the intermediate motion information or the updated first and second reference motion vectors to generate the current block.

In yet another representative aspect, the disclosed technology may be used to provide a method for video coding. This method includes generating, for a current block, an intermediate prediction based on a first motion information associated with the current block, updating the first motion information to a second motion information, and generating a final prediction for the current block based on the intermediate prediction or the second motion information.

In yet another representative aspect, the disclosed technology may be used to provide a method for video coding. This method includes receiving a bitstream representation of a current block of video data, generating intermediate motion information based on motion information associated with the current block, generating updated first and second reference motion vectors based on first and second reference motion vectors, respectively, where the current block is associated with first and second reference blocks, and where the first and second reference motion vectors are associated with the first and second reference blocks, respectively, and processing the bitstream representation based on the intermediate motion information or the updated first and second reference motion vectors to generate the current block.

In yet another representative aspect, the disclosed technology may be used to provide a method for video coding. This method includes generating, for a bitstream representation of a current block, an updated reference block by modifying a reference block associated with the current block, calculating, based on the updated reference block, a temporal gradient for a bi-directional optical flow (BIO) motion refinement, and performing, based on the temporal gradient, a conversion, which includes the BIO motion refinement, between the bitstream representation and the current block.

In yet another representative aspect, the disclosed technology may be used to provide a method for video coding. This method includes generating, for a bitstream representation of a current block, a temporal gradient for a bi-directional optical flow (BIO) motion refinement, generating an updated temporal gradient by subtracting a difference of a first mean value and a second mean value from the temporal gradient, where the first mean value is a mean value for a first reference block, the second mean value is a mean value for a second reference block, and the first and second reference blocks are associated with the current block, and performing, based on the updated temporal gradient, a conversion, which includes the BIO motion refinement, between the bitstream representation and the current block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Figure 1:
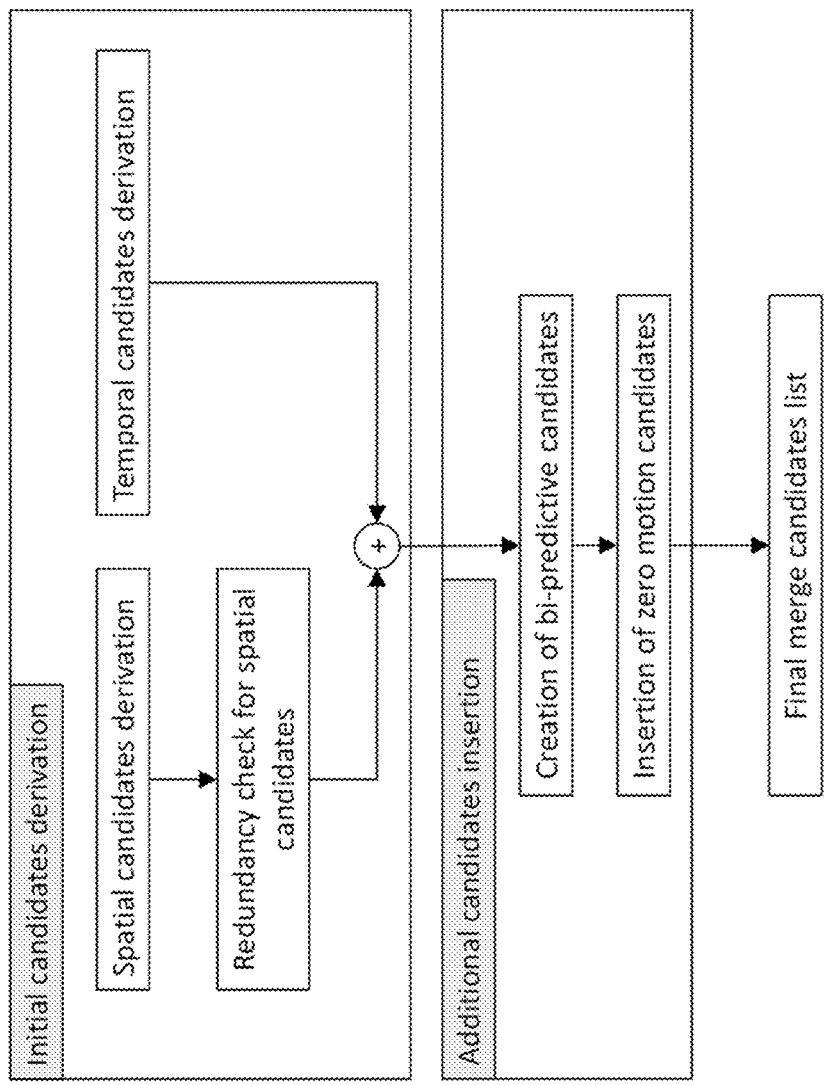
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Examples of Inter-Prediction in HEVC/H.265

Video coding standards have significantly improved over the years, and now provide, in part, high coding efficiency and support for higher resolutions. Recent standards such as HEVC and H.265 are Based on the Hybrid Video Coding Structure Wherein Temporal Prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
  Step 1.1: Spatial candidates derivation
  Step 1.2: Redundancy check for spatial candidates
  Step 1.3: Temporal candidates derivation
Step 2: Additional candidates insertion
  Step 2.1: Creation of bi-predictive candidates
  Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
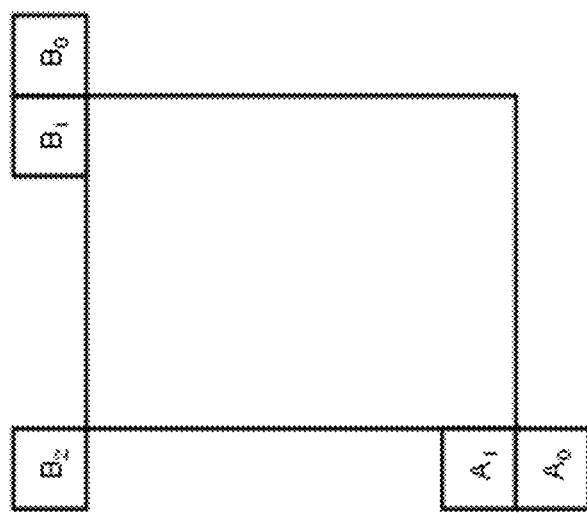
FIG. 2 shows an example of positions of spatial candidates.

In the derivation of spatial merge candidates, a maximum of four merge candidates are selected among candidates located in the positions depicted in FIG. 2. The order of derivation is $A_1, B_1, B_0, A_0$ and $B_2$. Position $B_2$ is considered only when any PU of position $A_1, B_1, B_0, A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
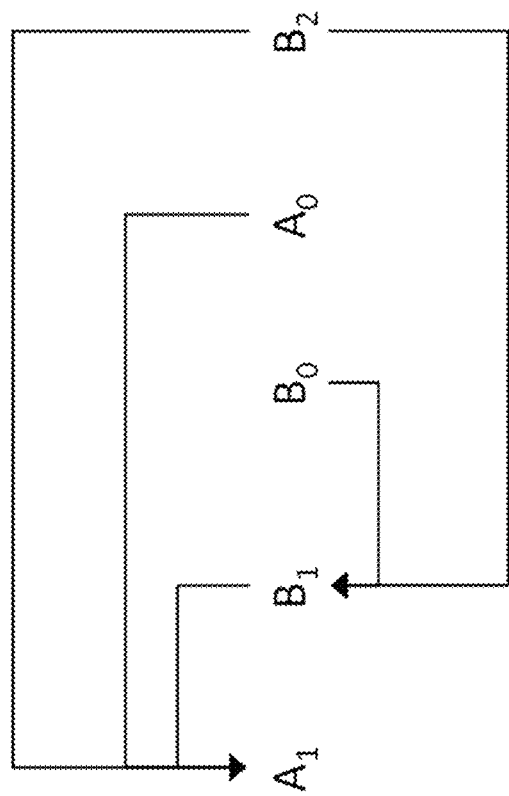
FIG. 3 shows an example of candidate pairs subject to a redundancy check of spatial merge candidates.
Figure 4B:
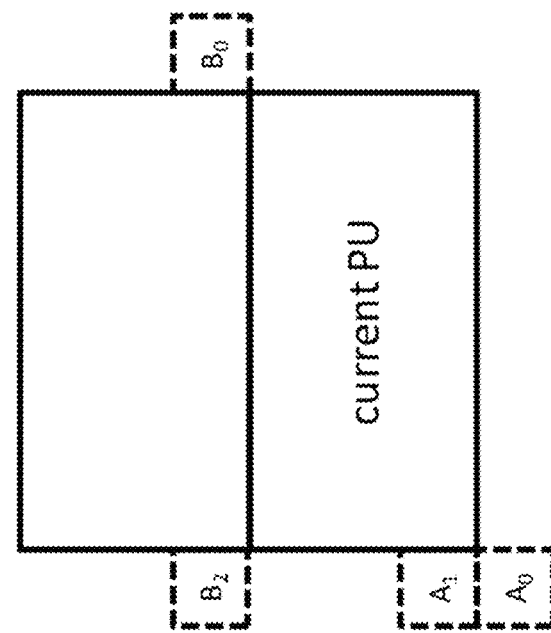
FIGS. 4A and 4B show examples of the position of a second prediction unit (PU) based on the size and shape of the current block.
Figure 4A:
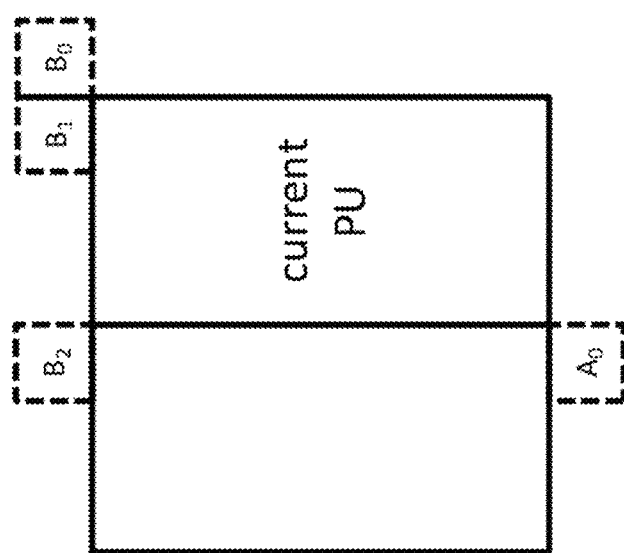

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
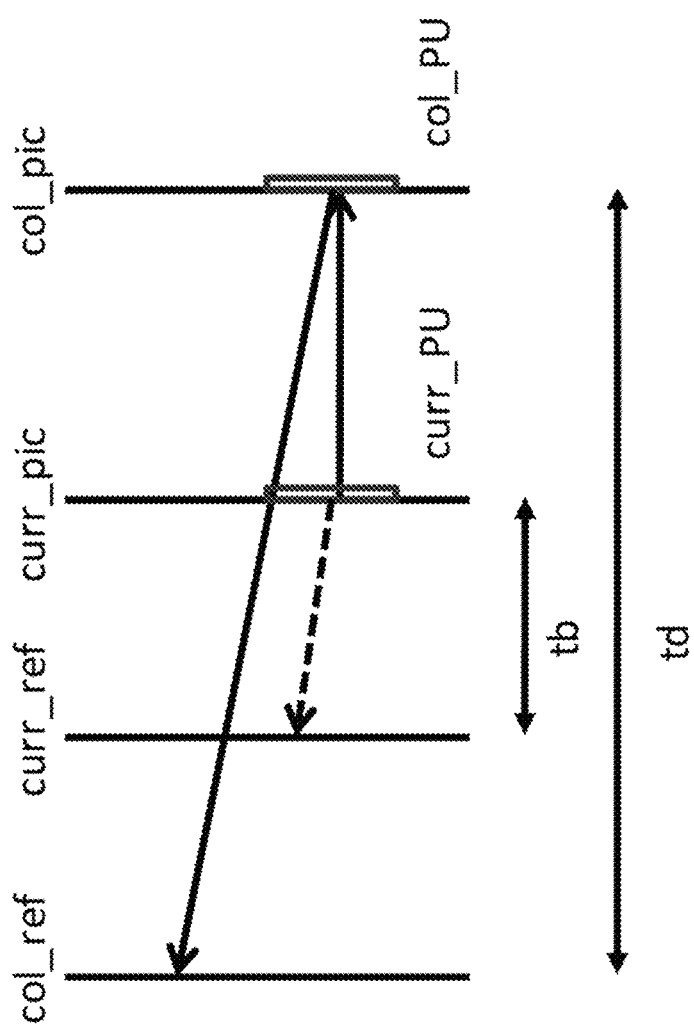
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
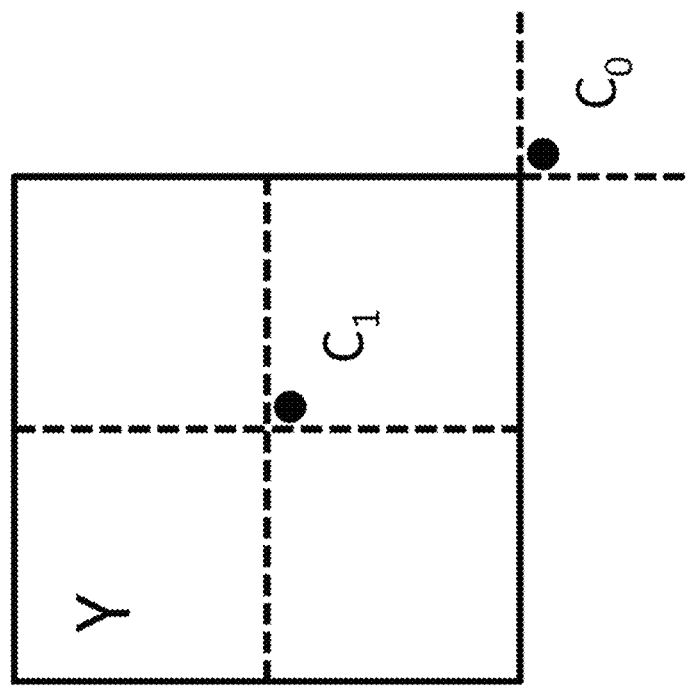
FIG. 6 shows an example of candidate positions for temporal merge candidates.

In the co-located PU(Y) belonging to the reference frame, the position for the temporal candidate is selected between candidates $C_0$ and $C_1$, as depicted in FIG. 6. If PU at position $C_0$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
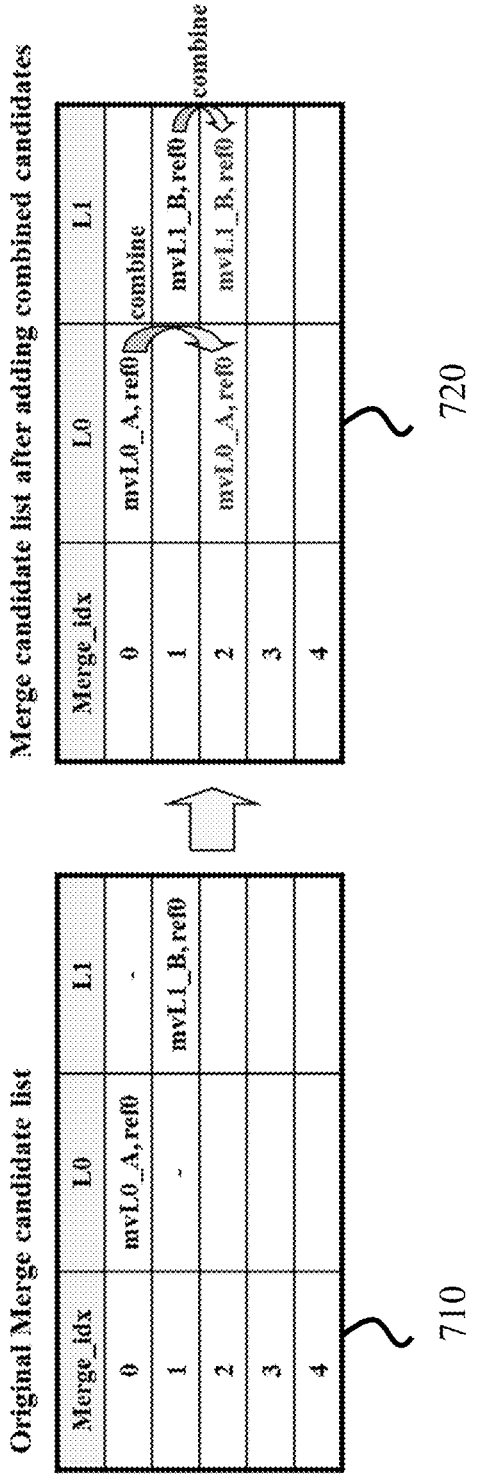
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log 2_parallel_merge_level_minus2" syntax element. When a MER is defined, merge candidates falling in the same region are marked as unavailable and therefore not considered in the list construction.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Constructing Motion Vector Prediction Candidates

Figure 8:
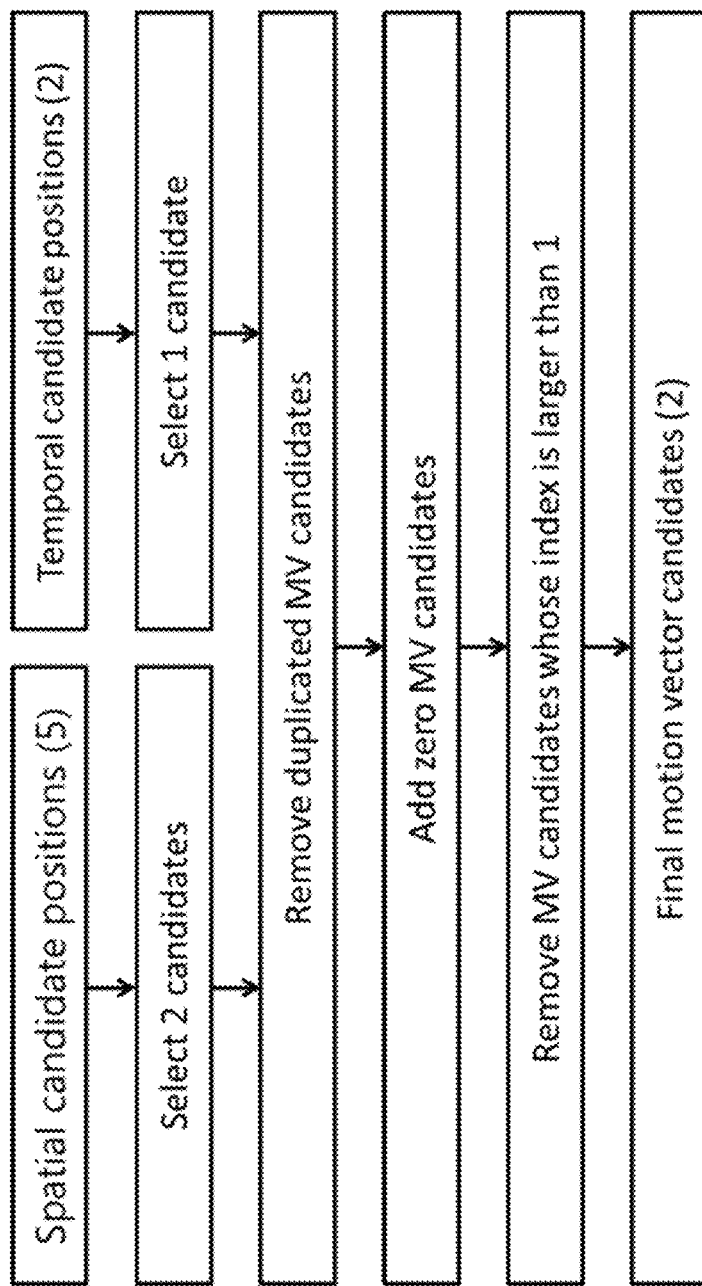
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No Spatial Scaling
  (1) Same reference picture list, and same reference picture index (same POC)
  (2) Different reference picture list, but same reference picture (same POC)
Spatial Scaling
  (3) Same reference picture list, but different reference picture (different POC)
  (4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
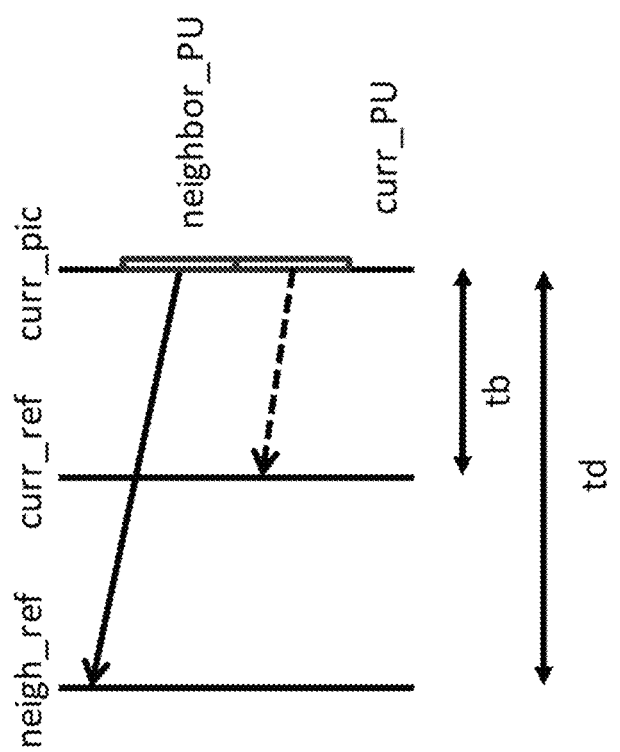
FIG. 9 shows an example of motion vector scaling for spatial motion vector candidates.

As shown in the example in FIG. 9, for the spatial scaling case, the motion vector of the neighbouring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
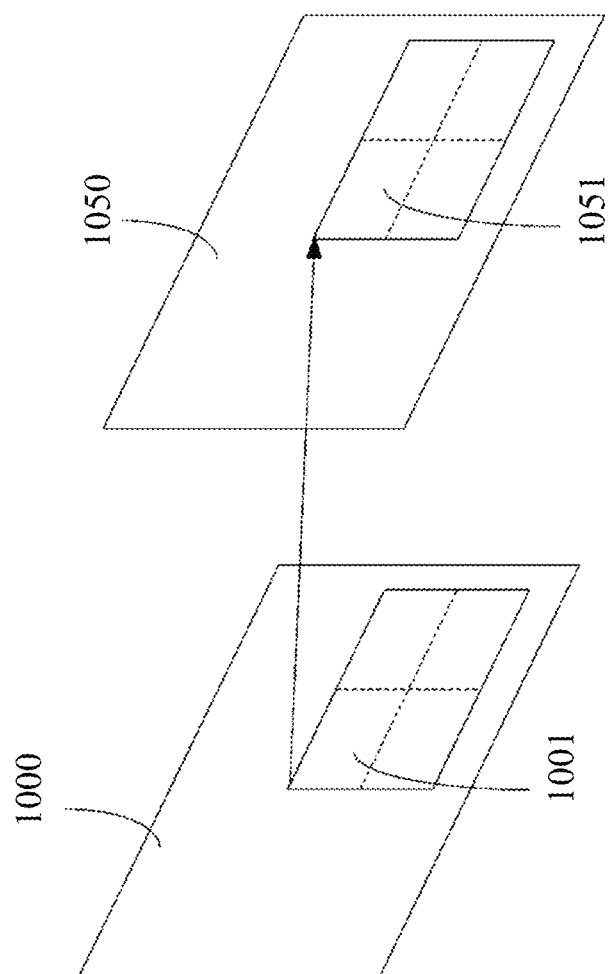
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply.

For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

2.1.2 Examples of Spatial-Temporal Motion Vector Prediction (STMVP)

Figure 11:
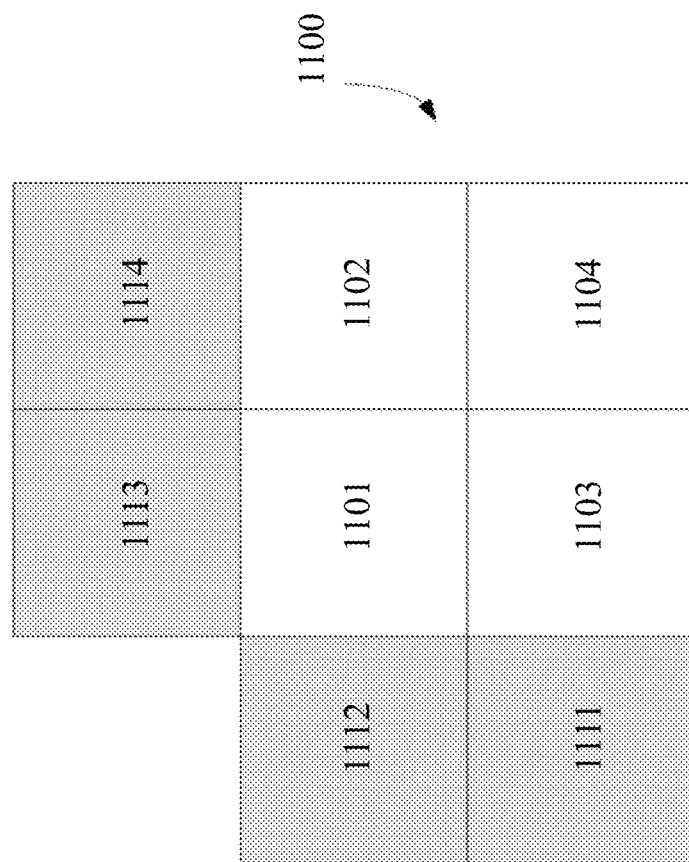
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbor s. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.3 Examples of Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.4 Examples of Overlapped Block Motion Compensation (OBMC)

In the JEM, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, an MC block corresponds to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as shown in FIGS. 12A and 12B.

Figure 12A:
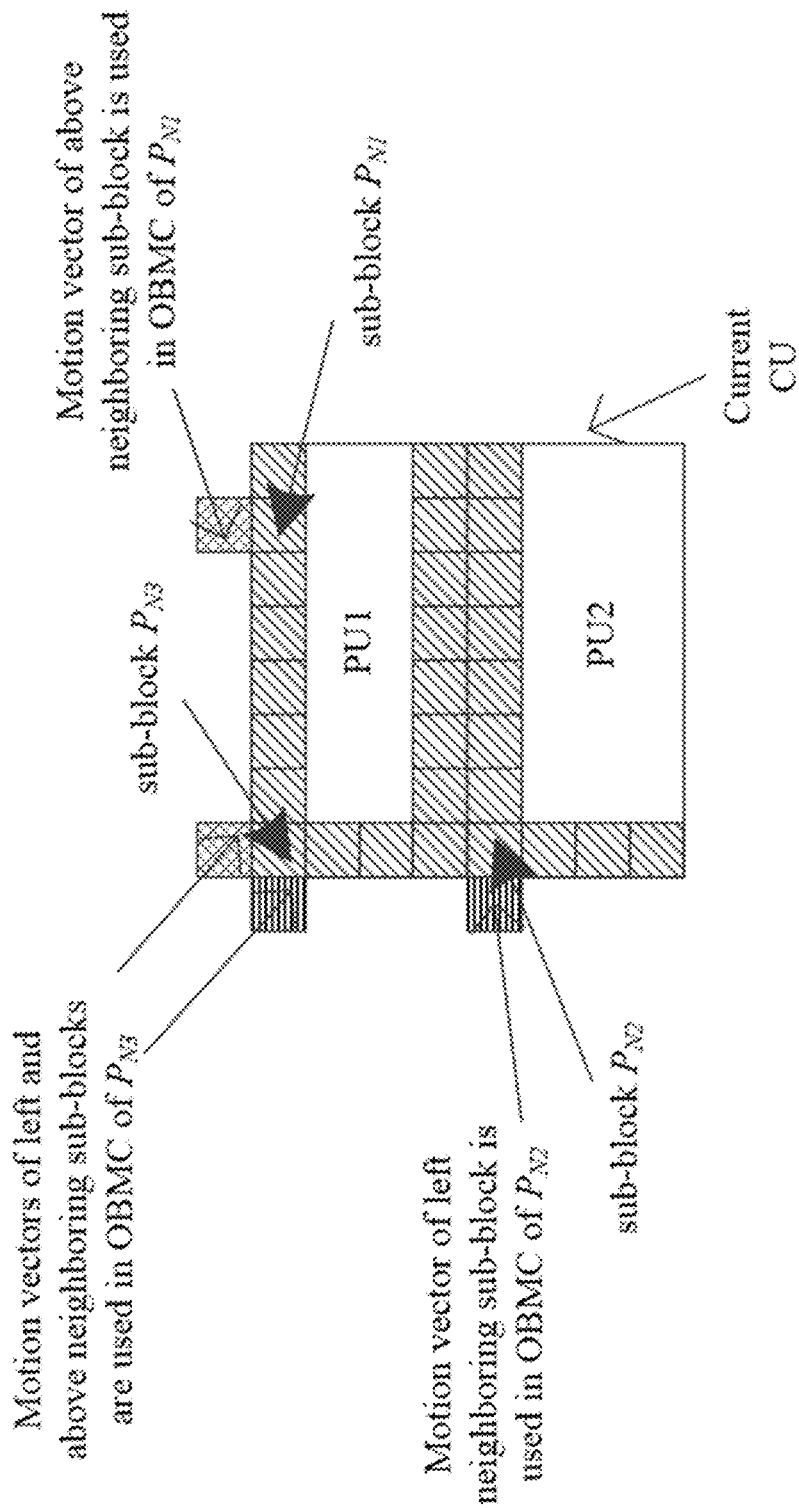
FIGS. 12A and 12B show example snapshots of sub-block when using the overlapped block motion compensation (OBMC) algorithm.
Figure 12B:
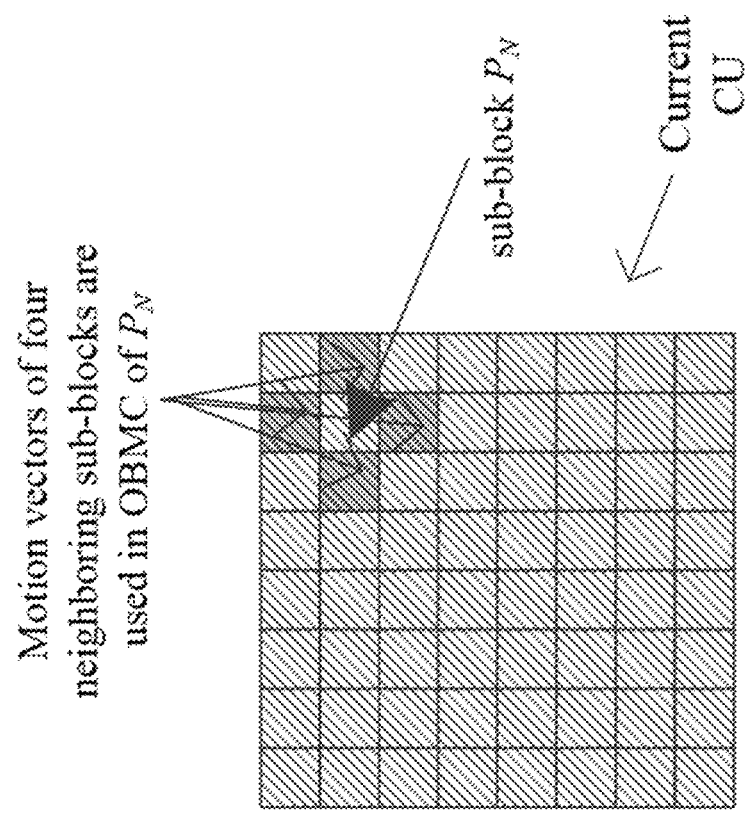

FIG. 12A shows sub-blocks at the CU/PU boundary, and the hatched sub-blocks are where OBMC applies. Similarly, FIG. 12B shows the sub-Pus in ATMVP mode.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighboring sub-block is denoted as PN, with N indicating an index for the neighboring above, below, left and right sub-blocks and prediction block based on motion vectors of the current sub-block is denoted as PC. When PN is based on the motion information of a neighboring sub-block that contains the same motion information to the current sub-block, the OBMC is not performed from PN. Otherwise, every sample of PN is added to the same sample in PC, i.e., four rows/columns of PN are added to PC. The weighting factors {¼, ⅛, 1/16, 1/32} are used for PN and the weighting factors {¾, ⅞, 15/16, 31/32} are used for PC. The exception are small MC blocks, (i.e., when height or width of the coding block is equal to 4 or a CU is coded with sub-CU mode), for which only two rows/columns of PN are added to PC. In this case weighting factors {¼, ⅛} are used for PN and weighting factors {¾, ⅞} are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

2.5 Examples of Local Illumination Compensation (LIC)

LIC is based on a linear model for illumination changes, using a scaling factor a and an offset b. And it is enabled or disabled adaptively for each inter-mode coded coding unit (CU).

Figure 13:
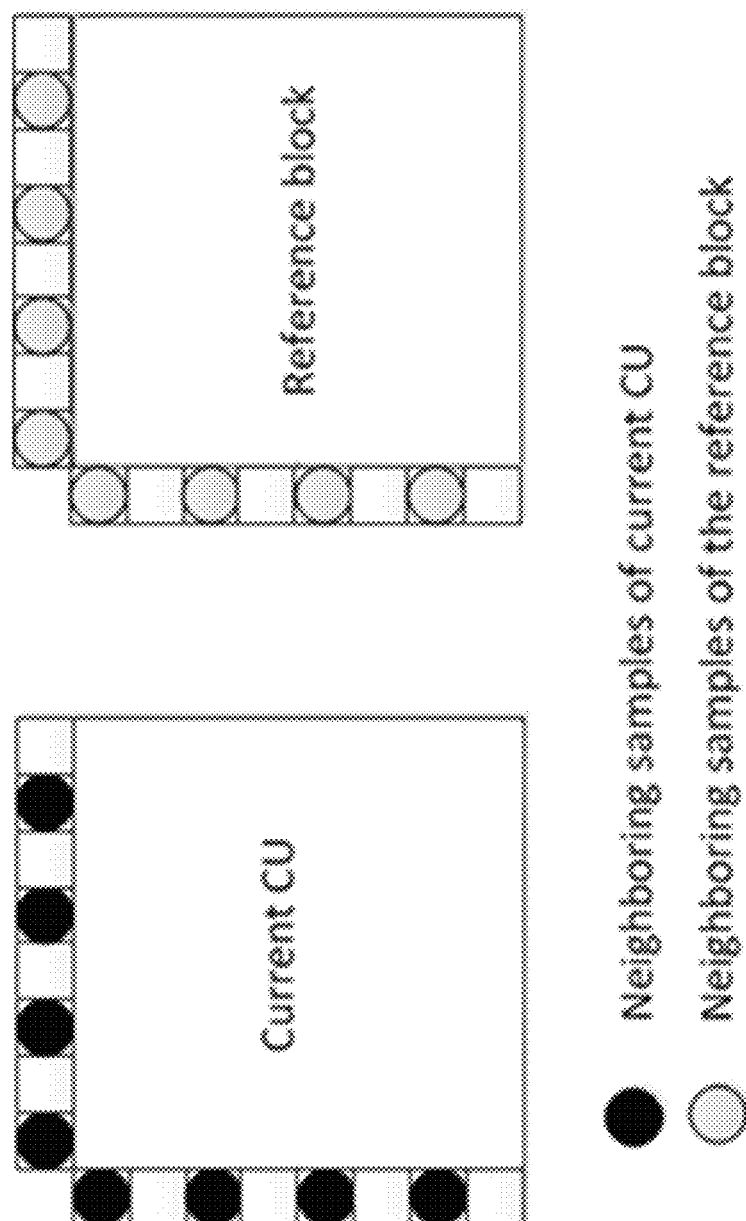
FIG. 13 shows an example of neighboring samples used to derive parameters for the local illumination compensation (LIC) algorithm.

When LIC applies for a CU, a least square error method is employed to derive the parameters a and b by using the neighboring samples of the current CU and their corresponding reference samples. FIG. 13 shows an example of neighboring samples used to derive parameters of the IC algorithm. Specifically, and as shown in FIG. 13, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

When LIC is enabled for a picture, an additional CU level RD check is needed to determine whether LIC is applied or not for a CU. When LIC is enabled for a CU, the mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM:

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.6 Examples of Affine Motion Compensation Prediction

Figure 14:
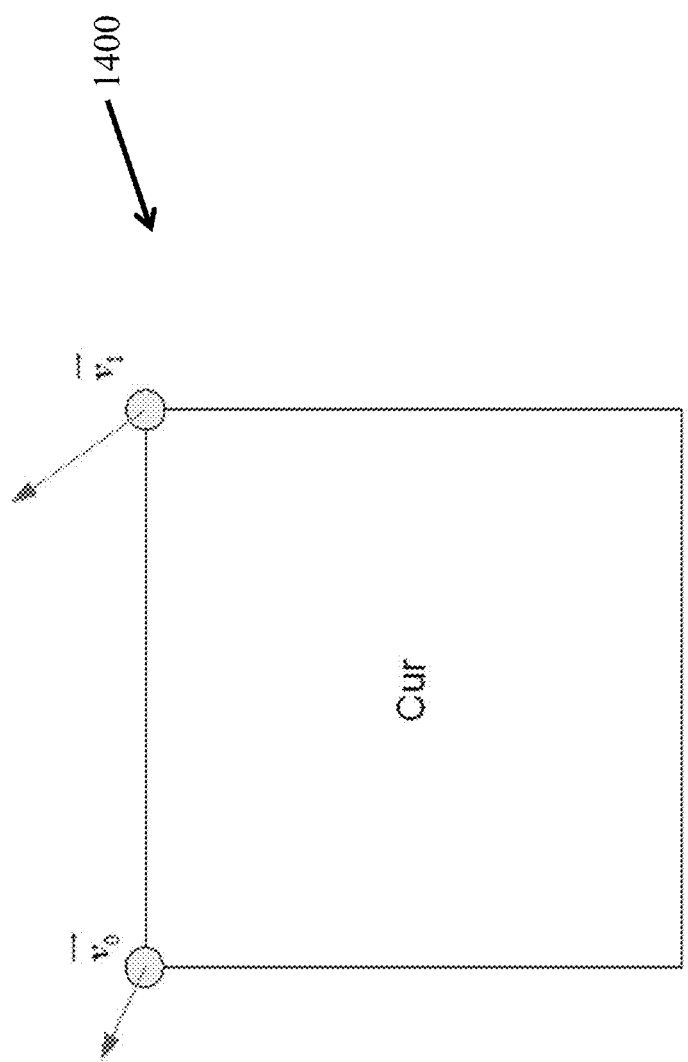
FIG. 14 shows an example of a simplified affine motion model.

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 14 shows an example of an affine motion field of a block 1400 described by two control point motion vectors $V_0$ and $V_1$. The motion vector field (MVF) of the block 1400 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Eq. (1)}$$

As shown in FIG. 14, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = \text{clip3}\left(4, w, \frac{w \times MvPre}{\max(\text{abs}(v_{1x} - v_{0x}), \text{abs}(v_{1y} - v_{0y}))}\right) \\ N = \text{clip3}\left(4, h, \frac{h \times MvPre}{\max(\text{abs}(v_{2x} - v_{0x}), \text{abs}(v_{2y} - v_{0y}))}\right) \end{cases} \quad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 15:
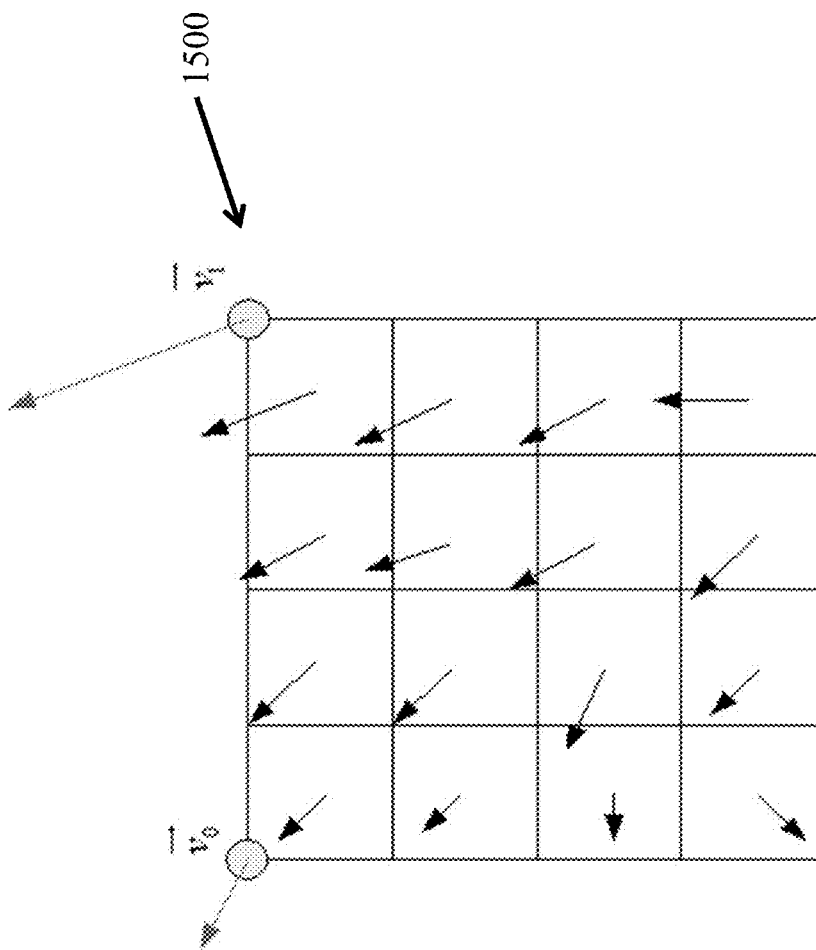
FIG. 15 shows an example of an affine motion vector field (MVF) per sub-block.

FIG. 15 shows an example of affine MVF per sub-block for a block 1500. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1)|v_0=\{V_A, V_B, V_C\}, v_1=\{v_D,v_E\}\}$ is constructed using the neighboring blocks.

Figure 16:
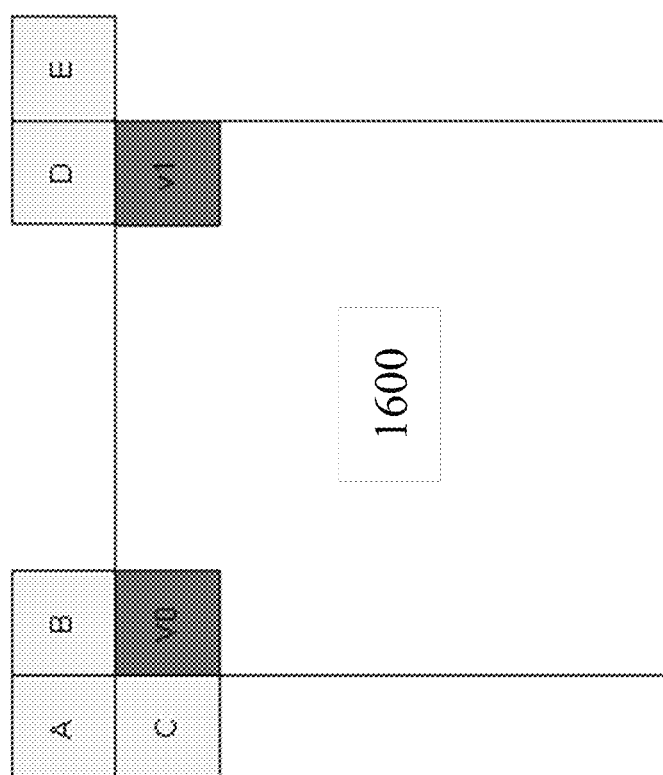
FIG. 16 shows an example of motion vector prediction (MVP) for the AF_INTER affine motion mode.

FIG. 16 shows an example of motion vector prediction (MVP) for a block 1600 in the AF_INTER mode. As shown in FIG. 16, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

Figures 17A, 17B:
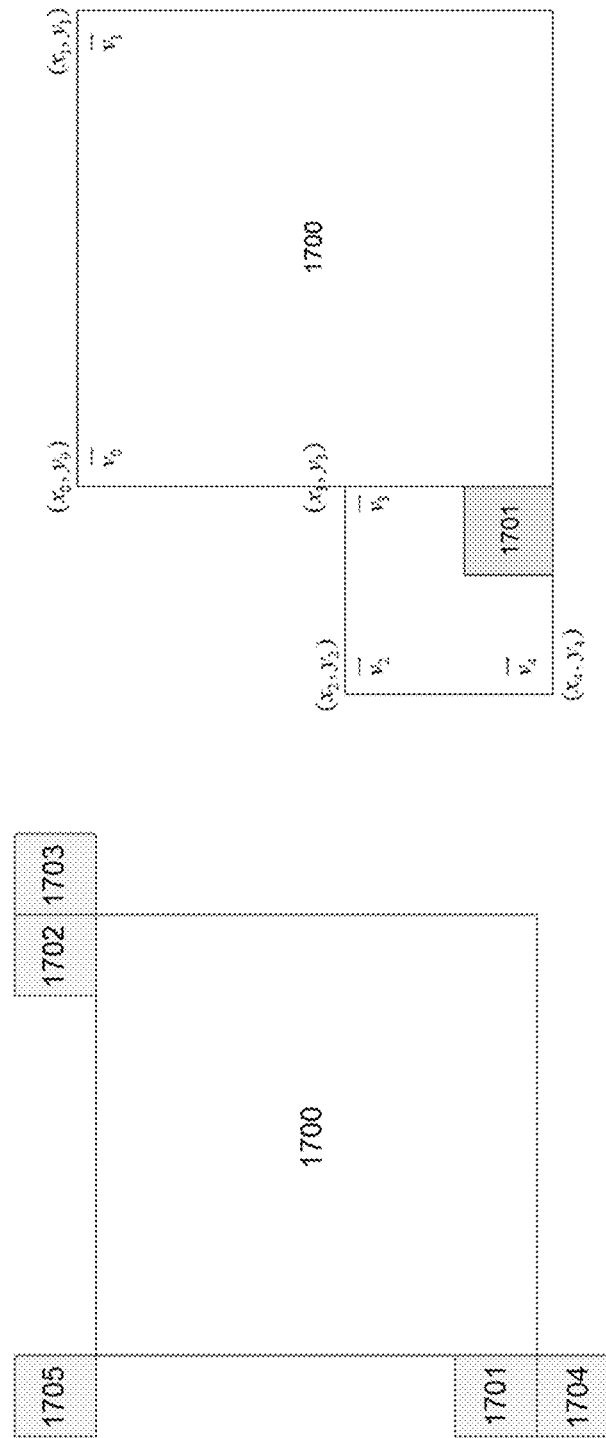
FIGS. 17A and 17B show example candidates for the AF_MERGE affine motion mode.

When a CU is applied in AF_MERGE mode, it gets the first block coded with an affine mode from the valid neighboring reconstructed blocks. FIG. 17A shows an example of the selection order of candidate blocks for a current CU 1700. As shown in FIG. 17A, the selection order can be from left (1701), above (1702), above right (1703), left bottom (1704) to above left (1705) of the current CU 1700. FIG. 17B shows another example of candidate blocks for a current CU 1700 in the AF_MERGE mode. If the neighboring left bottom block 1701 is coded in affine mode, as shown in FIG. 17B, the motion vectors $v_2$, $v_3$ and $v_4$ of the top left corner, above right corner, and left bottom corner of the CU containing the sub-block 1701 are derived. The motion vector $v_0$ of the top left corner on the current CU 1700 is calculated based on v2, v3 and v4. The motion vector v1 of the above right of the current CU can be calculated accordingly.

After the CPMV of the current CU v0 and v1 are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

2.7 Examples of Pattern Matched Motion Vector Derivation (PMMVD)

The PMMVD mode is a special merge mode based on the Frame-Rate Up Conversion (FRUC) method. With this mode, motion information of a block is not signaled but derived at decoder side.

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (3), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \qquad \text{Eq. (3)}$$

Figure 18:
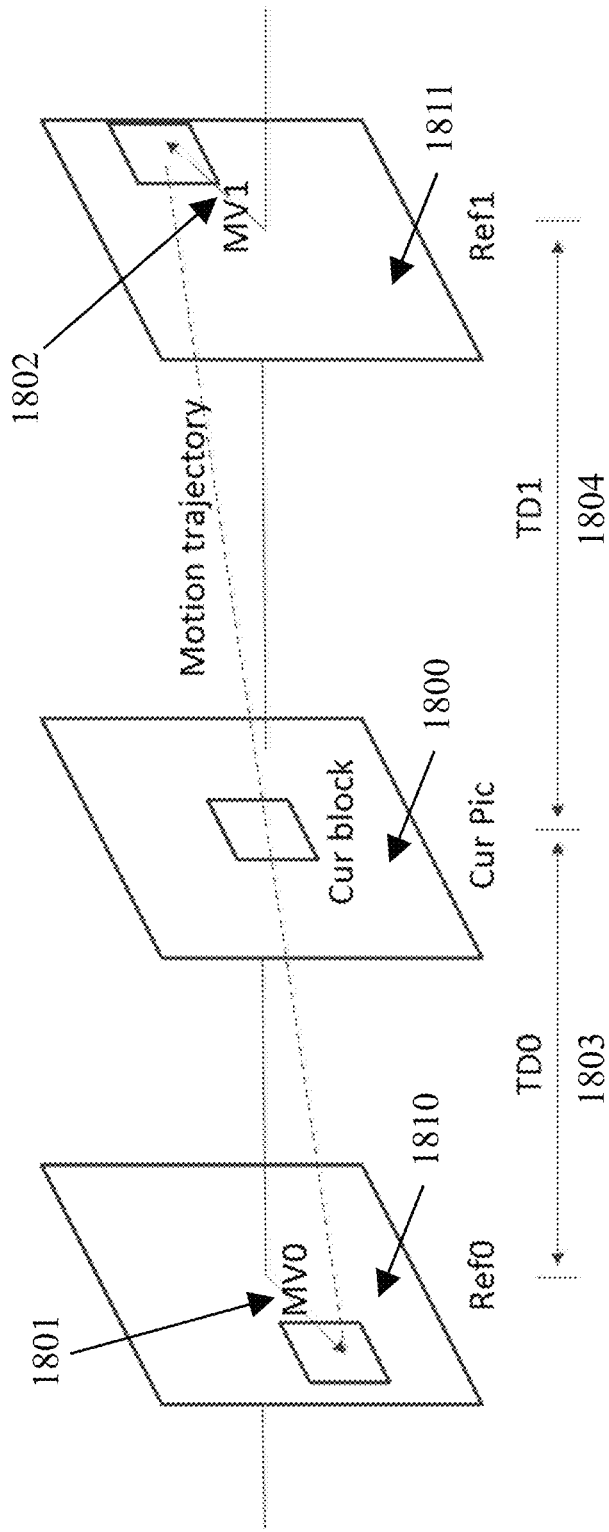
FIG. 18 shows an example of bilateral matching in pattern matched motion vector derivation (PMMVD) mode, which is a special merge mode based on the frame-rate up conversion (FRUC) algorithm.

FIG. 18 shows an example of bilateral matching used in the Frame-Rate Up Conversion (FRUC) method. The bilateral matching is used to derive motion information of the current CU by finding the closest match between two blocks along the motion trajectory of the current CU (1800) in two different reference pictures (1810, 1811). Under the assumption of continuous motion trajectory, the motion vectors MV0 (1801) and MV1 (1802) pointing to the two reference blocks are proportional to the temporal distances, e.g., TD0 (1803) and TD1 (1804), between the current picture and the two reference pictures. In some embodiments, when the current picture 1800 is temporally between the two reference pictures (1810, 1811) and the temporal distance from the current picture to the two reference pictures is the same, the bilateral matching becomes mirror based bi-directional MV.

Figure 19:
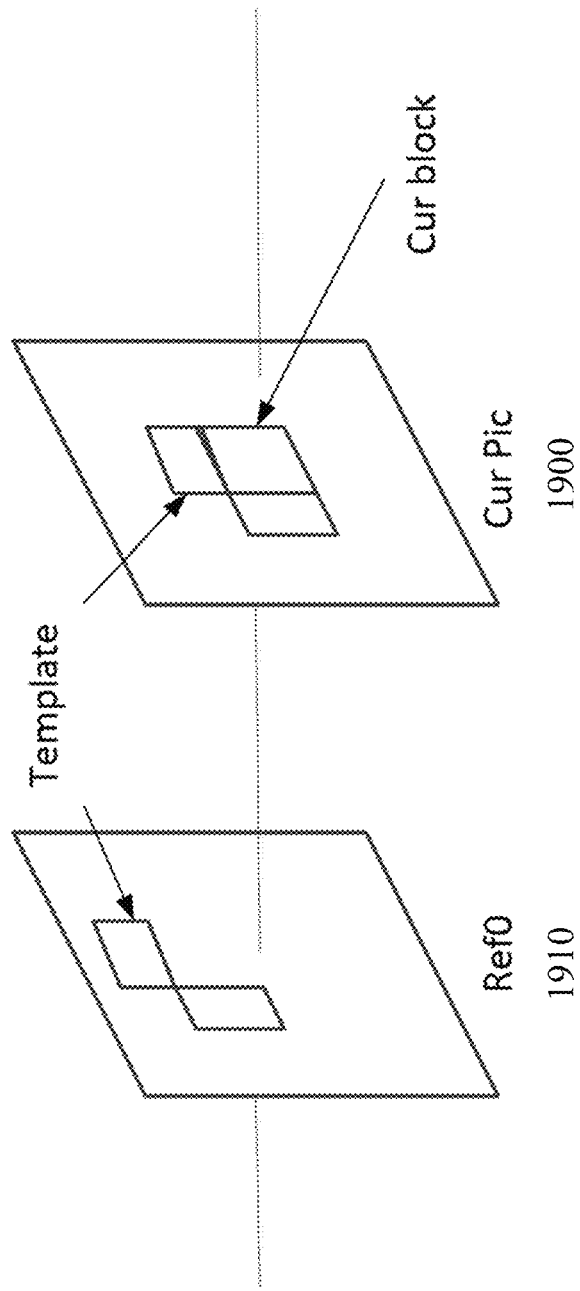
FIG. 19 shows an example of template matching in the FRUC algorithm.

FIG. 19 shows an example of template matching used in the Frame-Rate Up Conversion (FRUC) method. Template matching can be used to derive motion information of the current CU 1900 by finding the closest match between a template (e.g., top and/or left neighboring blocks of the current CU) in the current picture and a block (e.g., same size to the template) in a reference picture 1910. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $ref_a$) at reference list A. Then the reference picture $ref_b$ of its paired bilateral MV is found in the other reference list B so that $ref_a$ and $ref_b$ are temporally at different sides of the current picture. If such a $ref_b$ is not available in reference list B, $ref_b$ is determined as a reference which is different from $ref_a$ and its temporal distance to the current picture is the minimal one in list B. After $ref_b$ is determined, MVb is derived by scaling MVa based on the temporal distance between the current picture and $ref_a$, $ref_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an interpolated MV field. Before coding a frame, interpolated motion field is generated for the whole picture based on unilateral ME. Then the motion field may be used later as CU level or sub-CU level MV candidates.

Figure 20:
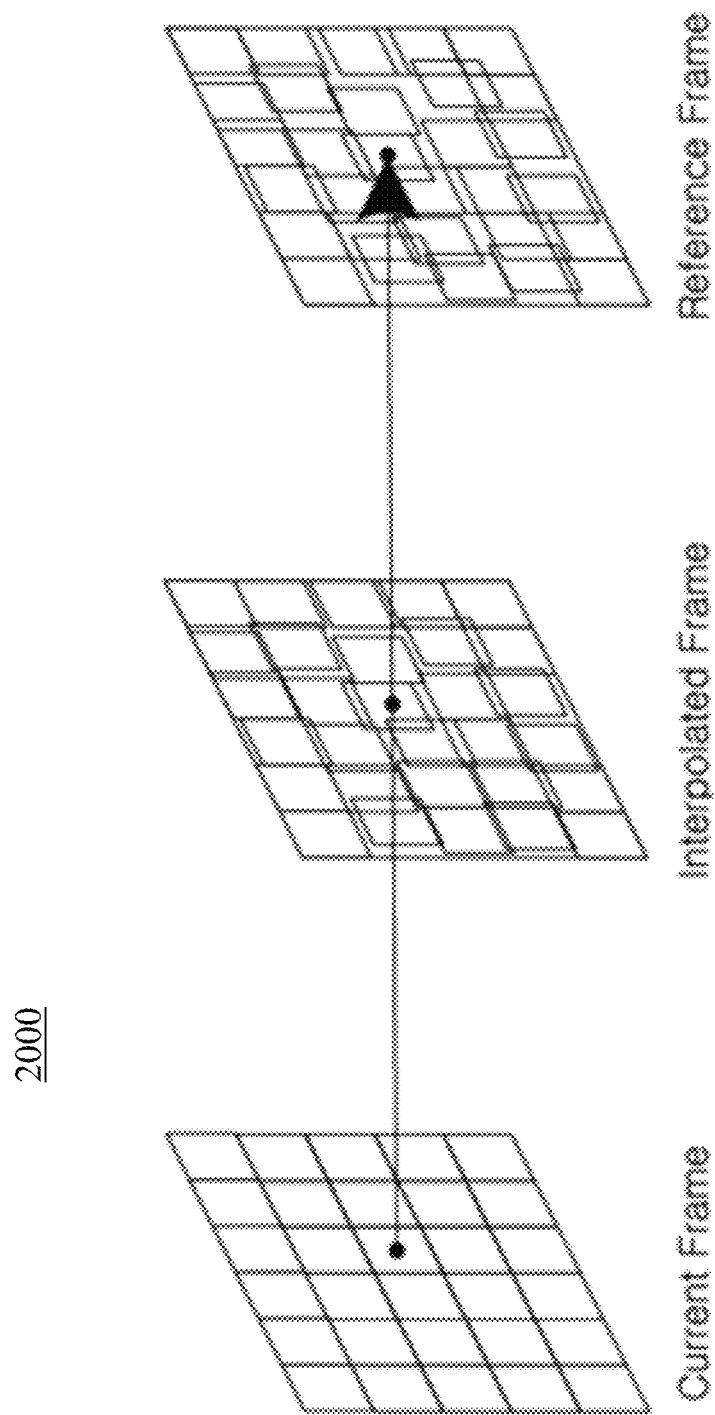
FIG. 20 shows an example of unilateral motion estimation in the FRUC algorithm.

In some embodiments, the motion field of each reference pictures in both reference lists is traversed at 4×4 block level. FIG. 20 shows an example of unilateral Motion Estimation (ME) 2000 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and matching cost. When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C=SAD+w\cdot(|MV_x-MV_x^s|+|MV_y-MV_y^s|) \quad \text{Eq. (4)}$$

Here, w is a weighting factor. In some embodiments, w can be empirically set to 4. MV and MVS indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

```
If costBi <= factor * min (cost0, cost1)
    bi-prediction is used;
Otherwise, if cost0 <= cost1
    uni-prediction from list0 is used;
Otherwise,
    uni-prediction from list1 is used;
```

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

2.8 Examples of Bi-Directional Optical Flow (BIO)

In BIO, motion compensation is first performed to generate the first predictions (in each prediction direction) of the current block. The first predictions are used to derive the spatial gradient, the temporal gradient and the optical flow of each sub-block/pixel within the block, which are then used to generate the second prediction, e.g., the final prediction of the sub-block/pixel. The details are described as follows.

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and denote $\partial I^{(k)}/\partial x$ and $\partial I^{(k)}/\partial y$ as the horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \quad \text{Eq. (5)}$$

Combining this optical flow equation with Hermite interpolation for the motion trajectory of each sample results in a unique third-order polynomial that matches both the function values $I^{(k)}$ and derivatives $\partial I^{(k)}/\partial x$ and $\partial I^{(k)}/\partial y$ at the ends. The value of this polynomial at t=0 is the BIO prediction:

$$\text{Pred}_{BIO} = 1/2 \cdot (I^{(0)} + I^{(1)}) + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad \text{Eq. (6)}$$

Figure 21:
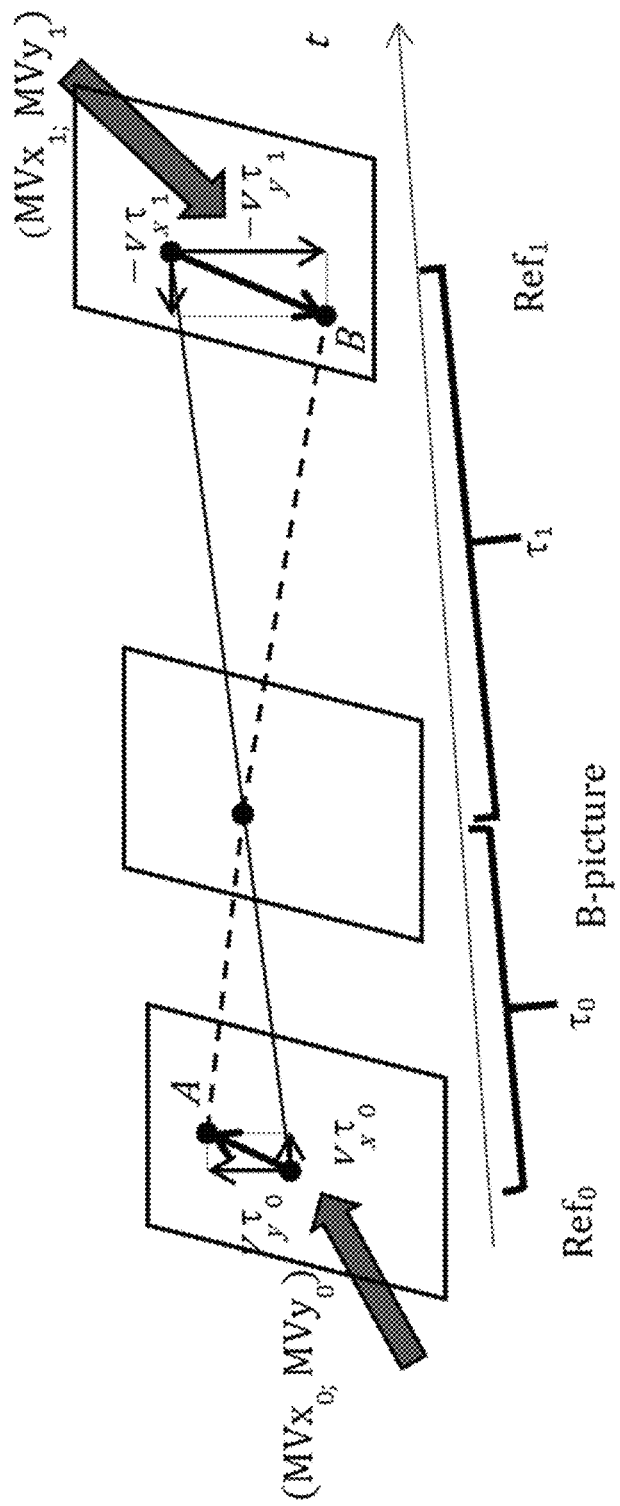
FIG. 21 shows an example of an optical flow trajectory used by the bi-directional optical flow (BIO) algorithm.

FIG. 21 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0 = \text{POC(current)} - \text{POC}(\text{Ref}_0)$, $\tau_1 = \text{POC}(\text{Ref}_1) - \text{POC(current)}$. If both predictions come from the same time direction (either both from the past or both from the future) then the signs are different (e.g., $\tau_0 \cdot \tau_1 < 0$). In this case, BIO is applied if the prediction is not from the same time moment (e.g., $\tau_0 \neq \tau_1$). Both referenced regions have non-zero motion (e.g. $MVx_0, MVy_0, MVx_1, MVy_1 \neq 0$) and the block motion vectors are proportional to the time distance (e.g. $MVx_0/Mvx_1 = Mvy_0/Mvy_1 = -\tau_0/\tau_1$).

The motion vector field $(v_x, v_y)$ is determined by minimizing the difference $\Delta$ between values in points A and B. FIGS. 9A-9B show an example of intersection of motion trajectory and reference frame planes. Model uses only first linear term of a local Taylor expansion for $\Delta$:

$$\Delta = (I^{(0)} - I^{(1)})_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad \text{Eq. (7)}$$

All values in the above equation depend on the sample location, denoted as (i', j'). Assuming the motion is consistent in the local surrounding area, $\Delta$ can be minimized inside the $(2M+1) \times (2M+1)$ square window $\Omega$ centered on the currently predicted point (i,j), where M is equal to 2:

$$(v_x, v_y) = \underset{v_x, v_y}{\text{argmin}} \sum_{[i',j] \in \Omega} \Delta^2[i', j'] \quad \text{Eq. (8)}$$

For this optimization problem, the JEM uses a simplified approach making first a minimization in the vertical direction and then in the horizontal direction. This results in the following:

$$v_x = (s_1 + r) > m ? \text{clip3}\left(-thBIO, thBIO, -\frac{s_3}{(s_1 + r)}\right) : 0 \quad \text{Eq. (9)}$$

$$v_y = (s_5 + r) > m ? \text{clip3}\left(-thBIO, thBIO, -\frac{s_6 - v_x s_2/2}{(s_5 + r)}\right) : 0 \quad \text{Eq. (10)}$$

where, $$s_1 = \sum_{[i',j] \in \Omega} (\tau_1 \partial I^{(1)}/\partial x + \tau_0 \partial I^{(0)}/\partial x)^2; \quad \text{Eq. (11)}$$

$$s_3 = \sum_{[i',j] \in \Omega} (I^{(1)} - I^{(0)})(\tau_1 \partial I^{(1)}/\partial x + \tau_0 \partial I^{(0)}/\partial x);$$

$$s_2 = \sum_{[i',j] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j] \in \Omega} (\tau_1 \partial I^{(1)}/\partial y + \tau_0 \partial I^{(0)}/\partial y)^2;$$

$$s_6 = \sum_{[i',j] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m can be introduced in Eq. (9) and Eq. (10), where:

$$r = 500 \cdot 4^{d-8} \quad \text{Eq. (12)}$$

$$m = 700 \cdot 4^{d-8} \quad \text{Eq. (13)}$$

Here, d is bit depth of the video samples.

Figures 22A, 22B:
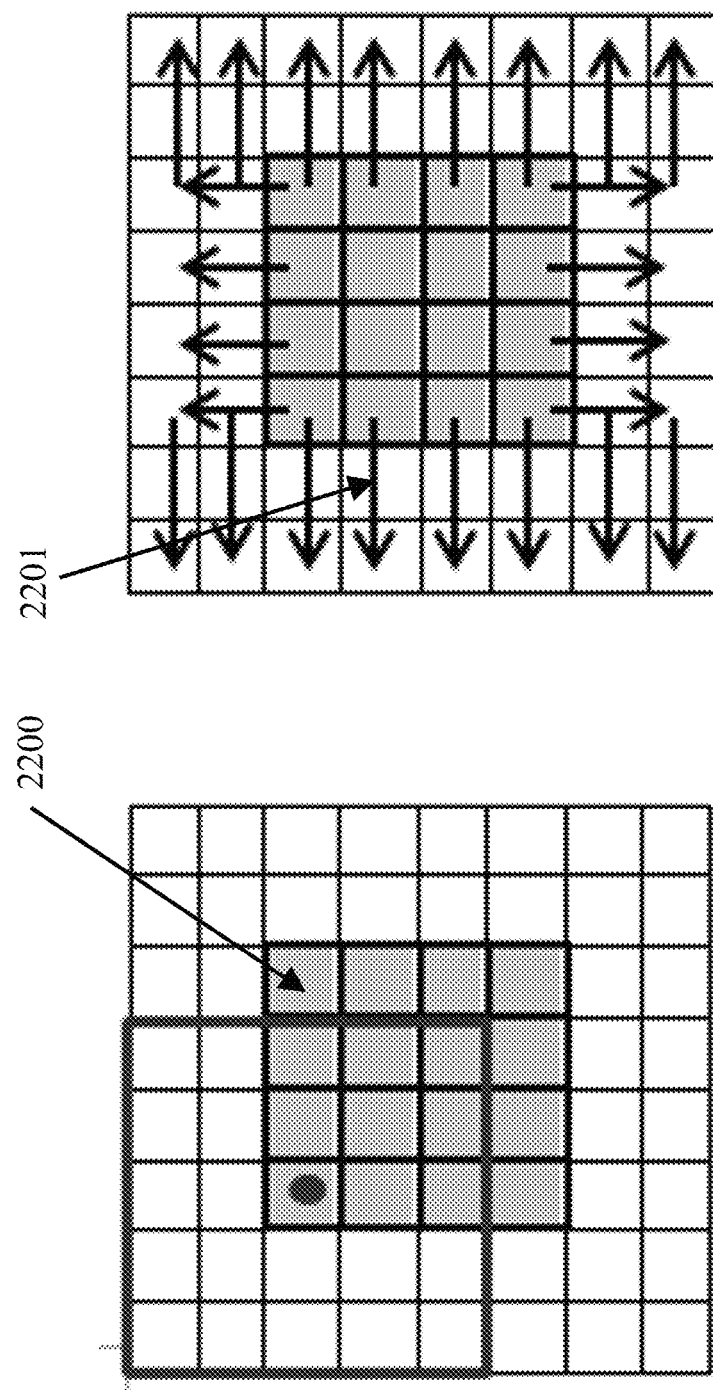
FIGS. 22A and 22B show example snapshots of using of the bi-directional optical flow (BIO) algorithm without block extensions.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 22A shows an example of access positions outside of a block 2200. As shown in FIG. 22A, in Eq. (9), $(2M+1) \times (2M+1)$ square window $\Omega$ centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 2201, as shown in FIG. 22B.

With BIO, it is possible that the motion field can be refined for each sample. To reduce the computational complexity, a block-based design of BIO is used in the JEM. The motion refinement can be calculated based on a 4×4 block. In the block-based BIO, the values of $s_n$ in Eq. (9) of all samples in a 4×4 block can be aggregated, and then the aggregated values of $s_n$ in are used to derived BIO motion vectors offset for the 4×4 block. More specifically, the following formula can used for block-based BIO derivation:

$$s_{1,b_k} = \sum_{(x,y) \in b_k} \sum_{[i',j] \in \Omega(x,y)} (\tau_1 \partial I^{(1)}/\partial x + \tau_0 \partial I^{(0)}/\partial x)^2; \quad \text{Eq. (14)}$$

$$s_{3,b_k} = \sum_{(x,y) \in b_k} \sum_{[i',j] \in \Omega} (I^{(1)} - I^{(0)})(\tau_1 \partial I^{(1)}/\partial x + \tau_0 \partial I^{(0)}/\partial x);$$

$$s_{2,b_k} = \sum_{(x,y) \in b_k} \sum_{[i',j] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_{5,b_k} = \sum_{(x,y) \in b_k} \sum_{[i',j] \in \Omega} (\tau_1 \partial I^{(1)}/\partial y + \tau_0 \partial I^{(0)}/\partial y)^2;$$

$$s_{6,b_k} = \sum_{(x,y) \in b_k} \sum_{[i',j] \in \Omega} (I^{(1)} - I^{(0)})(\tau_1 \partial I^{(1)}/\partial y + \tau_0 \partial I^{(0)}/\partial y)$$

Here, $b_k$ denotes the set of samples belonging to the k-th 4×4 block of the predicted block. $s_n$ in Eq (9) and Eq (10) are replaced by $((s_{n,bk}) >> 4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12 \times 2^{14-d}$; otherwise, it is set to $12 \times 2^{13-d}$.

Gradients for BIO can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX, fracY) according to the fractional part of block motion vector. For horizontal gradient $\partial I/\partial x$, a signal is first interpolated vertically using BIOfilterS corresponding to the fractional position fracY with de-scaling shift d-8. Gradient filter BIOfilterG is then applied in horizontal direction corresponding to the fractional position fracX with de-scaling shift by 18-d. For vertical gradient $\partial I/\partial y$, a gradient filter is applied vertically using BIOfilterG corresponding to the fractional position fracY with de-scaling shift d-8. The signal displacement is then performed using BIOfilterS in horizontal direction corresponding to the fractional position fracX with de-scaling shift by 18-d. The length of interpolation filter for gradients calculation BIOfilterG and signal displacement BIOfilterF can be shorter (e.g., 6-tap) in order to maintain reasonable complexity. Table 1 shows example filters that can be used for gradients calculation of different fractional positions of block motion vector in BIO. Table 2 shows example interpolation filters that can be used for prediction signal generation in BIO.

TABLE 1

Exemplary filters for gradient calculations in BIO

| Fractional pel position | Interpolation filter for gradient(BIOfilterG) |
| --- | --- |
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Exemplary interpolation filters for prediction signal generation in BIO

| Fractional pel position | Interpolation filter for prediction signal(BIOfilterS) |
| --- | --- |
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO can be applied to all bi-predicted blocks when the two predictions are from different reference pictures. When Local Illumination Compensation (LIC) is enabled for a CU, BIO can be disabled.

In some embodiments, OBMC is applied for a block after normal MC process. To reduce the computational complexity, BIO may not be applied during the OBMC process. This means that BIO is applied in the MC process for a block when using its own MV and is not applied in the MC process when the MV of a neighboring block is used during the OBMC process.

2.9 Examples of Decoder-Side Motion Vector Refinement (DMVR)

In a bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 23:
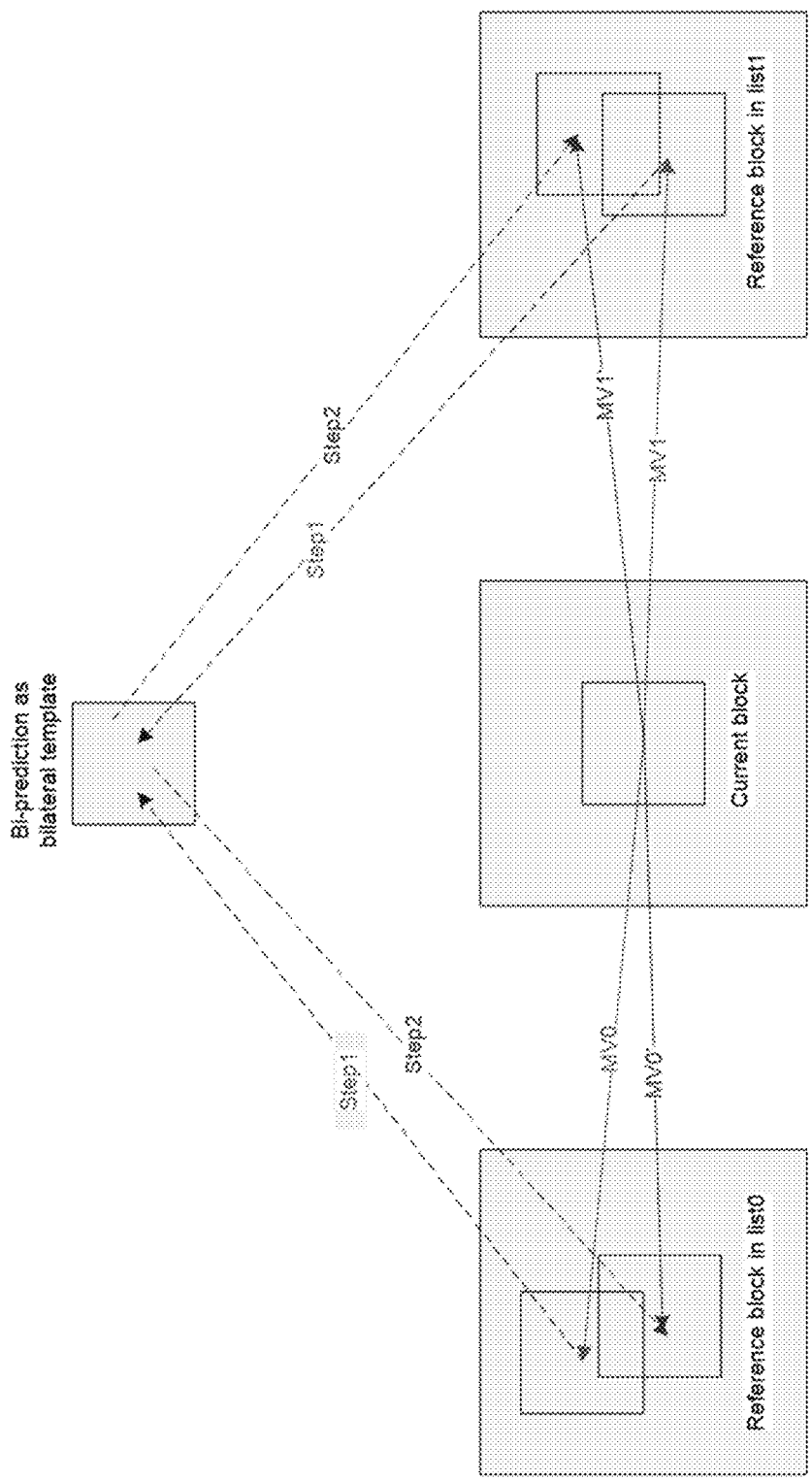
FIG. 23 shows an example of the decoder-side motion vector refinement (DMVR) algorithm based on bilateral template matching.

In DMVR, a bilateral template is generated as the weighted combination (i.e. average) of the two prediction blocks, from the initial MV0 of list0 and MV1 of list1, respectively, as shown in FIG. 23. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 23, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

3. Examples of CABAC Modifications

In the JEM, CABAC contains the following three major changes compared to the design in HEVC:

Modified context modeling for transform coefficients
Multi-hypothesis probability estimation with context-dependent updating speed
Adaptive initialization for context models 3.1 Examples of Context Modeling for Transform Coefficients In HEVC, transform coefficients of a coding block are coded using non-overlapped coefficient groups (CGs), and each CG contains the coefficients of a 4×4 block of a coding block. The CGs inside a coding block, and the transform coefficients within a CG, are coded according to pre-defined scan orders. The coding of transform coefficient levels of a CG with at least one non-zero transform coefficient may be separated into multiple scan passes. In the first pass, the first bin (denoted by bin0, also referred as significant_coeff_flag, which indicates the magnitude of the coefficient is larger than 0) is coded. Next, two scan passes for context coding the second/third bins (denoted by bin1 and bin2, respectively, also referred as coeff_abs_greater1_flag and coeff_abs_greater2_flag) may be applied. Finally, two more scan passes for coding the sign information and the remaining values (also referred as coeff_abs_level_remaining) of coefficient levels are invoked, if necessary. Only bins in the first three scan passes are coded in a regular mode and those bins are termed regular bins in the following descriptions.

In the JEM, the context modeling for regular bins is changed. When coding bin i in the i-th scan pass (i being 0, 1, 2), the context index is dependent on the values of the i-th bins of previously coded coefficients in the neighbourhood covered by a local template. Specifically, the context index is determined based on the sum of the i-th bins of neighbouring coefficients.

Figure 24:
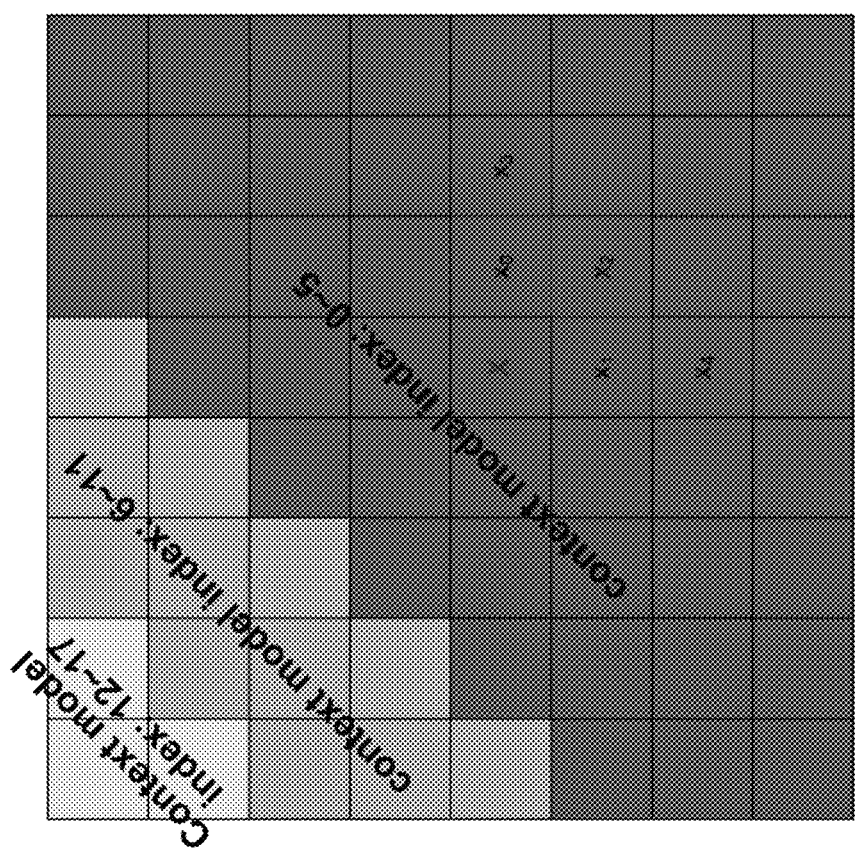
FIG. 24 shows an example of a template definition used in transform coefficient context modelling.

As shown in FIG. 24, the local template contains up to five spatial neighbouring transform coefficients wherein x indicates the position of current transform coefficient and xi (i being 0 to 4) indicates its five neighbours. To capture the characteristics of transform coefficients at different frequencies, one coding block may be split into up to three regions and the splitting method is fixed regardless of the coding block sizes. For example, when coding bin0 of luma transform coefficients, as depicted in FIG. 24, one coding block is split into three regions marked with different colours, and the context index assigned to each region is listed. Luma and chroma components are treated in a similar way but with separate sets of context models. Moreover, the context model selection for bin0 (e.g., significant flags) of the luma component is further dependent on transform size.

3.2 Examples of Multi-Hypothesis Probability Estimation

The binary arithmetic coder is applied with a "multi-hypothesis" probability update model based on two probability estimates $P_0$ and $P_1$ that are associated with each context model and are updated independently with different adaptation rates as follows:

$$P_0^{new} = \begin{cases} P_0^{old} + ((2^k - P_0^{old}) >> M_i), & \text{if input is '1'}, \\ P_0^{old} - (P_0^{old} >> M_i), & \text{if input is '0'}, \end{cases} \quad \text{Eq. (15)}$$

$$P_1^{new} = \begin{cases} P_1^{old} + ((2^k - P_1^{old}) >> 8), & \text{if input is '1'}, \\ P_j^{old} - (P_j^{old} >> 8), & \text{if input is '0'}. \end{cases}$$

Here, $P_j^{old}$ and $P_j^{new}$ (j=0, 1) represent the probabilities before and after decoding a bin, respectively. The variable $M_i$ (being 4, 5, 6, 7) is a parameter which controls the probability updating speed for the context model with index equal to i; and k represents the precision of probabilities (here it is equal to 15).

The probability estimate P used for the interval subdivision in the binary arithmetic coder is the average of the estimates from the two hypotheses:

$$P = (P_0^{new} + P_1^{new})/2 \quad \text{Eq. (16)}$$

In the JEM, the value of the parameter $M_i$ used in Equation (15) that controls the probability updating speed for each context model is assigned as follows:

At the encoder side, the coded bins associated with each context model are recorded. After one slice is coded, for each context model with index equal to i, the rate costs of using different values of $M_i$ (being 4, 5, 6, 7) are calculated and the one that provides the minimum rate cost is selected. For simplicity, this selection process is performed only when a new combination of slice type and slice-level quantization parameter are encountered.

A 1-bit flag is signalled for each context model i to indicate whether $M_i$ is different from the default value 4. When the flag is 1, two bits are used to indicate whether $M_i$ is equal to 5, 6, or 7.

3.3 Examples of Initialization for Context Models

Instead of using fixed tables for context model initialization in HEVC, the initial probability states of context models for inter-coded slices can be initialized by copying states from previously coded pictures. More specifically, after coding a centrally-located CTU of each picture, the probability states of all context models are stored for potential use as the initial states of the corresponding context models on later pictures. In the JEM, the set of initial states for each inter-coded slice is copied from the stored states of a previously coded picture that has the same slice type and the same slice-level QP as the current slice. This lacks loss robustness, but is used in the current JEM scheme for coding efficiency experiment purposes.

4. Examples of Related Embodiments and Methods

Methods related to the disclosed technology include extended LAMVR, wherein supported motion vector resolutions range from ¼-pel to 4-pel (¼-pel, ½-pel, 1-pel, 2-pel and 4-pel). Information about the motion vector resolution is signaled at the CU level when MVD information is signaled.

Depending on the resolution of CU, both motion vector (MV) and motion vector predictor (MVP) of the CU are adjusted. If applied motion vector resolution is denoted as R (R could be ¼, ½, 1, 2, 4), MV ($MV_x$, $MV_y$) and MVP ($MVP_x$, $MVP_y$) are represented as follows:

$$(MV_x, MV_y) = (\text{Round}(MV_x/(R*4))*(R*4), \text{Round}(MV_y/(R*4))*(R*4))$$

$$(MVP_x, MVP_y) = (\text{Round}(MVP_x/(R*4))*(R*4), \text{Round}(MVP_y/(R*4))*(R*4))$$

Since the motion vector predictor and MV are both adjusted by an adaptive resolution, MVD ($MVD_x$, $MVD_y$) is also aligned to the resolution and, is signaled according to the resolution as follows:

$$(MVD_x, MVD_y) = ((MV_x - dMVP_x/(R*4)), (MV_y - MVP_y)/R*4))$$

In this proposal, motion vector resolution index (MVR index) indicates MVP index as well as the motion vector resolution. As result, the proposed method has no MVP index signaling. The table shows what each value of MVR index represents.

TABLE 3

Examples of MVR index representation

| MVR Index | 0 | 1 | 2 | 3 | 4 |
|---|---|---|---|---|---|
| Resolution (R) in pel | ¼ | ½ | 1 | 2 | 4 |
| $N^{th}$ MVP | $1^{st}$ MVP | $2^{nd}$ MVP | $3^{rd}$ MVP | $4^{th}$ MVP | $5^{th}$ MVP |

In the case of bi-prediction, AMVR has 3 modes for every resolution. AMVR Bi-Index indicates whether $MVD_x$, $MVD_y$ of each reference list (list 0 or list 1) are signaled or not. An example of the AMVR Bi-Index is defined as in the table below.

TABLE 4

Examples of the AMVR bi-index

| AMVR Bi-Index | $(MVD_x, MVD_y)$ of list 0 | $(MVD_x, MVD_y)$ of list 1 |
|---|---|---|
| 0 | Signaled | Signaled |
| 1 | Not signaled | Signaled |
| 2 | Signaled | Not signaled |

5. Drawbacks of Existing Implementations

In one existing implementation that uses BIO, the calculated MV between reference block/subblock in list 0 (denoted by refblk0) and reference block/subblock list 1 (refblk1), denoted by $(v_x, v_y)$, is only used for motion compensation of the current block/subblock, and are not used for motion prediction, deblocking, OBMC etc. of future coded blocks, which may be inefficient. For example, $(v_x, v_y)$ may be generated for each sub-block/pixel of the block, and Eq. (7) may be used to generate the second prediction of the sub-block/pixel. However, $(v_x, v_y)$ is not used for motion compensation of the sub-block/pixel, which may also be inefficient.

In another existing implementation that uses both DMVR and BIO for a bi-predicted PU, firstly, DMVR is performed. After that, motion information of the PU is updated. Then, BIO is performed with the updated motion information. That is to say, the input of BIO depends on the output of DMVR.

In yet another existing implementation that uses OBMC, for AMVP mode, whether OBMC is enabled or not is decided at encoder and signaled to decoder for small blocks (width*height<=256). This increases the encoder complexity. Meanwhile, for a given block/subblock, when OBMC is enabled, it is always applied to both luma and chroma, this may leads to coding efficiency drop.

In yet another existing implementation that uses AF_INTER mode, MVD is required to be coded, however, it can only be encoded in ¼ pel precision, which may be inefficient.

6. Example Methods for Two-Step Inter-Prediction for Visual Media Coding

Embodiments of the presently disclosed technology overcome the drawbacks of existing implementations, and provide additional solutions, thereby providing video coding with higher coding efficiencies. The two-step inter-prediction, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

With regard to terminology, the reference picture of current picture from list 0 and list 1 is denoted Ref0 and Ref1, respectively. Denote $\tau_0 = POC(current) - POC(Ref0)$, $\tau_1 = POC(Ref1) - POC(current)$, and denote reference block of the current block from Ref0 and Ref1 by refblk0 and refblk1 respectively. For a sub-block in current block, original MV of its corresponding sub-block in refblk0 pointing to refblk1 is denoted by $(v_x, v_y)$. MVs of the sub-block in Ref0 and Ref1 are denoted by $(mvL0_x, mvL0_y)$ and $(mvL1_x, mvL1_y)$ respectively. Derived MVs derived from the original MVs in BIO are denoted by $(v_x, v_y)$. The updated motion vector based methods for motion prediction may be extended, as described in this patent document, to existing and future video coding standards.

Example 1. MV $(v_x, v_y)$ and MV $(mvL1_x, mvL1_y)$, with X=0 or 1, should be scaled to the same precision before the adding operation, such as before performing the techniques in Example 1(e) and/or Example 2.

(a) In one example, the target precision (to be scaled to) is set to be the higher (for better performance)/lower precision (for lower complexity) between MV $(v_x, v_y)$ and MV $(mvLX_x, mvLX_y)$. Alternatively, the target precision (to be scaled to) is set to be a fixed value (e.g., 1/32 pel precision) regardless the precisions of these two MVs.

(b) In one example, the original MV $(mvLX_x, mvLX_y)$ may be scaled to a higher precision before the adding operation, for example, it may be scaled from ¼ pel precision to 1/16 pel precision. In this case, $mvLX_x = \text{sign}(mvLX_x)*(\text{abs}(mvLX_x)<<N)$, $mvLX_y = \text{sign}(mvLX_y)*(\text{abs}(mvLX_y)<<N)$, wherein function sign(·) returns the sign of an input parameter (shown below), and function abs(·) returns absolute value of an input parameter, and $N = \log 2(\text{curr\_mv\_precision}/\text{targ\_mv\_precision})$, and curr_mv_precision and targ_mv_precision are the current MV precision and target MV precision respectively. For example, if MV is scaled from ¼ pel precision to 1/16 pel precision, then $N = \log 2((¼)/(1/16)) = 2$.

$$\text{sign}(x) = \begin{cases} -1, & x < 0 \\ 1, & x \geq 0 \end{cases}$$

(i) Alternatively, $mvLX_x = mvLX_x << N$, $mvLX_y = mvLX_y << N$.
(ii) Alternatively, $mvLX_x = mvLX_x << (N+K)$, $mvLX_y = mvLX_y << (N+K)$.
(iii) Alternatively, $mvLX_x = \text{sign}(mvLX_x)*(\text{abs}(mvLX_x) << (N+K))$, $mvLX_y = \text{sign}(mvLX_y)*(\text{abs}(mvLX_y) << (N+K))$.
(iv) Similarly, if MV $(v_x, v_y)$ needs to be scaled to a lower precision, the scaling process as specified in Example 1(d) may be applicable.

(c) In one example, if the precision of MV $(v_x, v_y)$ is lower/higher than the precision of MV $(mvLX_x, mvLX_y)$, MV $(v_x, v_y)$ should be scaled to finer/coarser precision. For example, $(mvLX_x, mvLX_y)$ is with 1/16 pel precision, then $(v_x, v_y)$ is also scaled to 1/16 pel precision.

(d) If $(v_x, v_y)$ needs to be right-shifted (i.e., scaled to a lower precision) by N to achieve the same precision with $(mvLX_x, mvLX_y)$, then $v_x = (v_x + \text{offset}) >> N$, $v_y = (v_y + \text{offset}) >> N$, wherein, for example, offset=1<<(N-1).

(i) Alternatively, $v_x = \text{sign}(v_x)*((\text{abs}(v_x) + \text{offset}) >> N)$, $v_y = \text{sign}(v_y)*((\text{abs}(v_y) + \text{offset}) >> N)$.
(ii) Similarly, if MV $mvLX_x, mvLX_y)$ needs to be scaled to a higher precision, the above scaling process as specified in Example 1(b) may be applicable.

(e) In one example, it is proposed that the MV $(v_x, v_y)$ derived in BIO is scaled and added up to the original MV $(mvLX_x, mvLX_y)$ (X=0 or 1) of current block/subblock. The updated MV is calculated as: $mvL0'_x = -v_x*(\tau_0/(\tau_0+\tau_1)) + mvL0_x$, $mvL0'_y = -v_y*(\tau_0/(\tau_0+\tau_1)) + mvL0_y$, and $mvL1'_x = v_x*(\tau_1/(\tau_0+\tau_1)) + mvL1_x$, $mvL1'_y = v_y*(\tau_1/(\tau_0+\tau_1)) + mvL1_y$.

(i) In one example, the updated MV is used for future motion prediction (like in AMVP, merge and affine mode), deblocking, OBMC etc.

(ii) Alternatively, the updated MV can only be used in motion prediction of its non-immediately following CU/PUs in decoding order.

(iii) Alternatively, the updated MV can only be used as TMVP in AMVP, merge or affine mode.

(f) If $(v_x, v_y)$ needs to be right-shifted (i.e., scaled to a lower precision) by N to achieve the same precision with $(mvLX_x, mvLX_y)$, then $v_x=(v_x+\text{offset})>>(N+K)$, $v_y=(v_y+\text{offset})>>(N+K)$, wherein, for example, offset=1<<(N+K−1). K is an integer number, for example, K is equal to 1, 2, 3, −2, −1 or 0.

(i) Alternatively, $v_x=\text{sign}(v_x)*((\text{abs}(v_x)+\text{offset})>>(N+K))$, $v_y=\text{sign}(v_y)*((\text{abs}(v_y)+\text{offset})>>(N+K))$, wherein, for example, offset=1<<(N+K−1).

Example 2. Instead of considering POC distances (e.g., in the computation of $\tau_0$ and $\tau_1$ as described above), the scaling method of MVs invoked in BIO process may be simplified.

(a) $mvL0'_x=-v_x/S_0+mvL0x$, $mvL0'_y=-v_y/S_0+mvL0_y$, and/or $mvL1'_x=v_x/S_1+mvL1_x$, $myL1'_y=v_y/S_1+mvL1_y$. In one example, $S_0$ and/or $S_1$ is set to 2. In one example, it is invoked under certain conditions, such as τ0>0 and τ1>0.

(i) Alternatively, offsets may be added during division process. For example, $mvL0'_x=(-v_x+\text{offset0})/S_0+mvL0_x$, $mvL0'_y=-(v_y+\text{offset0})/S_0+mvL0_y$, and/or $mvL1'_x=(v_x+\text{offset1})/S_1+mvL1_x$, $mvL1'_y=(V_y+\text{offset1})/S_1+mvL1_y$. in one example, offset0 is set to $S_0/2$ and offset1 is set to $S_1/2$.

(ii) In one example, $mvL0'_x=((-v_x+1)>>1)+mvL0_x$, $mvL0'_y=(-(v_y+1)>>1)+mvL0_y$, and/or $mvL1'_x=((v_x+1)>>1)+mvL1_x$, $mvL1'_y=((v_y+1)>>1)+mvL1_y$.

Figure 25:
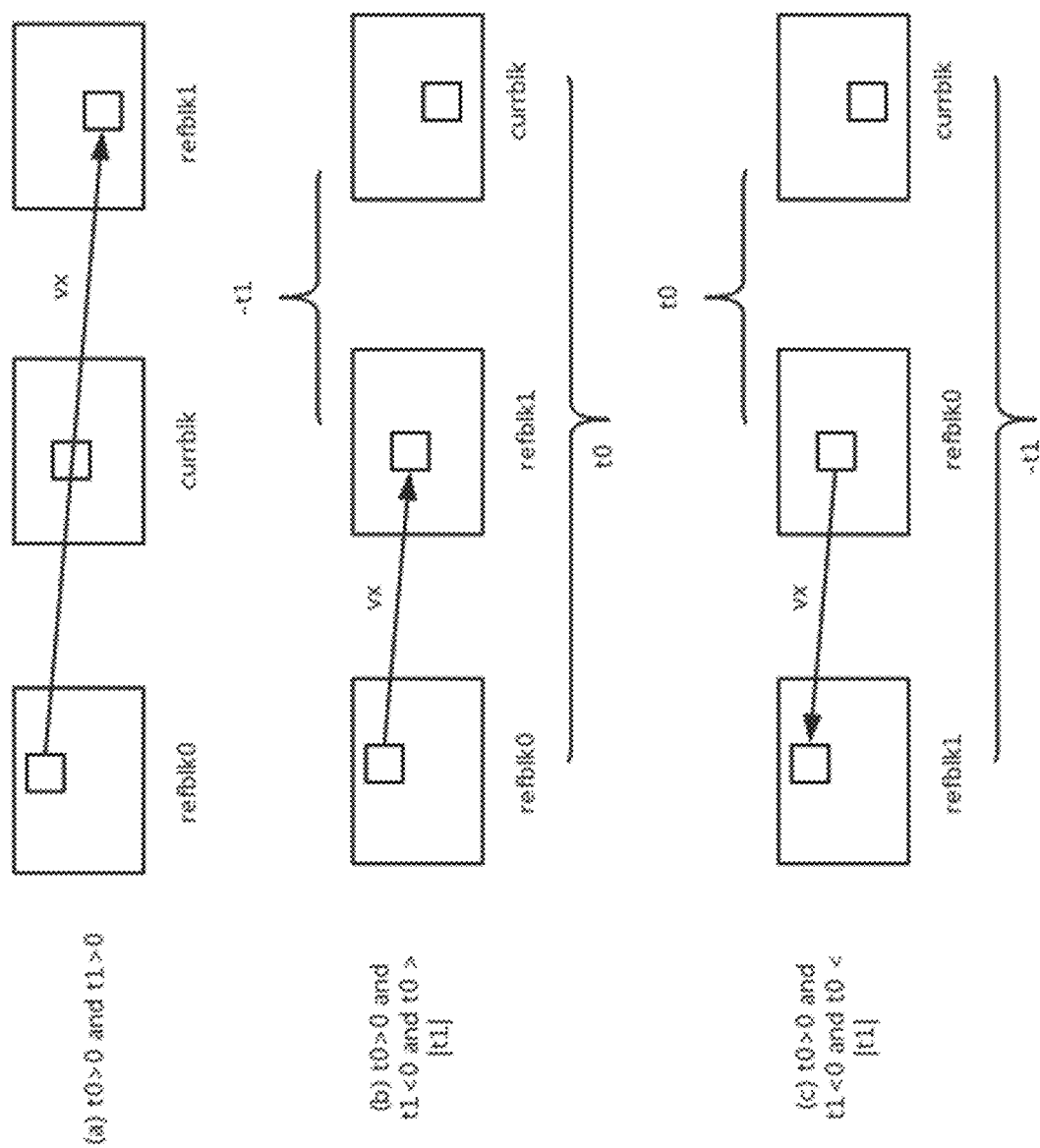
FIG. 25 shows different examples of motion vector scaling.

(b) $mvL0'_x=-SF_0*v_x+mvL0_x$, $mvL0'_y=-v_y*SF_0+mvL0_y$, and/or $mvL1'_x=-SF_1*v_x+mvL1_x$, $mvL1_y=SF_1*v_y mvL1_y$. In one example, $SF_0$ is set to 2, and/or $SF_1$ is set to 1. In one example, it is invoked under certain conditions, such as $\tau_0>0$ and $\tau_1<0$ and $\tau_0>|\tau_1|$ as shown in FIG. 25(b).

(c) $mvL0'_x=SFACT_0*v_x+mvL0_x$, $mvL0'_y=SFACT_0*v_y+mvL0_y$, and/or $mvL1'_x=SFACT_1*v_x+mvL1_x$, $mvL1'_y=SFACT_1*v_y+mvL1_y$. In one example, $SFACT_0$ is set to 1, and/or $SFACT_1$ is set to 2. In one example, it is invoked under certain conditions, such as $\tau_0>0$ and $\tau_1<0$ and $\tau_0<\bigstar\tau_1|$ as shown in FIG. 25(c).

Example 3. Derivation of $(v_x, v_y)$ and update of $(mvLX_x, mvLX_y)$ may be done together when $\tau_0>0$ and $\tau_1>0$ to keep high precision.

(a) In one example, if $(v_x, v_y)$ needs to be right-shifted (i.e., scaled to a lower precision) by N to achieve the same precision with $(mvLX_x, mvLX_y)$, then $mvL0'_x=((-v_x+\text{offset})>>(N+1))+mvL0_x$, $mvL0'_y=((-v_y+\text{offset})>>(N+1))+mvL0_y$, $mvL1'x=((v_x+\text{offset})>>(N+1))+mvL1_x$, $mvL1'_y=((v_y+\text{offset})>>(N+1))+mvL1_y$, wherein, for example, offset=1<<N.

(b) In one example, if $(v_x, v_y)$ needs to be right-shifted (i.e., scaled to a lower precision) by N to achieve the same precision with $(mvLX_x, mvLX_y)$, $mvL0'_x=((-v_x+\text{offset})>>(N+K+1))+mvL0_x$, $mvL0'_y=((-v_y+\text{offset})>>(N+K+1))+mvL0_y$, $mvL1'_x=((v_x+\text{offset})>>(N+K+1))+mvL1_x$, $mvL1'_y=((v_y \text{ offset})>>(N+K+1))+mvL1_y$, wherein, for example, offset=1<<(N+K). K is an integer number, for example, K is equal to 1, 2, 3, −2, −1 or 0.

(c) Alternatively, $mvL0_x=-\text{sign}(v_x)*((\text{abs}(v_x)+\text{offset})>>(N+1))+mvL0_x$, $mvL0'_y=-\text{sign}(v_y)*((\text{abs}(v_y)+\text{offset})>>(N+1))+mvL0_y$, $mvL1'_x=\text{sign}(v_x)*((\text{abs}(v_x)+\text{offset})>>(N+1))+mvL1_x$, $mvL1'_y=\text{sign}(v_y)*((\text{abs}(v_y)+\text{offset})>>(N+1))+mvL1_y$.

(d) Alternatively, $mvL0'_x=-\text{sign}(v_x)*((\text{abs}(v_x)+\text{offset})>>(N+K+1))+mvL0_x$, $mvL0'_y=-\text{sign}(v_y)*((\text{abs}(v_y)+\text{offset})>>(N+K+1))+mvL0_y$, $mvL1'_x=\text{sign}(v_x)*((\text{abs}(v_x)+\text{offset})>>(N+K+1))+mvL1_x$, $mvL1'_y=\text{sign}(v_y)*((\text{abs}(v_y)+\text{offset})>>(N+K+1))+mvL1_y$, wherein, for example, offset=1<<(N+K). K is an integer, for example, K is equal to 1, 2, 3, −2, −1 or 0.

Example 4. Clipping operations may be further applied to the updated MVs employed in BIO and/or DMVR or other kinds of coding methods that may require MVs to be updated.

(a) In one example, updated MVs are clipped in the same way other conventional MVs, e.g., clipped to be within a certain range compared to picture boundaries.

(b) Alternatively, updated MVs are clipped to be within a certain range (or multiple ranges for different sub-blocks) compared to the MVs used in MC process. That is, the differences between the MV used in MC and updated MVs are clipped to be within a certain range (or multiple ranges for different sub-blocks).

Example 5. Usage of the updated MV invoked in BIO and/or other kinds of coding methods that may require MVs to be updated may be constrained.

(a) In one example, the updated MV is used for future motion prediction (like in AMVP, merge and/or affine mode), deblocking, OBMC etc. Alternatively, updated MVs may be used for a first module but original MVs may be used for a second module. For example, the first module is motion prediction, and the second module is deblocking.

(i) In one example, future motion prediction refers to motion prediction in blocks to be coded/decoded after the current block in the current picture or slice.

(ii) Alternatively, future motion prediction refers to motion prediction in pictures or slices to be coded/decoded after the current picture or slice.

(b) Alternatively, the updated MV can only be used in motion prediction of its non-immediately following CU/PUs in decoding order.

(c) The updated MV shall not be used in motion prediction of its next CU/PUs in decoding order.

(d) Alternatively, the updated MV can only be used as predictors for coding subsequent pictures/tiles/slices, such as TMVP in AMVP, and/or merge and/or affine mode.

(e) Alternatively, the updated MV can only be used as predictors for coding subsequent pictures/tiles/slices, such as ATMVP and/or STMVP, etc. al.

Example 6. In one example, a two-step inter-prediction process is proposed wherein the first step is performed to generate some intermediate predictions (first predictions) based on the signaled/derived motion information associated with the current block and the second step is performed to derive final predictions of the current block (second predictions) based on updated motion information which may rely on the intermediate predictions.

(a) In one example, the BIO procedure (i.e., using signaled/derived motion information which is used to generate the first predictions and the spatial gradient, the temporal gradient and the optical flow of each sub-block/pixel within the block) is only used to derive the updated MV as specified in Example 1 (and Eq. (7) is not applied to generate the second prediction), and the updated MV is then used to perform motion compensation and generate the second prediction (i.e., the final prediction) of each sub-block/pixel within the block.

(b) In one example, different interpolation filters from those used for inter-coded blocks which are not coded with such a method may be used in the first or/and the second steps to reduce the memory bandwidth.
  (i) In one example, shorter-tap filters (like 6-tap filters, 4-tap filters or bilinear filters) may be used.
  (ii) Alternatively, the filters (such as filter taps, filter coefficients) utilized in the first/second steps may be pre-defined.
  (iii) Alternatively, furthermore, the selected filter tap for the first and/or second step may depend on coded information, such as block sizes/block shapes (square, non-square, etc. al)/slice types/prediction directions (uni or bi-prediction or multiple-hypothesis, forward or backward).
  (iv) Alternatively, furthermore, different block may choose different filters for the first/second steps. In one example, one or more candidate sets of multiple filters may be pre-defined or signaled. A block may select from the candidate sets. The selected filter may be indicated by a signaled index or may be derived on-the-fly without being signaled.
(c) In one example, only integer MV are used when generating the first predictions and interpolation filter process is not applied in the first step.
  (i) In one example, a fractional MV is rounded to the closest integer MV.
    (1) If there is more than one closest integer MV, the fractional MV is rounded to the smaller closest integer MV.
    (2) If there is more than one closest integer MV, the fractional MV is rounded to the larger closest integer MV.
    (3) If there is more than one closest integer MV, the fractional MV is rounded to the closest MV closer to zero.
  (ii) In one example, the fractional MV is rounded to the closest integer MV that is no smaller than the fractional MV.
  (iii) In one example, the fractional MV is rounded to the closest integer MV that is no larger than the fractional MV.
(d) Usage of such a method may be signaled in SPS, PPS, Slice header, CTUs or CUs or group of CTUs.
(e) Usage of such a method may further depend on coded information, such as block sizes/block shapes (square, non-square, etc. al)/slice types/prediction directions (uni or bi-prediction or multiple-hypothesis, forward or backward).
  (i) In one example, such a method may be automatically disallowed under certain conditions, for example, it may be disabled when the current block is coded with the affine mode.
  (ii) In one example, such a method may be automatically applied under certain conditions, such as when the block is coded with bi-prediction and block size is larger than a threshold (e.g., more than 16 samples).

Example 7. In one example, it is proposed that before calculating the temporal gradient in BIO, a reference block (or a prediction block) may be modified firstly, and the calculation of temporal gradient is based on the modified reference block.
  (a) In one example, mean is removed for all reference blocks.
    (i) For example, for reference block X with X=0 or 1, first, mean (denoted by MeanX) is calculated for the block, then each pixel in the reference block is subtracted by MeanX.
    (ii) Alternatively, for different reference picture list, it may decide whether to remove the mean or not. For example, for one reference block/sub-block, mean is removed before calculating temporal gradients, while for another one, mean is not removed.
    (iii) Alternatively, different reference blocks (e.g., 3 or 4 reference blocks utilized in multiple hypothesis prediction) may select whether to be modified firstly or not.
  (b) In one example, mean is defined as the average of selected samples in the reference block.
  (c) In one example, all pixels in a reference block X or a sub-block of the reference block X are used to calculate MeanX.
  (d) In one example, only partial pixels in a reference block X or a sub-block of the reference block are used to calculate MeanX. For example, only pixels in every second row/column are used.
    (i) Alternatively, and in an example, only pixels in every fourth row/column are used to calculate MeanX.
    (ii) Alternatively, only four corner pixels are used to calculate MeanX.
    (iii) Alternatively, only four corner pixels and the center pixel, for example, pixel at position (W/2, H/2) wherein WxH is the reference block size, are used to calculate MeanX.
  (e) In one example, reference blocks may be firstly filtered before being used to derive temporal gradients.
    (i) In one example, smooth filtering methods may be first applied to reference blocks.
    (ii) In one example, the pixels at block boundaries are first filtered.
    (iii) In one example, Overlapped Block Motion Compensation (OBMC) is first applied before deriving temporal gradients.
    (iv) In one example, Illumination Compensation (IC) is first applied before deriving temporal gradients.
    (v) In one example, weighted prediction is first applied before deriving temporal gradients.
  (f) In one example, temporal gradient is calculated first and then is modified. For example, temporal gradient is further subtracted by the difference between Mean0 and Mean1.

Example 8. In one example, whether to update MV for BIO coded blocks and/or use updated MV for future motion prediction and/or how to use updated MV for future motion prediction may be signaled from the encoder to the decoder, such as in Video Parameter Set (VPS), Sequence Parameter Set (SPS), Picture Parameter Set (PPS), Slice header, CTUs or CUs.

Example 9. In one example, it is proposed to add a constraint to motion vectors utilized in the BIO process.
  (a) In one example, $(v_x, v_y)$ are constrained to given ranges, $-M_x < v_x < N_x$, and/or $-M_y < v_y < N_y$, wherein $M_x$, $N_x$, $M_y$, $N_y$ are none-negative integers, and may be equal to 32, for example.
  (b) In one example, updated MVs of a BIO-coded sub-block/a BIO-coded block are constrained to given ranges, such as $-M_{L0x} < mvL0'_x < N_{L0x}$ and/or $-M_{L1x} < mvL1'_x < N_{L1x}$, $-M_{L0y} < mvL0'_y < N_{L0y}$ and/or $-M_{L1y} < mvL1'_y < N_{L1y}$, wherein $M_{L0x}$, $N_{L0x}$, $M_{L1x}$, $N_{L1x}$, $M_{L0y}$, $N_{L0y}$, $M_{L1y}$, $N_{L1y}$, are none-negative integers, and may be equal to 1024, 2048 and so on, for example.

Figure 26A:
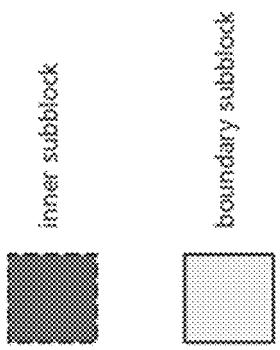
FIGS. 26A and 26B show examples of inner and boundary sub-blocks in a PU/CU.
Figure 26A:
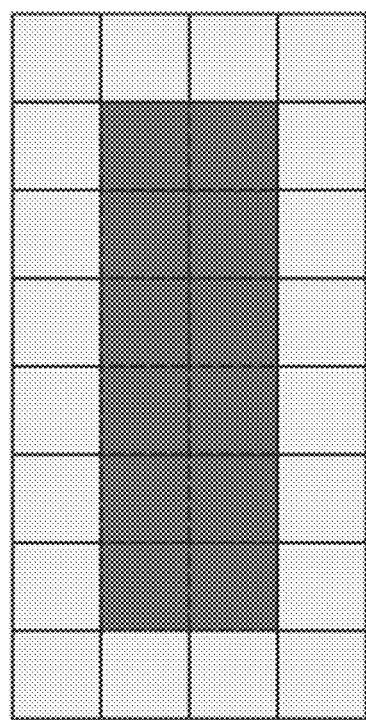
Figure 26B:
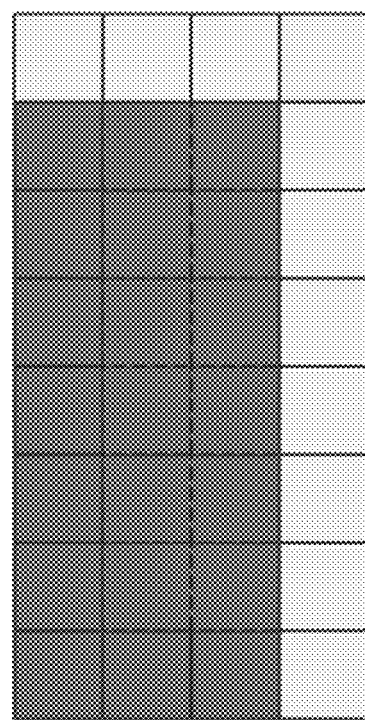

Example 10. It is proposed that for BIO, DMVR, FRUC, template matching or other methods that require to update MV (or motion information including MV and/or reference pictures) from those derived from the bitstream, usage of the updated motion information may be constrained.
- (a) In one example, even if motion information is updated at block level, updated and non-updated motion information may be stored differently for different sub-blocks. In one example, the updated motion information of some subblocks may be stored and for the other remaining subblocks, the non-updated motion information are stored.
- (b) In one example, if MV (or motion information) is updated at subblock/block level, the updated MV are only stored for inner subblocks, i.e., subblocks that are not at PU/CU/CTU boundary, and are then used for motion prediction, deblocking, OBMC etc. as shown in FIGS. 26A and 26B. Alternatively, the updated MV are only stored for boundary subblocks.
- (c) In one example, the updated motion information from a neighbouring block is not used if the neighbouring block and the current block are not in the same CTU or the same region with a size such as 64×64 or 32×32.
  - (i) In one example, a neighbouring block is treated as "unavailable" if the neighbouring block and the current block are not in the same CTU or the same region with a size such as 64×64 or 32×32.
  - (ii) Alternatively, the motion information without the updating process is used by the current block if the neighbouring block and the current block are not in the same CTU or the same region with a size such as 64×64 or 32×32.
- (d) In one example, the updated MVs from a neighbouring block are not used if the neighbouring block and the current block are not in the same CTU row or the same row of regions with a size such as 64×64 or 32×32.
  - (i) In one example, a neighbouring block is treated as "unavailable" if the neighbouring block and the current block are not in the same CTU row or the same row of regions with a size such as 64×64 or 32×32.
  - (ii) Alternatively, the motion information without the updating process is used by the current block if the neighbouring block and the current block are not in the same CTU row or the same row of regions with a size such as 64×64 or 32×32.
- (e) In one example, the motion information of a block is not updated if the bottom-most row of the block is the bottom-most row of a CTU or a region of a size such as 64×64 or 32×32.
- (f) In one example, the motion information of a block is not updated if the right-most column of the block is the right-most column of a CTU or a region of a size such as 64×64 or 32×32.
- (g) In one example, refined motion information from some neighboring CTU or region are used for the current CTU, and unrefined motion information from other neighboring CTU or regions are used for the current CTU.
  - (i) In one example, refined motion information from left CTU or left region are used for current CTU.
  - (ii) Alternatively, in addition, refined motion information from top-left CTU or top-left region are used for current CTU.
  - (iii) Alternatively, in addition, refined motion information from top CTU or top region are used for current CTU.
  - (iv) Alternatively, in addition, refined motion information from top-right CTU or top-right region are used for current CTU.
  - (v) In one example, region is of size such as 64×64 or 32×32.

Example 11. In one example, it is proposed that different MVD precisions maybe used in AF_INTER mode and a syntax element may be signaled to indicate the MVD precision for each block/CU/PU.
- (a) In one example, {¼, 1, 4} pel MVD precision are allowed.
- (b) In one example, {¼, ½, 1, 2, 4} pel MVD precision are allowed.
- (c) In one example, {1/16, ⅛, ¼} pel MVD precision are allowed.
- (d) The syntax element is present under further conditions, such as when there is non-zero MVD component of the block/CU/PU.
- (e) In one example, the MVD precision information is always signaled regardless whether there is any non-zero MVD component or not.
- (f) Alternatively, for 4/6-paramter AF_INTER mode wherein ⅔ MVDs are encoded, different MVD precisions may be used for the ⅔ MVDs, (1 MVD for each control point in uni-prediction and 2 MVDs for each control point in bi-prediction, i.e., 1 MVD for each control point in each prediction direction), and the ⅔ control points are associated with different MVD precisions. In this case, furthermore, ⅔ syntax elements may be signaled to indicate the MVD precisions.
- (g) In one example, the methods described in PCT/CN2018/091792 may be used for coding the MVD precisions in AF_INTER mode.

Example 12. In one example, it is proposed that different Decoder-side Motion Vector Derivation (DMVD) methods like BIO, DMVR, FRUC and template matching etc. work independently if more than one DMVD methods are performed for a block (e.g., PU), i.e., the input of a DMVD method does not depend on the output of another DMVD method.
- (a) In one example, furthermore, one prediction block and/or one set of updated motion information (e.g., motion vector and reference picture for each prediction direction) are generated from the multiple sets of motion information derived by the multiple DMVD methods.
- (b) In one example, motion compensation is performed using the derived motion information of each DMVD method, and they are averaged or weighted averaged or filtered (like by median filter) to generate the final prediction.
- (c) In one example, the derived motion information of all DMVD methods are averaged or weighted averaged or filtered (like by median filter) to generate the final motion information. Alternatively, different priorities are assigned to different DMVD methods, and motion information derived by the method with the highest priority is selected as the final motion information. For example, when both BIO and DMVR are performed for a PU, then motion information generated by DMVR is used as the final motion information.
- (d) In one example, no more than N DMVD method are allowed for a PU, wherein N>=1.

(i) Different priorities are assigned to different DMVD methods, and the methods that are valid and are with the highest N priority are performed.

(e) The DMVD methods are performed in a simultaneous way. The updated MV of one DMVD method is not input as the start-point of the next DMVD method. For all DMVD methods, the non-updated MV is input as the searching start-point. Alternatively, the DMVD methods are performed in a cascade way. The updated MV of one DMVD method is input as the searching start-point of the next DMVD method.

Additional Embodiments

This section describes the way of MV refinement and stored for future usage of BIO coded blocks. The refined MVs may be used for motion vector prediction of following blocks within current slice/CTU row/tile, and/or filtering process (e.g., deblocking filter process) and/or motion vector prediction for blocks located at different pictures.

Figure 32:
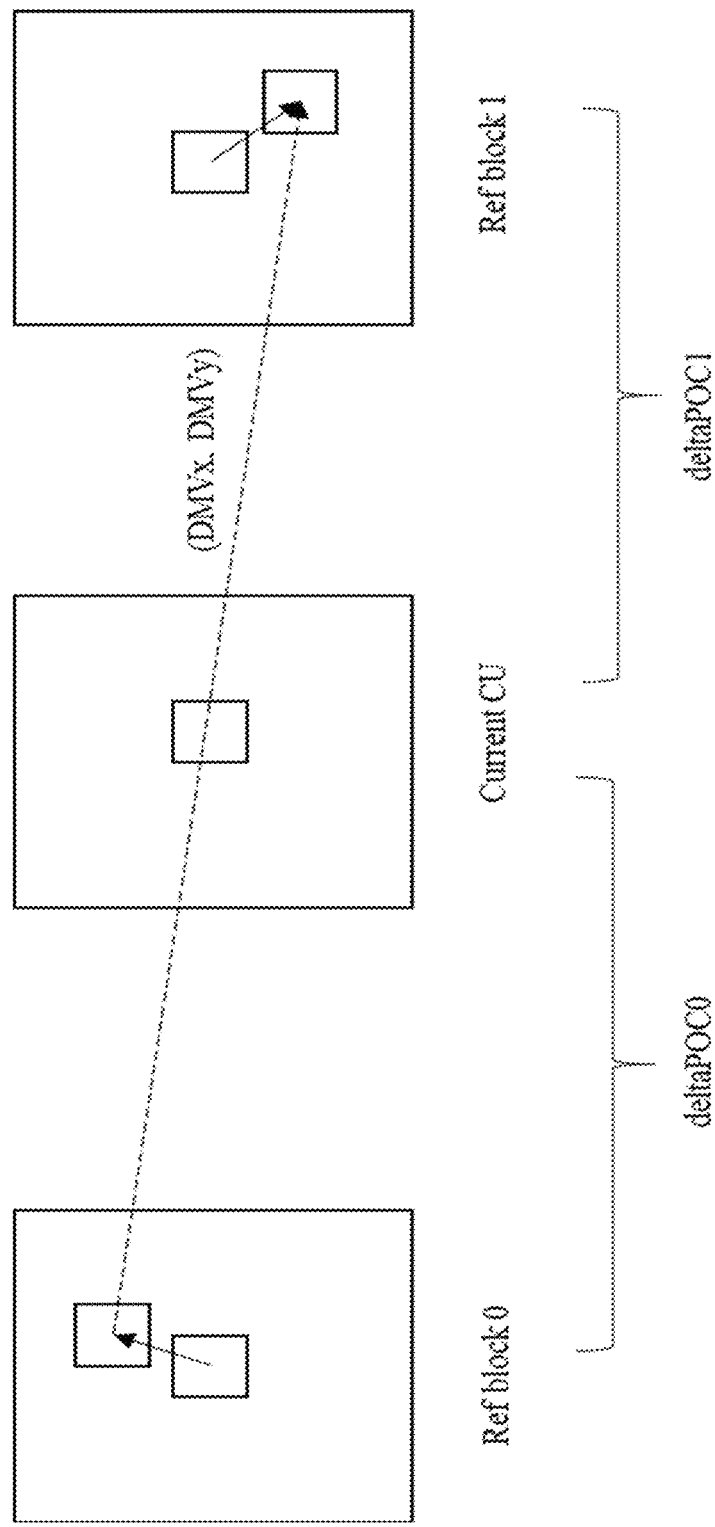
FIG. 32 shows an example of deriving motion vector in bi-directional optical flow based video encoding.

As depicted in FIG. 32, the derived motion vector, pointing from the sub-block in reference block 0 to the sub-block in reference block 1, denoted by ($DMV_x$, $DMV_y$), is used to further improve prediction of the current sub-block.

It is proposed to further refine the motion vector of each sub-block by using the derived motion vector in BIO. Denote the POC distance (e.g., absolute POC difference) between the LX reference picture and the current picture as deltaPOCX, and denote ($MVLX_x$, $MVLX_y$) and ($MVLX_x'$, $MVLX_y'$) as the signaled and refined motion vector of the current sub-block, with X=0 or 1. Then ($MVLX_x'$, $MVLX_y'$) is calculated as follows:

$$MVL0_x' = MVL0_x - \frac{deltaPOC0 * DMV_x}{(deltaPOC0 + deltaPOC1)}$$

$$MVL0_y' = MVL0_y - \frac{deltaPOC0 * DMV_y}{(deltaPOCX + deltaPOC1)}$$

$$MVL1_x' = MVL1_x + \frac{deltaPOC1 * DMV_x}{(deltaPOC0 + deltaPOC1)}$$

$$MVL1_y' = MVL1_y + \frac{deltaPOC1 * DMV_y}{(deltaPOCX + deltaPOC1)}$$

However, multiplication and division are required in the above equations. To address this issue, derivation of the refined motion vector is simplified as follows:

MVL0'$_x$=MVLX$_x$−((DMV$_x$+1)>>1)

MVL0'$_y$=MVL0$_y$−((DMV$_y$+1)>>1)

MVL1'$_x$=MVL1$_x$+((DMV$_x$+1)>>1)

MVL1'$_y$=MVL1$_y$+((DMV$_y$+1)>>1)

In some embodiments, this method is employed only when the current CU is predicted from a preceding picture and a following picture, and therefore only works in the Random Access (RA) configuration.

Example 13. The proposed method may be applied under certain conditions, such as block sizes, slice/picture/tile types.

(a) In one example, when a block size contains smaller than M*H samples, e.g., 16 or 32 or 64 luma samples, the above methods are not allowed.

(b) Alternatively, when minimum size of a block's width or height is smaller than or no larger than X, the above methods are not allowed. In one example, X is set to 8.

(c) Alternatively, when a block's width>th1 or >=th1 and/or a block's height>th2 or >=th2, the above methods are not allowed. In one example, X is set to 8.

(d) Alternatively, when a block's width<th1 or <=th1 and/or a block's height<th2 or <a=th2, the above methods are not allowed. In one example, X is set to 8.

Example 14. The above methods may be applied in a sub-block level.

(a) In one example, the BIO updating process, or a two-step inter prediction process or a temporal gradient derivation method described in Example 7, may be invoked for each sub-block.

(b) In one example, when a block with either width or height or both width and height are both larger than (or equal to) a threshold L, the block may be split into multiple sub-blocks. Each sub-block is treated in the same way as a normal coding block with size equal to the sub-block size.

Example 15. The threshold may be pre-defined or signaled in SPS/PPS/picture/slice/tile level.

(a) Alternatively, the thresholds may be depend on certain coded information, such as block size, picture type, temporal layer index, etc.

The examples described above may be incorporated in the context of the methods described below, e.g., methods 2700-3100, 3300-3600 and 3800-4200, which may be implemented at a video decoder.

Figure 27:
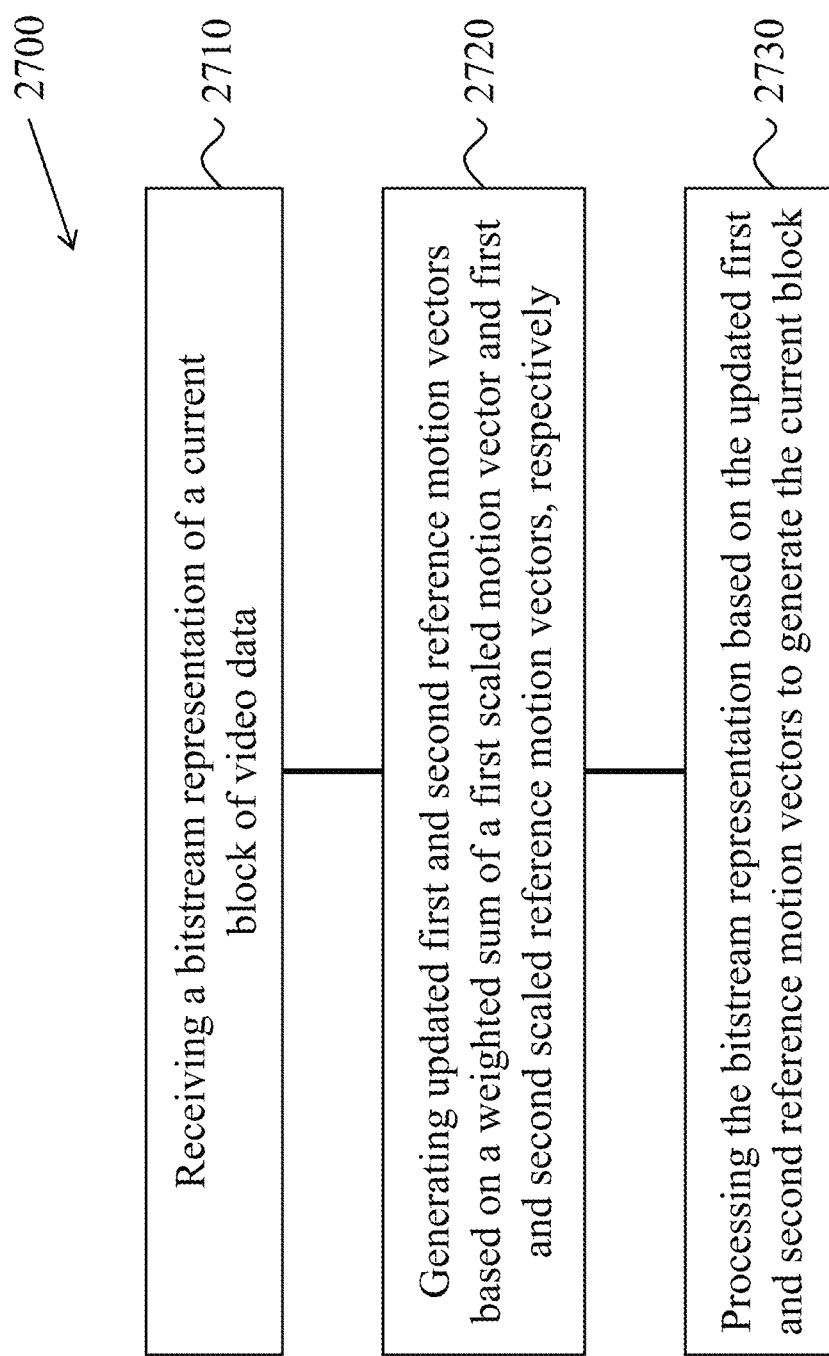
FIG. 27 shows a flowchart of an example method for video coding in accordance with the presently disclosed technology.

FIG. 27 shows a flowchart of an exemplary method for video decoding. The method 2700 includes, at step 2710, receiving a bitstream representation of a current block of video data.

The method 2700 includes, at step 2720, generating updated first and second reference motion vectors based on a weighted sum of a first scaled motion vector and first and second scaled reference motion vectors, respectively. In some embodiments, the first scaled motion vector is generated by scaling a first motion vector to a target precision, and wherein the first and second scaled reference motion vectors are generated by scaling first and second reference motion vectors to the target precision, respectively. In some embodiments, the first motion vector is derived based on the first reference motion vector from a first reference block and the second reference motion vector from a second reference block, and where the current block is associated with the first and second reference blocks.

In some embodiments, an indication of the target precision is signaled in a Video Parameter Set (VPS), a Sequence Parameter Set (SPS), a Picture Parameter Set (PPS), a slice header, a coding tree unit (CTU) or a coding unit (CU).

In some embodiments, the first motion vector has a first precision and the first and second reference motion vectors have a reference precision. In other embodiments, the first precision may be higher or lower than the reference precision. In yet other embodiments, the target precision may be set to either the first precision, the reference precision or a fixed (or predetermined) precision regardless of the first and reference precisions.

In some embodiments, the first motion vector is derived based on a bi-directional optical flow (BIO) refinement using the first and second reference motion vectors.

The method 2700 includes, at step 2730, processing the bitstream representation based on the updated first and second reference motion vectors to generate the current block. In some embodiments, the processing is based on a bi-directional optical flow (BIO) refinement or a decoder-side motion vector refinement (DMVR), and wherein the updated first and second reference motion vectors are clipped prior to the processing.

In some embodiments, the processing is based on a bi-directional optical flow (BIO) refinement, and the updated first and second reference motion vectors are constrained to a predetermined range of values prior to the processing.

In some embodiments, the processing is based on a bi-directional optical flow (BIO) refinement, a decoder-side motion vector refinement (DMVR), frame-rate up conversion (FRUC) techniques or a template matching technique. In one example, the updated first and second reference motion vectors are generated for inner sub-blocks that are not on a boundary of the current block. In another example, the updated first and second reference motion vectors are generated for a subset of sub-blocks of the current block.

In some embodiments, the processing is based on at least two techniques, which may include a bi-directional optical flow (BIO) refinement, a decoder-side motion vector refinement (DMVR), frame-rate up conversion (FRUC) techniques or a template matching technique. In one example, the processing is performed for each of the at least two techniques to generate multiple sets of results, which may be averaged or filtered to generate the current block. In another example, the processing is performed in a cascaded manner for each of the at least two techniques to generate the current block.

Figure 28:
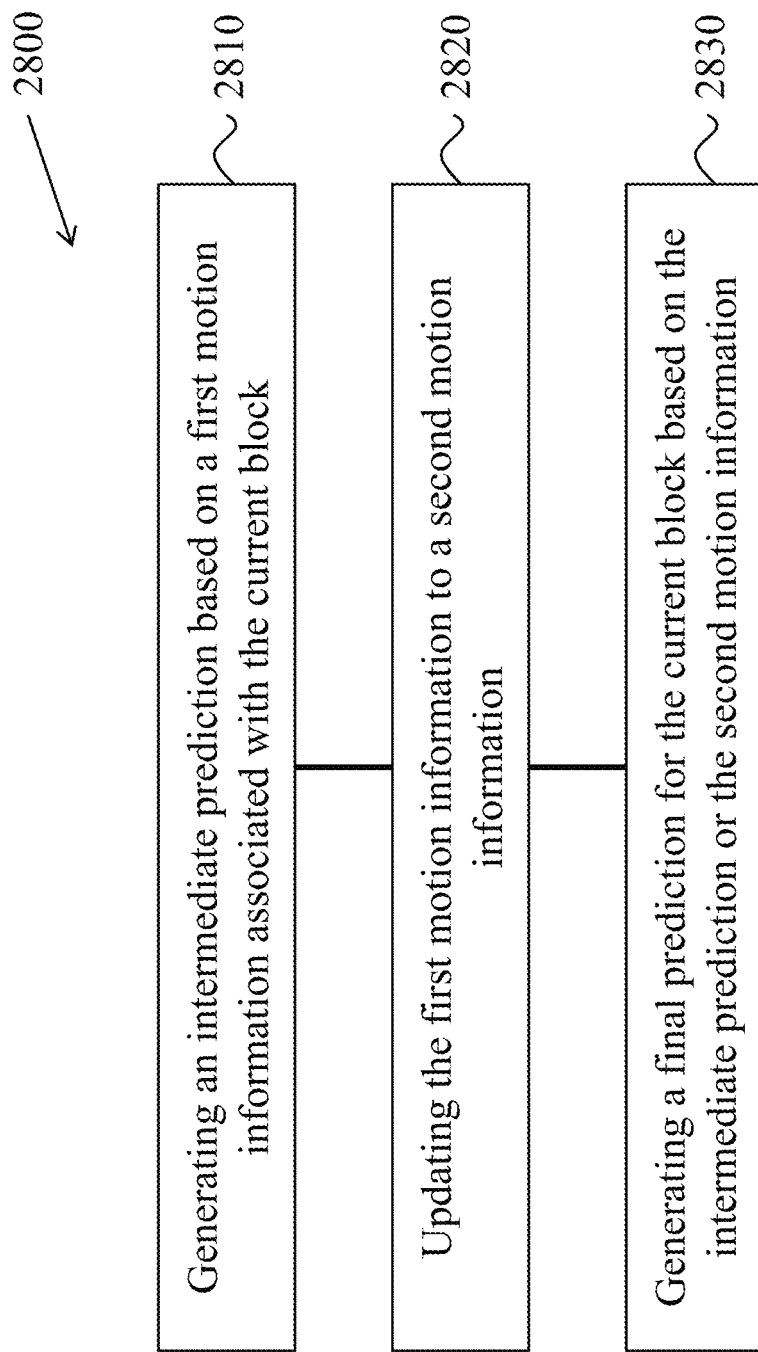
FIG. 28 shows a flowchart of another example method for video coding in accordance with the presently disclosed technology.

FIG. 28 shows a flowchart of an exemplary method for video decoding. The method 2800 includes, at step 2810, generating, for a current block, an intermediate prediction based on a first motion information associated with the current block. In some embodiments, generating the intermediate prediction comprises a first interpolation filtering process. In some embodiments, the generating the intermediate prediction is further based on signaling in a sequence parameter set (SPS), a picture parameter set (PPS), a coding tree unit (CTU), a slice header, a coding unit (CU) or a group of CTUs.

The method 2800 includes, at step 2820, updating the first motion information to a second motion information. In some embodiments, updating the first motion information comprises using a bi-directional optical flow (BIO) refinement.

The method 2800 includes, at step 2830, generating a final prediction for the current block based on the intermediate prediction or the second motion information. In some embodiments, generating the final prediction comprises a second interpolation filtering process.

In some embodiments, the first interpolation filtering process uses a first set of filters that are different from a second set of filters used by the second interpolation filtering process. In some embodiments, at least one filter tap of the first or second interpolation filtering process is based on a dimension, a prediction direction, or a prediction type of the current block.

Figure 29:
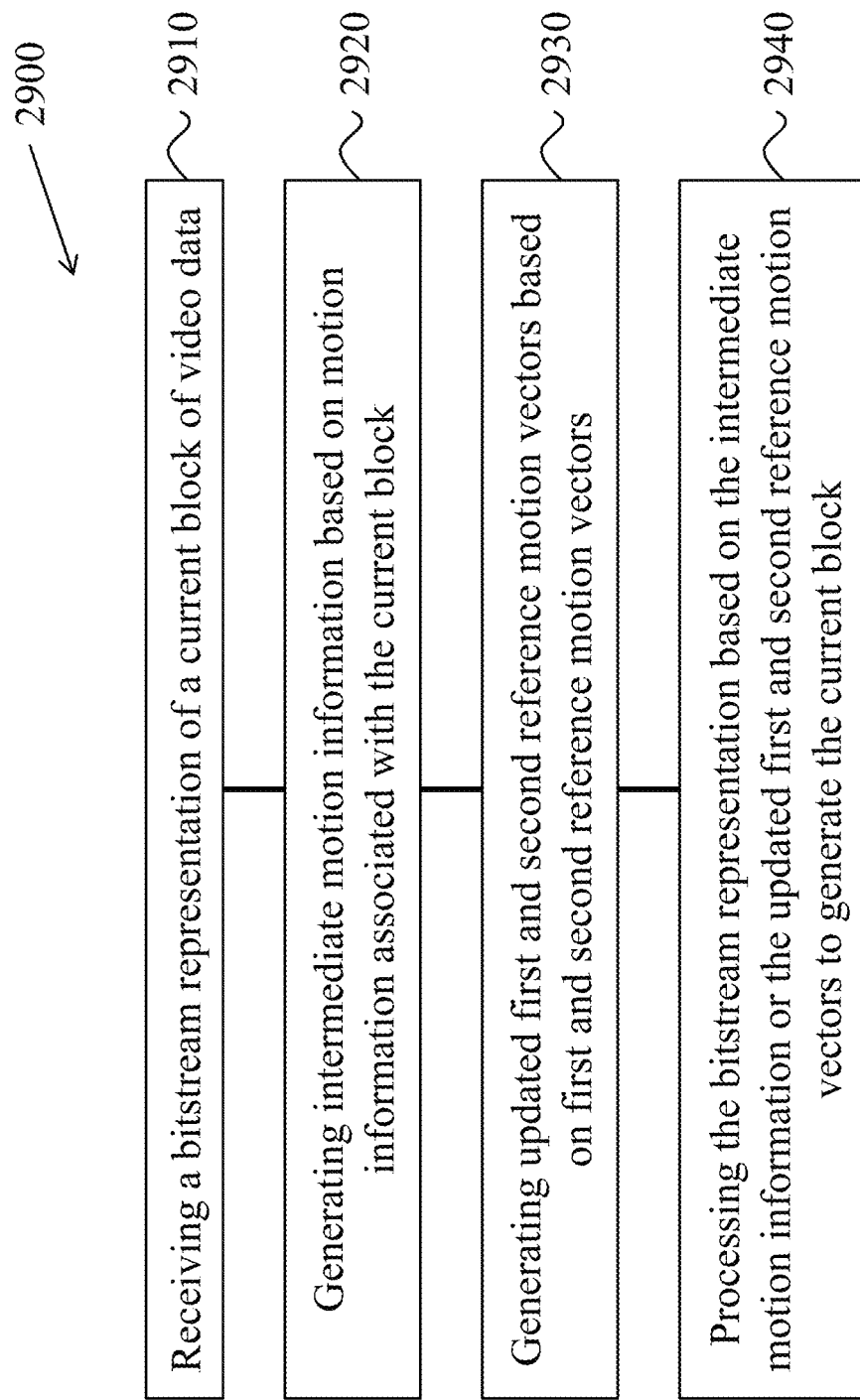
FIG. 29 shows a flowchart of another example method for video coding in accordance with the presently disclosed technology.

FIG. 29 shows a flowchart of another exemplary method for video decoding. This example includes some features and/or steps that are similar to those shown in FIG. 28, and described above. At least some of these features and/or components may not be separately described in this section.

The method 2900 includes, at step 2910, receiving a bitstream representation of a current block of video data. In some embodiments, step 2910 includes receiving the bitstream representation from a memory location or buffer in a video encoder or decoder. In other embodiments, step 2910 includes receiving the bitstream representation over a wireless or wired channel at a video decoder. In yet other embodiments, step 2910 include receiving the bitstream representation from a different module, unit or processor, which may implement one or more methods as described in, but not limited to, the embodiments in the present document.

The method 2900 includes, at step 2920, generating intermediate motion information based on motion information associated with the current block.

The method 2900 includes, at step 2930, generating updated first and second reference motion vectors based on first and second reference motion vectors, respectively. In some embodiments, the current block is associated with first and second reference blocks. In some embodiments, the first and second reference motion vectors are associated with the first and second reference blocks, respectively.

The method 2900 includes, at step 2940, processing the bitstream representation based on the intermediate motion information or the updated first and second reference motion vectors to generate the current block.

In some embodiments of method 2900, the generating the updated first and second reference motion vectors is based on a weighted sum of a first scaled motion vector and first and second scaled reference motion vectors, respectively. In some embodiments, a first motion vector is derived based on the first reference motion vector and the second reference motion vector, the first scaled motion vector is generated by scaling the first motion vector to a target precision, and the first and second scaled reference motion vectors are generated by scaling the first and second reference motion vectors to the target precision, respectively.

In some embodiments, an indication of the target precision is signaled in a Video Parameter Set (VPS), a Sequence Parameter Set (SPS), a Picture Parameter Set (PPS), a slice header, a coding tree unit (CTU) or a coding unit (CU).

In some embodiments, the first motion vector has a first precision and the first and second reference motion vectors have a reference precision. In other embodiments, the first precision may be higher or lower than the reference precision. In yet other embodiments, the target precision may be set to either the first precision, the reference precision or a fixed (or predetermined) precision regardless of the first and reference precisions.

In some embodiments, the first motion vector is derived based on a bi-directional optical flow (BIO) refinement using the first and second reference motion vectors.

In some embodiments, the processing is based on a bi-directional optical flow (BIO) refinement, and the updated first and second reference motion vectors are constrained to a predetermined range of values prior to the processing.

In some embodiments, the processing is based on a bi-directional optical flow (BIO) refinement or a decoder-side motion vector refinement (DMVR), and wherein the updated first and second reference motion vectors are clipped prior to the processing.

In some embodiments, the processing is based on a bi-directional optical flow (BIO) refinement, a decoder-side motion vector refinement (DMVR), frame-rate up conversion (FRUC) techniques or a template matching technique. In one example, the updated first and second reference motion vectors are generated for inner sub-blocks that are not on a boundary of the current block. In another example, the updated first and second reference motion vectors are generated for a subset of sub-blocks of the current block.

In some embodiments, the processing is based on at least two techniques, which may include a bi-directional optical flow (BIO) refinement, a decoder-side motion vector refinement (DMVR), frame-rate up conversion (FRUC) techniques or a template matching technique. In one example, the processing is performed for each of the at least two techniques to generate multiple sets of results, which may be averaged or filtered to generate the current block. In another example, the processing is performed in a cascaded manner for each of the at least two techniques to generate the current block.

Figure 30:
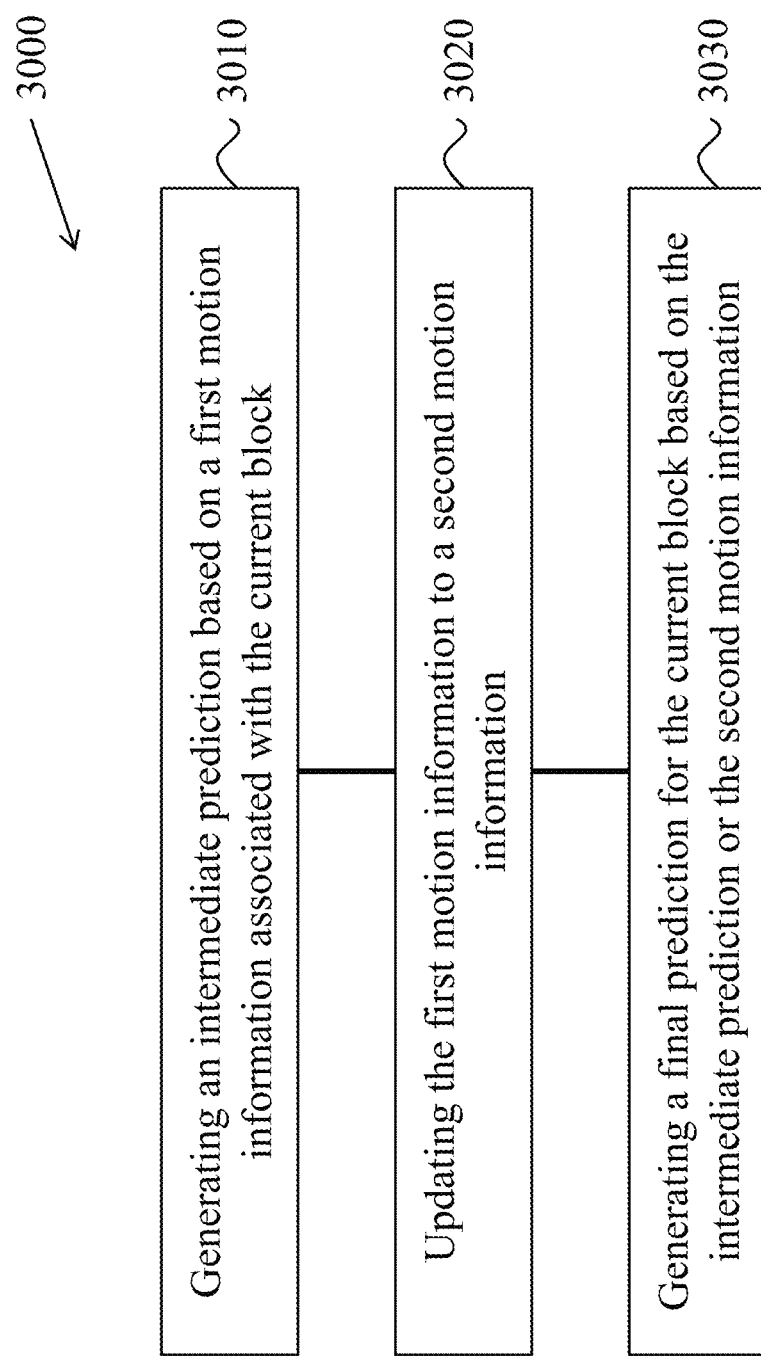
FIG. 30 shows a flowchart of another example method for video coding in accordance with the presently disclosed technology.

FIG. 30 shows a flowchart of an exemplary method for video decoding. The method 3000 includes, at step 3010, generating, for a current block, an intermediate prediction based on a first motion information associated with the current block. In some embodiments, generating the intermediate prediction comprises a first interpolation filtering process. In some embodiments, the generating the intermediate prediction is further based on signaling in a sequence parameter set (SPS), a picture parameter set (PPS), a coding tree unit (CTU), a slice header, a coding unit (CU) or a group of CTUs.

The method 3000 includes, at step 3020, updating the first motion information to a second motion information. In some embodiments, updating the first motion information comprises using a bi-directional optical flow (BIO) refinement.

The method 3000 includes, at step 3030, generating a final prediction for the current block based on the intermediate prediction or the second motion information. In some embodiments, generating the final prediction comprises a second interpolation filtering process.

In some embodiments, the first interpolation filtering process uses a first set of filters that are different from a second set of filters used by the second interpolation filtering process. In some embodiments, at least one filter tap of the first or second interpolation filtering process is based on a dimension, a prediction direction, or a prediction type of the current block.

Figure 31:
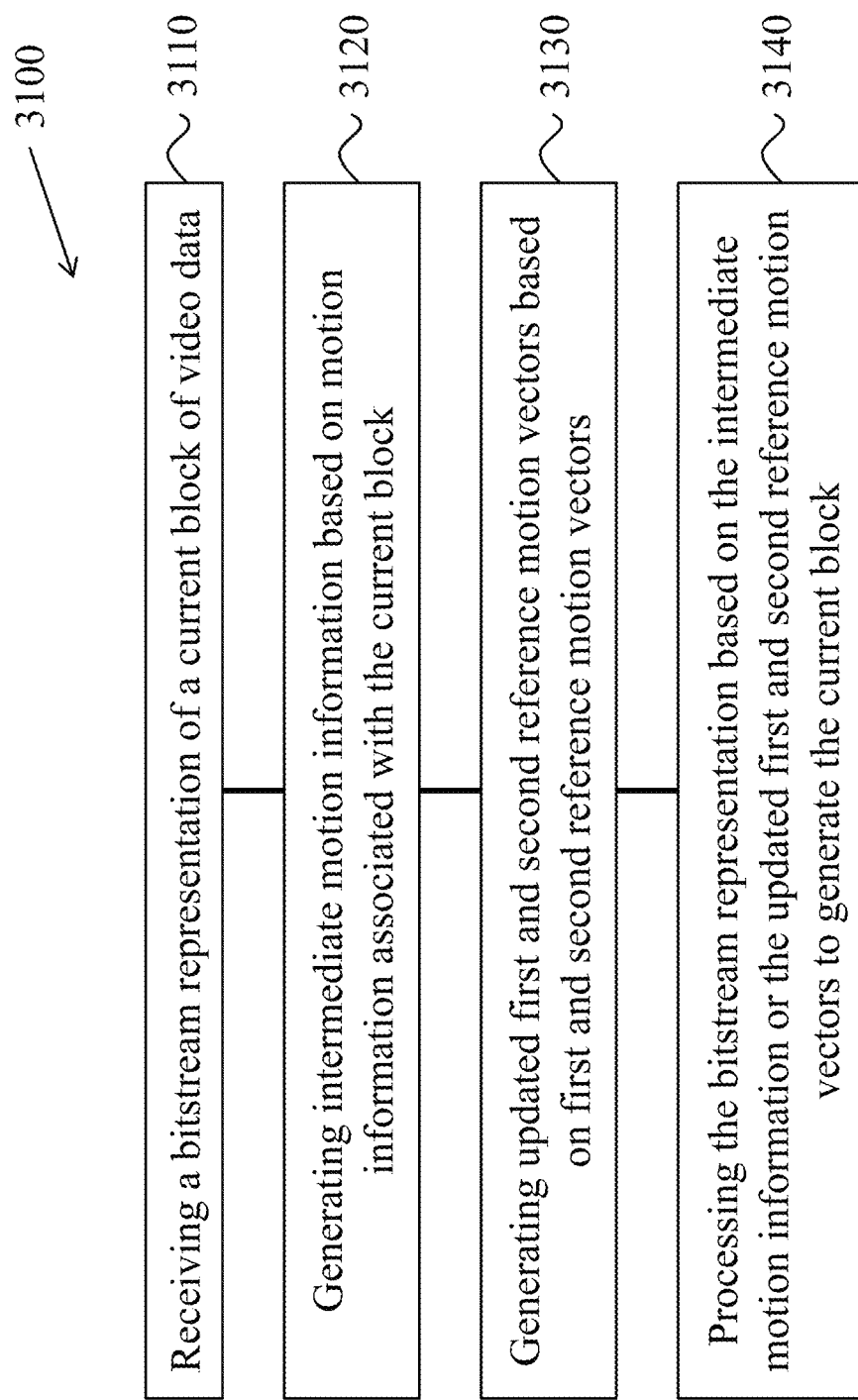
FIG. 31 shows a flowchart of another example method for video coding in accordance with the presently disclosed technology.

FIG. 31 shows a flowchart of another exemplary method for video decoding. This example includes some features and/or steps that are similar to those shown in FIG. 30, and described above. At least some of these features and/or components may not be separately described in this section.

The method 3100 includes, at step 3110, receiving a bitstream representation of a current block of video data. In some embodiments, step 3110 includes receiving the bitstream representation from a memory location or buffer in a video encoder or decoder. In other embodiments, step 3110 includes receiving the bitstream representation over a wireless or wired channel at a video decoder. In yet other embodiments, step 3110 include receiving the bitstream representation from a different module, unit or processor, which may implement one or more methods as described in, but not limited to, the embodiments in the present document.

The method 3100 includes, at step 3120, generating intermediate motion information based on motion information associated with the current block.

The method 3100 includes, at step 3130, generating updated first and second reference motion vectors based on first and second reference motion vectors, respectively. In some embodiments, the current block is associated with first and second reference blocks. In some embodiments, the first and second reference motion vectors are associated with the first and second reference blocks, respectively.

The method 3100 includes, at step 3140, processing the bitstream representation based on the intermediate motion information or the updated first and second reference motion vectors to generate the current block.

In some embodiments of method 3100, the generating the updated first and second reference motion vectors is based on a weighted sum of a first scaled motion vector and first and second scaled reference motion vectors, respectively. In some embodiments, a first motion vector is derived based on the first reference motion vector and the second reference motion vector, the first scaled motion vector is generated by scaling the first motion vector to a target precision, and the first and second scaled reference motion vectors are generated by scaling the first and second reference motion vectors to the target precision, respectively.

In some embodiments, an indication of the target precision is signaled in a Video Parameter Set (VPS), a Sequence Parameter Set (SPS), a Picture Parameter Set (PPS), a slice header, a coding tree unit (CTU) or a coding unit (CU).

In some embodiments, the first motion vector has a first precision and the first and second reference motion vectors have a reference precision. In other embodiments, the first precision may be higher or lower than the reference precision. In yet other embodiments, the target precision may be set to either the first precision, the reference precision or a fixed (or predetermined) precision regardless of the first and reference precisions.

In some embodiments, the first motion vector is derived based on a bi-directional optical flow (BIO) refinement using the first and second reference motion vectors.

In some embodiments, the processing is based on a bi-directional optical flow (BIO) refinement, and the updated first and second reference motion vectors are constrained to a predetermined range of values prior to the processing.

In some embodiments, the processing is based on a bi-directional optical flow (BIO) refinement or a decoder-side motion vector refinement (DMVR), and wherein the updated first and second reference motion vectors are clipped prior to the processing.

In some embodiments, the processing is based on a bi-directional optical flow (BIO) refinement, a decoder-side motion vector refinement (DMVR), frame-rate up conversion (FRUC) techniques or a template matching technique. In one example, the updated first and second reference motion vectors are generated for inner sub-blocks that are not on a boundary of the current block. In another example, the updated first and second reference motion vectors are generated for a subset of sub-blocks of the current block.

In some embodiments, the processing is based on at least two techniques, which may include a bi-directional optical flow (BIO) refinement, a decoder-side motion vector refinement (DMVR), frame-rate up conversion (FRUC) techniques or a template matching technique. In one example, the processing is performed for each of the at least two techniques to generate multiple sets of results, which may be averaged or filtered to generate the current block. In another example, the processing is performed in a cascaded manner for each of the at least two techniques to generate the current block.

Figure 33:
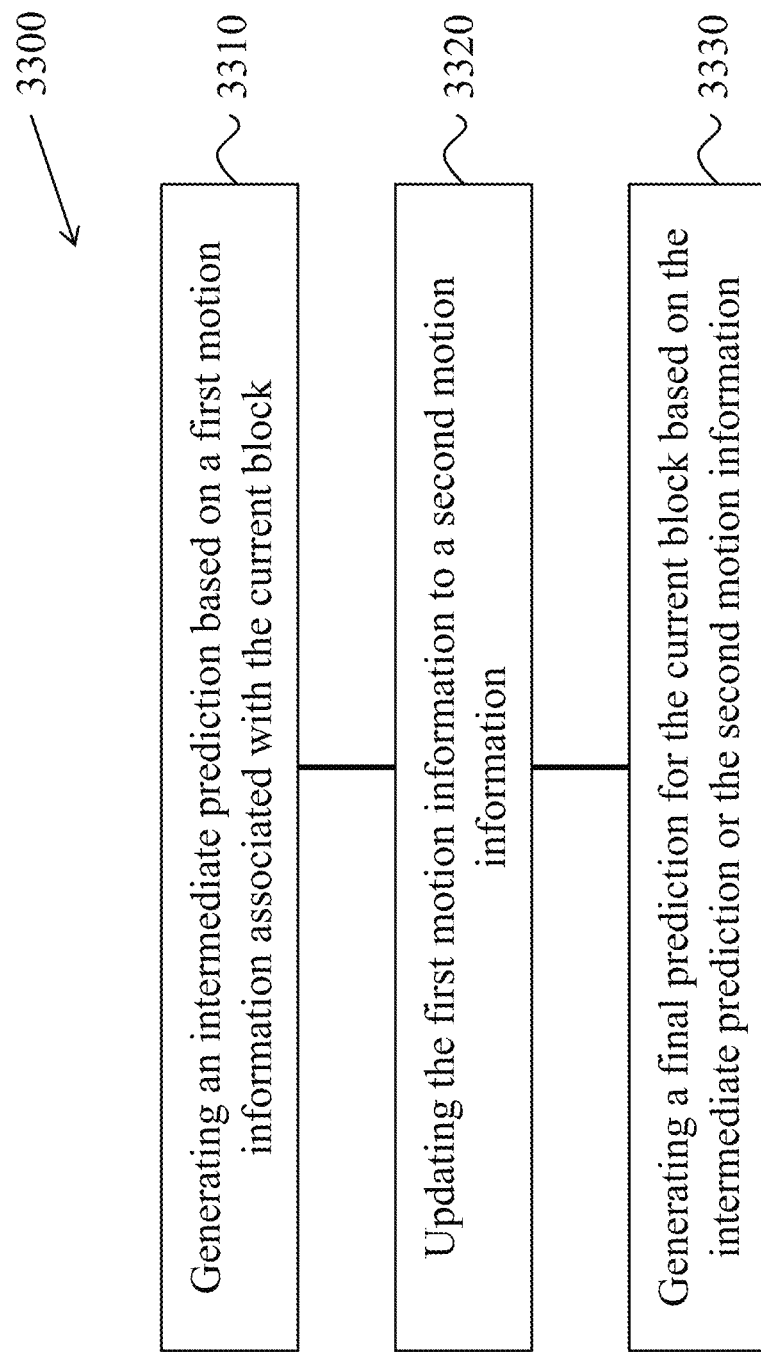
FIG. 33 shows a flowchart of another example method for video coding in accordance with the presently disclosed technology.

FIG. 33 shows a flowchart of an exemplary method for video decoding. The method 3300 includes, at step 3310, generating, for a current block, an intermediate prediction based on a first motion information associated with the current block. In some embodiments, generating the intermediate prediction comprises a first interpolation filtering process. In some embodiments, the generating the intermediate prediction is further based on signaling in a sequence parameter set (SPS), a picture parameter set (PPS), a coding tree unit (CTU), a slice header, a coding unit (CU) or a group of CTUs.

The method 3300 includes, at step 3320, updating the first motion information to a second motion information. In some embodiments, updating the first motion information comprises using a bi-directional optical flow (BIO) refinement.

The method 3300 includes, at step 3330, generating a final prediction for the current block based on the intermediate prediction or the second motion information. In some embodiments, generating the final prediction comprises a second interpolation filtering process.

In some embodiments, the first interpolation filtering process uses a first set of filters that are different from a second set of filters used by the second interpolation filtering process. In some embodiments, at least one filter tap of the first or second interpolation filtering process is based on a dimension, a prediction direction, or a prediction type of the current block.

Figure 34:
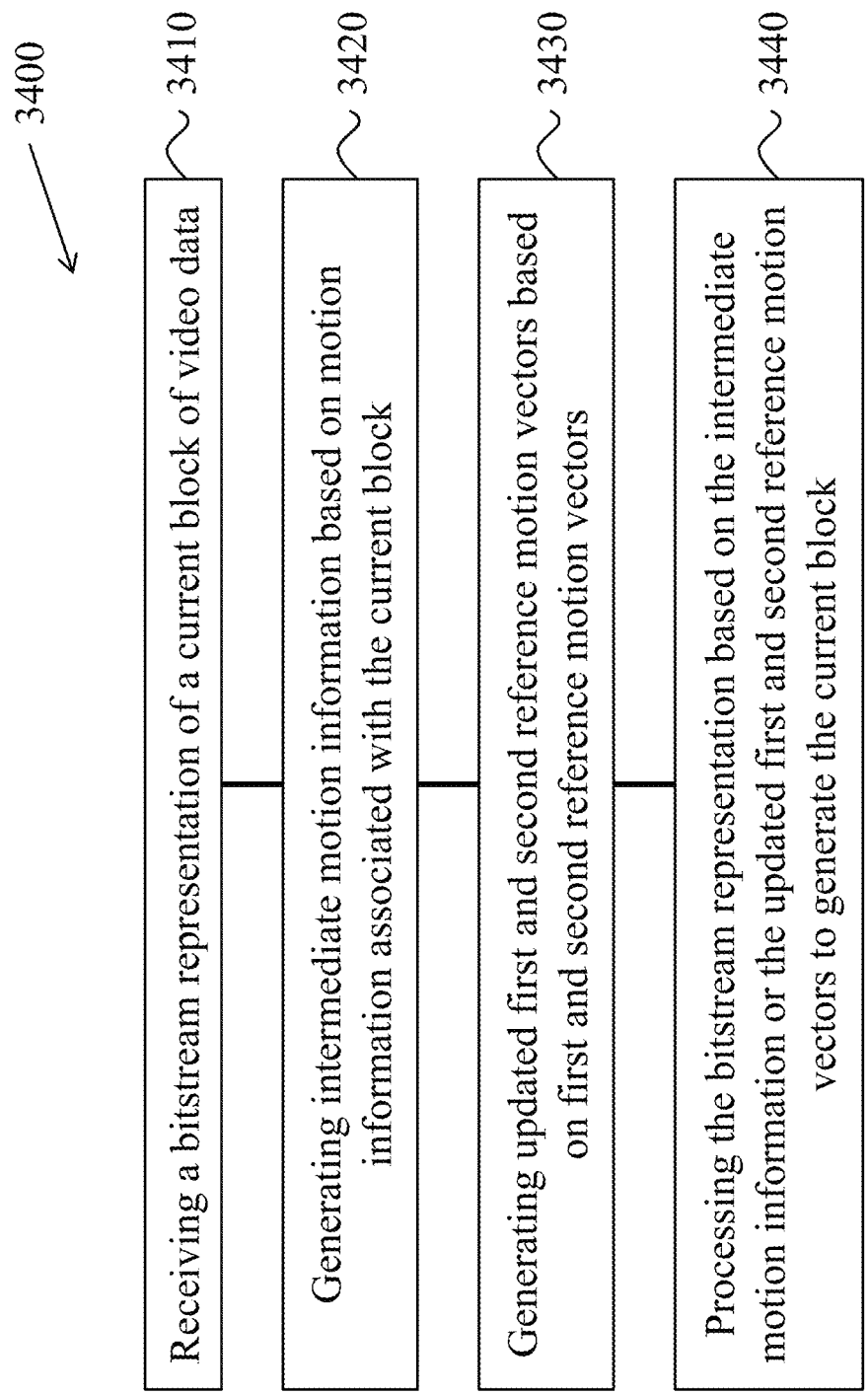
FIG. 34 shows a flowchart of another example method for video coding in accordance with the presently disclosed technology.

FIG. 34 shows a flowchart of another exemplary method for video decoding. This example includes some features and/or steps that are similar to those shown in FIG. 33, and described above. At least some of these features and/or components may not be separately described in this section.

The method 3400 includes, at step 3410, receiving a bitstream representation of a current block of video data. In some embodiments, step 3410 includes receiving the bitstream representation from a memory location or buffer in a video encoder or decoder. In other embodiments, step 3410 includes receiving the bitstream representation over a wireless or wired channel at a video decoder. In yet other embodiments, step 3410 include receiving the bitstream representation from a different module, unit or processor, which may implement one or more methods as described in, but not limited to, the embodiments in the present document.

The method 3400 includes, at step 3420, generating intermediate motion information based on motion information associated with the current block.

The method 3400 includes, at step 3430, generating updated first and second reference motion vectors based on first and second reference motion vectors, respectively. In some embodiments, the current block is associated with first and second reference blocks. In some embodiments, the first and second reference motion vectors are associated with the first and second reference blocks, respectively.

The method 3400 includes, at step 3440, processing the bitstream representation based on the intermediate motion information or the updated first and second reference motion vectors to generate the current block.

In some embodiments of method 3400, the generating updated first and second reference motion vectors is based on a weighted sum of a first scaled motion vector and first and second scaled reference motion vectors, respectively. In some embodiments, a first motion vector is derived based on the first reference motion vector and the second reference motion vector, the first scaled motion vector is generated by scaling the first motion vector to a target precision, and the first and second scaled reference motion vectors are generated by scaling the first and second reference motion vectors to the target precision, respectively.

In some embodiments, an indication of the target precision is signaled in a Video Parameter Set (VPS), a Sequence Parameter Set (SPS), a Picture Parameter Set (PPS), a slice header, a coding tree unit (CTU) or a coding unit (CU).

In some embodiments, the first motion vector has a first precision and the first and second reference motion vectors have a reference precision. In other embodiments, the first precision may be higher or lower than the reference precision. In yet other embodiments, the target precision may be set to either the first precision, the reference precision or a fixed (or predetermined) precision regardless of the first and reference precisions.

In some embodiments, the first motion vector is derived based on a bi-directional optical flow (BIO) refinement using the first and second reference motion vectors.

In some embodiments, the processing is based on a bi-directional optical flow (BIO) refinement, and the updated first and second reference motion vectors are constrained to a predetermined range of values prior to the processing.

In some embodiments, the processing is based on a bi-directional optical flow (BIO) refinement or a decoder-side motion vector refinement (DMVR), and wherein the updated first and second reference motion vectors are clipped prior to the processing.

In some embodiments, the processing is based on a bi-directional optical flow (BIO) refinement, a decoder-side motion vector refinement (DMVR), frame-rate up conversion (FRUC) techniques or a template matching technique. In one example, the updated first and second reference motion vectors are generated for inner sub-blocks that are not on a boundary of the current block. In another example, the updated first and second reference motion vectors are generated for a subset of sub-blocks of the current block.

In some embodiments, the processing is based on at least two techniques, which may include a bi-directional optical flow (BIO) refinement, a decoder-side motion vector refinement (DMVR), frame-rate up conversion (FRUC) techniques or a template matching technique. In one example, the processing is performed for each of the at least two techniques to generate multiple sets of results, which may be averaged or filtered to generate the current block. In another example, the processing is performed in a cascaded manner for each of the at least two techniques to generate the current block.

Figure 35:
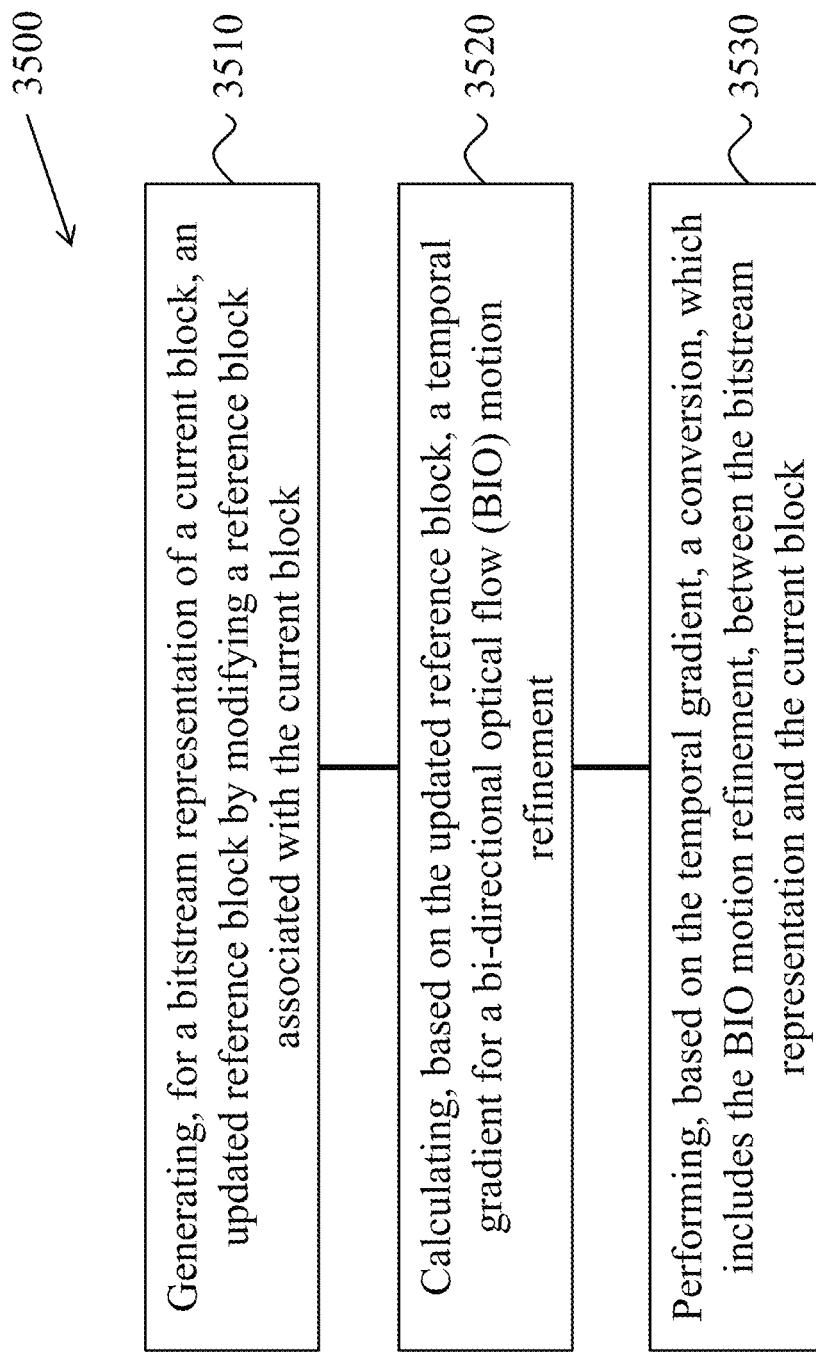
FIG. 35 shows a flowchart of another example method for video coding in accordance with the presently disclosed technology.

FIG. 35 shows a flowchart of an exemplary method for video decoding. The method 3500 includes, at step 3510, generating, for a bitstream representation of a current block, an updated reference block by modifying a reference block associated with the current block.

In some embodiments, the method 3500 further includes the step of filtering the reference block using a smoothing filter.

In some embodiments, the method 3500 further includes the step of filtering pixels at block boundaries of the reference block.

In some embodiments, the method 3500 further includes the step of applying overlapped block motion compensation (OBMC) to the reference block.

In some embodiments, the method 3500 further includes the step of applying illumination compensation (IC) to the reference block.

In some embodiments, the method 3500 further includes the step of applying a weighted prediction to the reference block.

The method 3500 includes, at step 3520, calculating, based on the updated reference block, a temporal gradient for a bi-directional optical flow (BIO) motion refinement.

The method 3500 includes, at step 3530, performing, based on the temporal gradient, a conversion, which includes the BIO motion refinement, between the bitstream representation and the current block. In some embodiments, the conversion generates the current block from the bitstream representation (e.g., as might be implemented in a video decoder). In other embodiments, the conversion generates the bitstream representation from the current block (e.g., as might be implemented in a video encoder).

In some embodiments, the method 3500 further includes the steps of computing a mean value for the reference block, and subtracting the mean value from each pixel of the reference block. In one example, computing the mean value is based on all pixels of the reference block. In another example, computing the mean value is based on all pixels in a sub-block of the reference block.

In some embodiments, computing the mean value is based on a subset of pixels (in other words, not all the pixels) of the reference block. In one example, the subset of pixels includes pixels in every fourth row or column of the reference block. In another example, the subset of pixels includes four corner pixels. In yet another example, the subset of pixels includes the four corner pixels and a center pixel.

Figure 36:
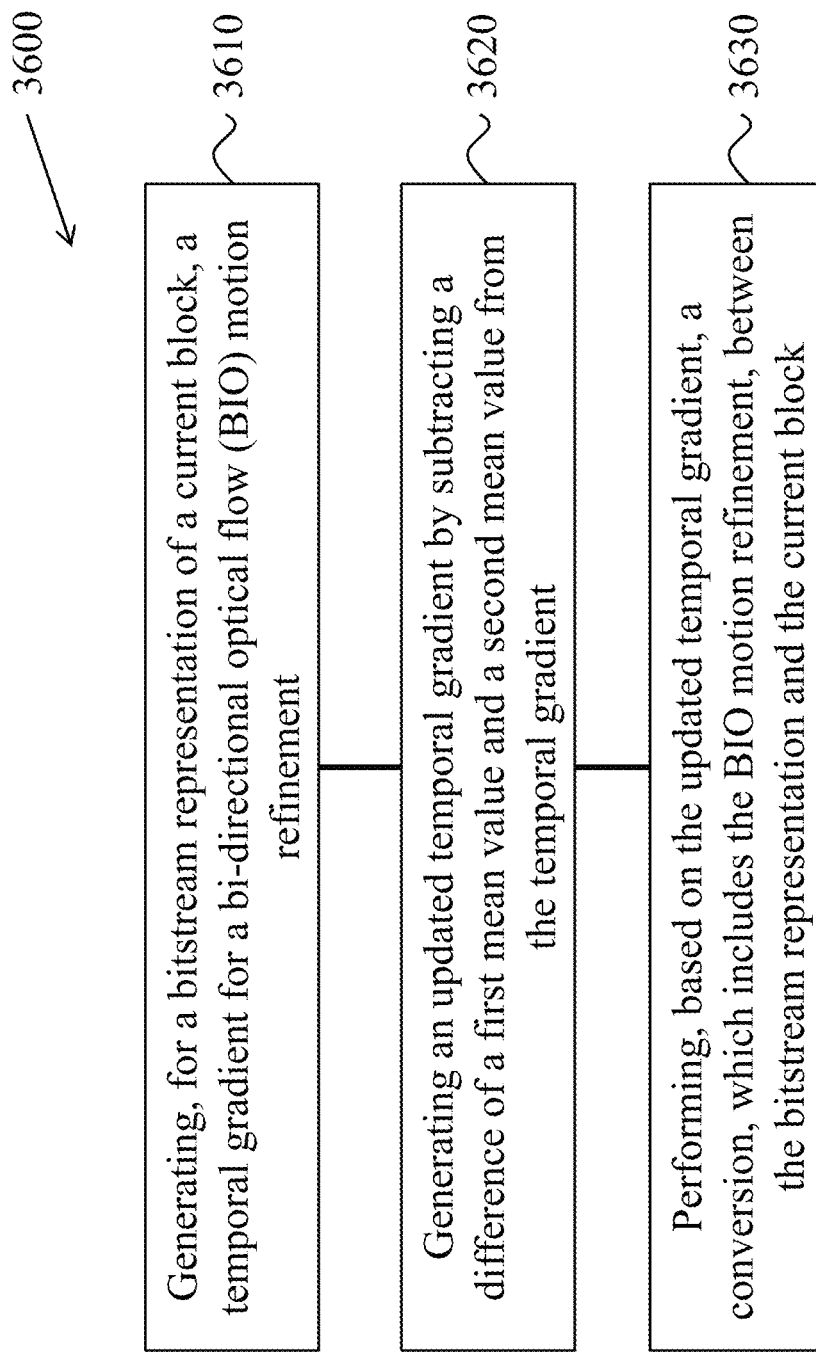
FIG. 36 shows a flowchart of another example method for video coding in accordance with the presently disclosed technology.

FIG. 36 shows a flowchart of another exemplary method for video decoding. This example includes some features and/or steps that are similar to those shown in FIG. 35, and described above. At least some of these features and/or components may not be separately described in this section.

The method 3600 includes, at step 3610, generating, for a bitstream representation of a current block, a temporal gradient for a bi-directional optical flow (BIO) motion refinement.

The method 3600 includes, at step 3620, generating an updated temporal gradient by subtracting a difference of a first mean value and a second mean value from the temporal gradient, where the first mean value is a mean value for a first reference block, the second mean value is a mean value for a second reference block, and the first and second reference blocks are associated with the current block.

In some embodiments, the mean value is based on all pixels of the corresponding reference block (e.g., the first mean value is computed as the average of all the pixels of the first reference block). In another example, computing the mean value is based on all pixels in a sub-block of the corresponding reference block.

In some embodiments, the mean value is based on a subset of pixels (in other words, not all the pixels) of the corresponding reference block. In one example, the subset of pixels includes pixels in every fourth row or column of the corresponding reference block. In another example, the subset of pixels includes four corner pixels. In yet another example, the subset of pixels includes the four corner pixels and a center pixel.

The method 3600 includes, at step 3630, performing, based on the updated temporal gradient, a conversion, which includes the BIO motion refinement, between the bitstream representation and the current block. In some embodiments, the conversion generates the current block from the bitstream representation (e.g., as might be implemented in a video decoder). In other embodiments, the conversion generates the bitstream representation from the current block (e.g., as might be implemented in a video encoder).

Figure 38:
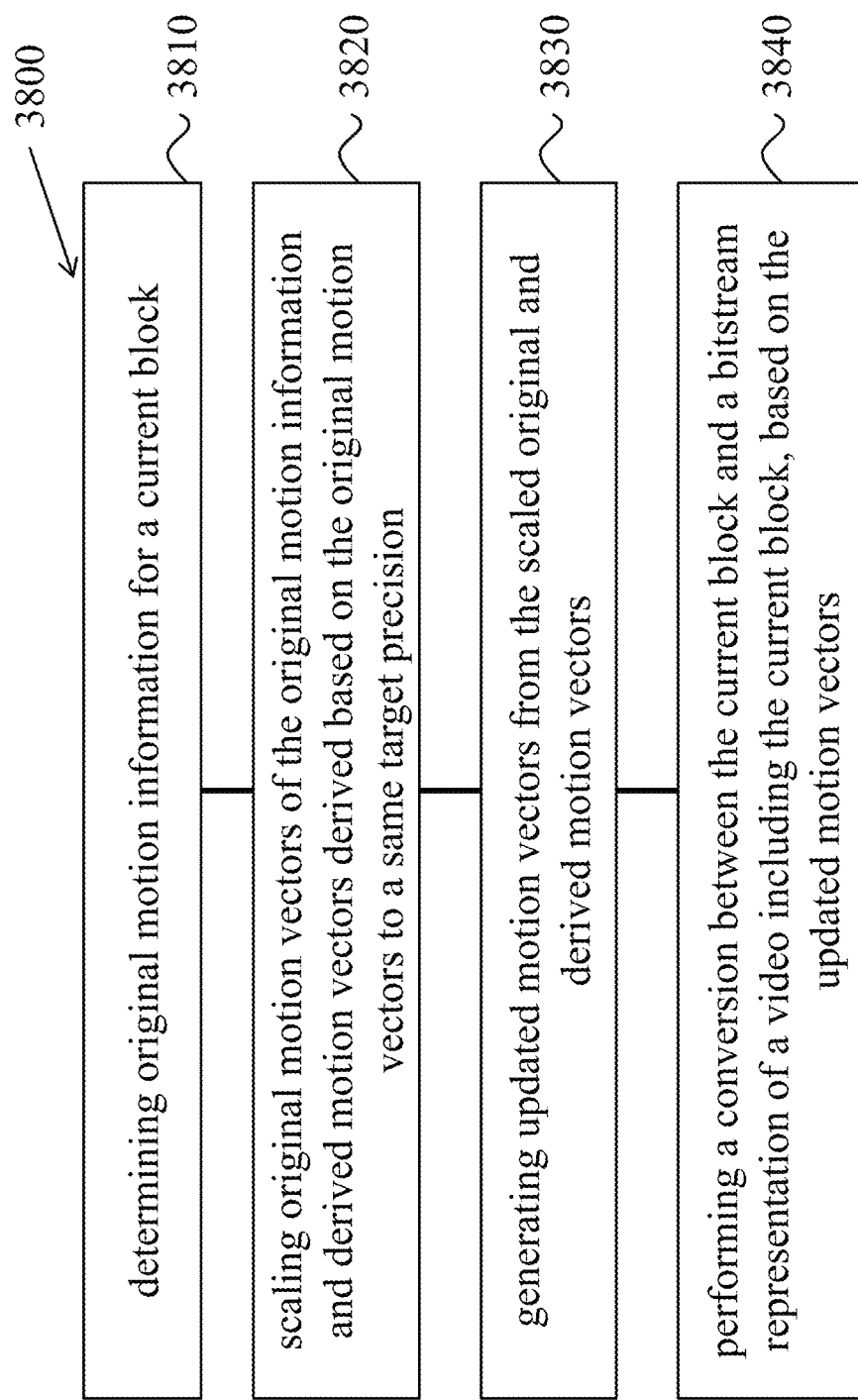
FIG. 38 shows a flowchart of another example method for video processing in accordance with the presently disclosed technology.

FIG. 38 shows a flowchart of an exemplary method for video processing. The method 3800 includes, at step 3810, determining original motion information for a current block; at step 3820, scaling original motion vectors of the original motion information and derived motion vectors derived based on the original motion vectors to a same target precision; at step 3830, generating updated motion vectors from the scaled original and derived motion vectors; and at step 3840, performing a conversion between the current block and a bitstream representation of a video including the current block, based on the updated motion vectors.

Figure 39:
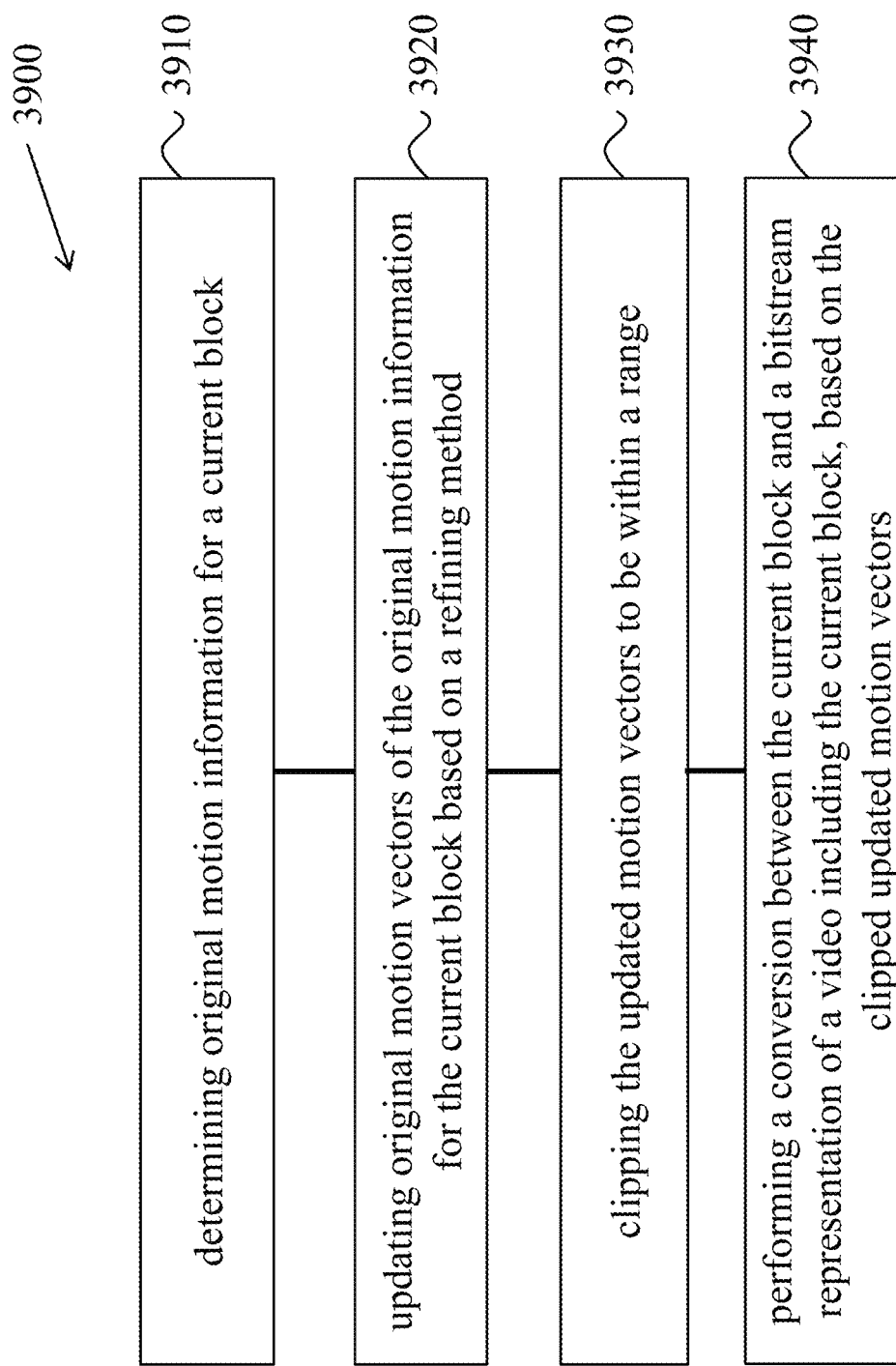
FIG. 39 shows a flowchart of another example method for video processing in accordance with the presently disclosed technology.

FIG. 39 shows a flowchart of an exemplary method for video processing. The method 3900 includes, at step 3910, determining original motion information for a current block; at step 3920, updating original motion vectors of the original motion information for the current block based on a refining method; at step 3930, clipping the updated motion vectors to be within a range; and at step 3940, performing a conversion between the current block and a bitstream representation of a video including the current block, based on the clipped updated motion vectors.

Figure 40:
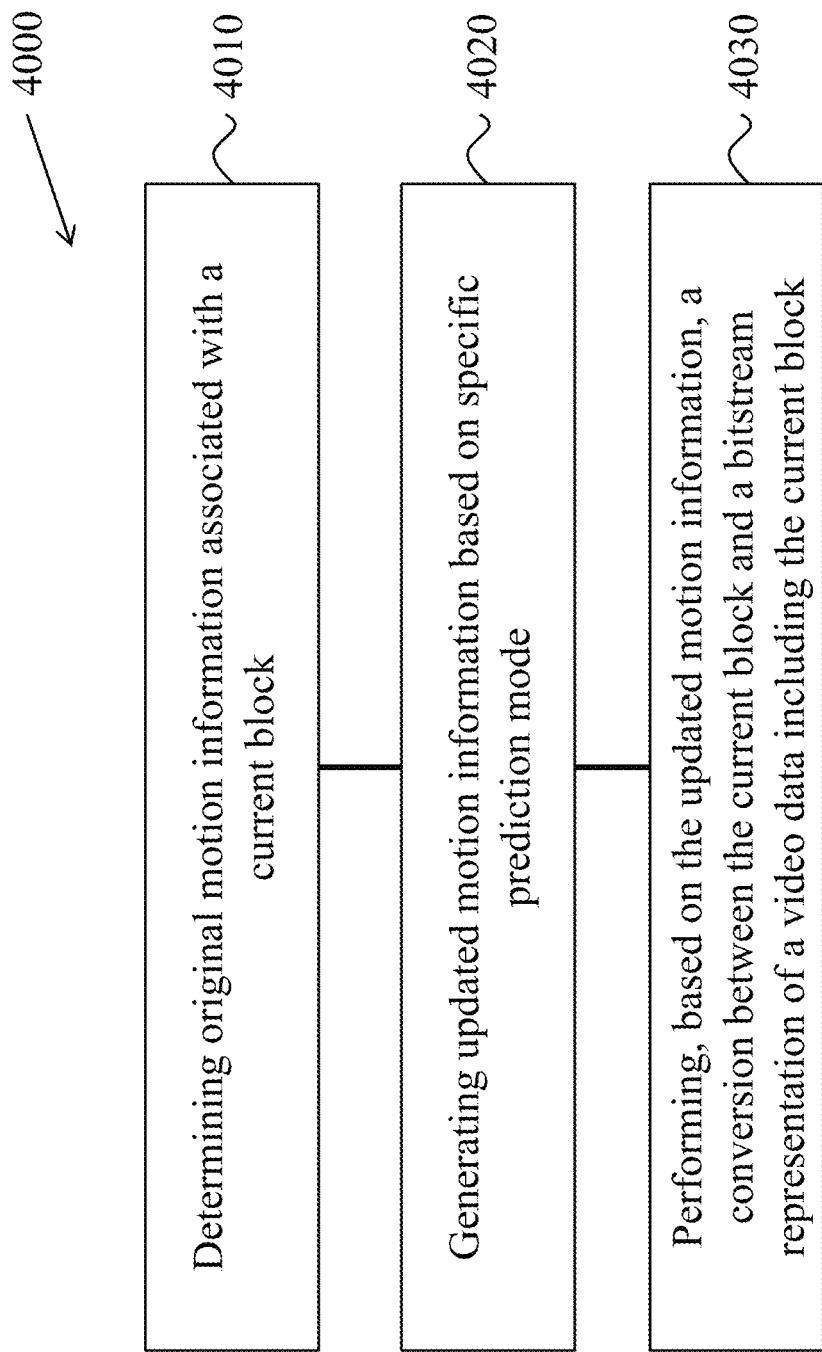
FIG. 40 shows a flowchart of another example method for video processing in accordance with the presently disclosed technology.

FIG. 40 shows a flowchart of an exemplary method for video processing. The method 4000 includes, at step 4010, determining original motion information associated with a current block; at step 4020, generating updated motion information based on specific prediction mode; and at step 4030, performing, based on the updated motion information, a conversion between the current block and a bitstream representation of a video data including the current block, wherein the specific prediction mode includes one or more of bi-directional optical flow (BIO) refinement, a decoder-side motion vector refinement (DMVR), frame-rate up conversion (FRUC) techniques or a template matching technique.

Figure 41:
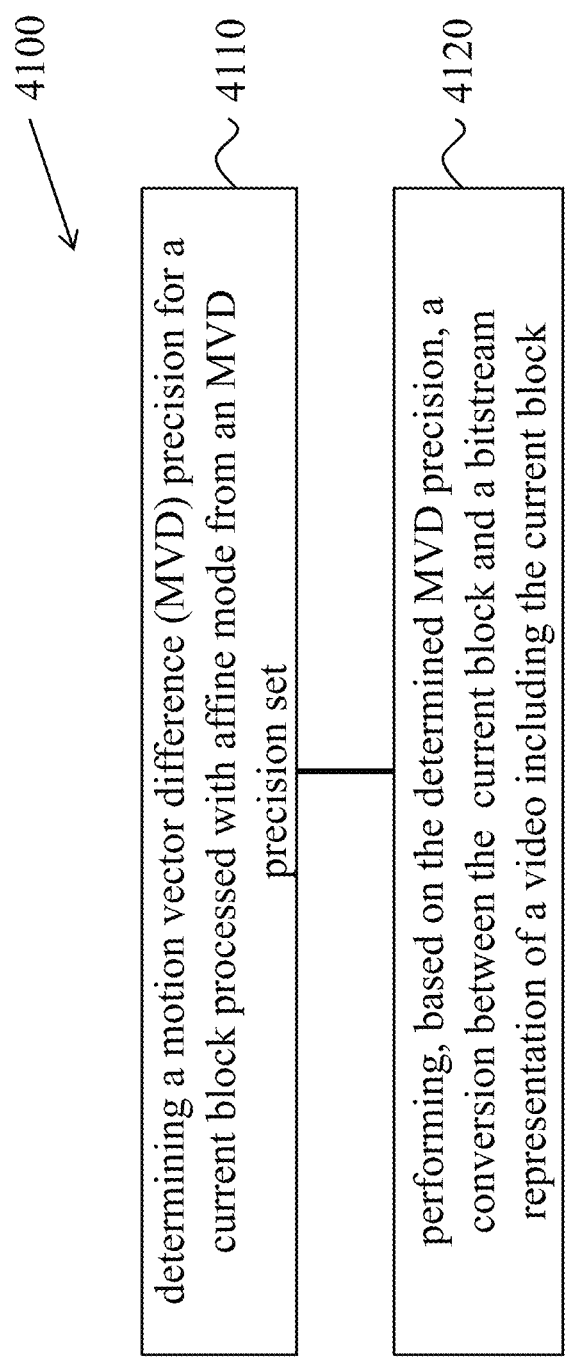
FIG. 41 shows a flowchart of another example method for video processing in accordance with the presently disclosed technology.

FIG. 41 shows a flowchart of an exemplary method for video processing. The method 4100 includes, at step 4110, determining a motion vector difference (MVD) precision for a current block processed with affine mode from an MVD precision set; at step 4120, performing, based on the determined MVD precision, a conversion between the current block and a bitstream representation of a video including the current block.

Figure 42:
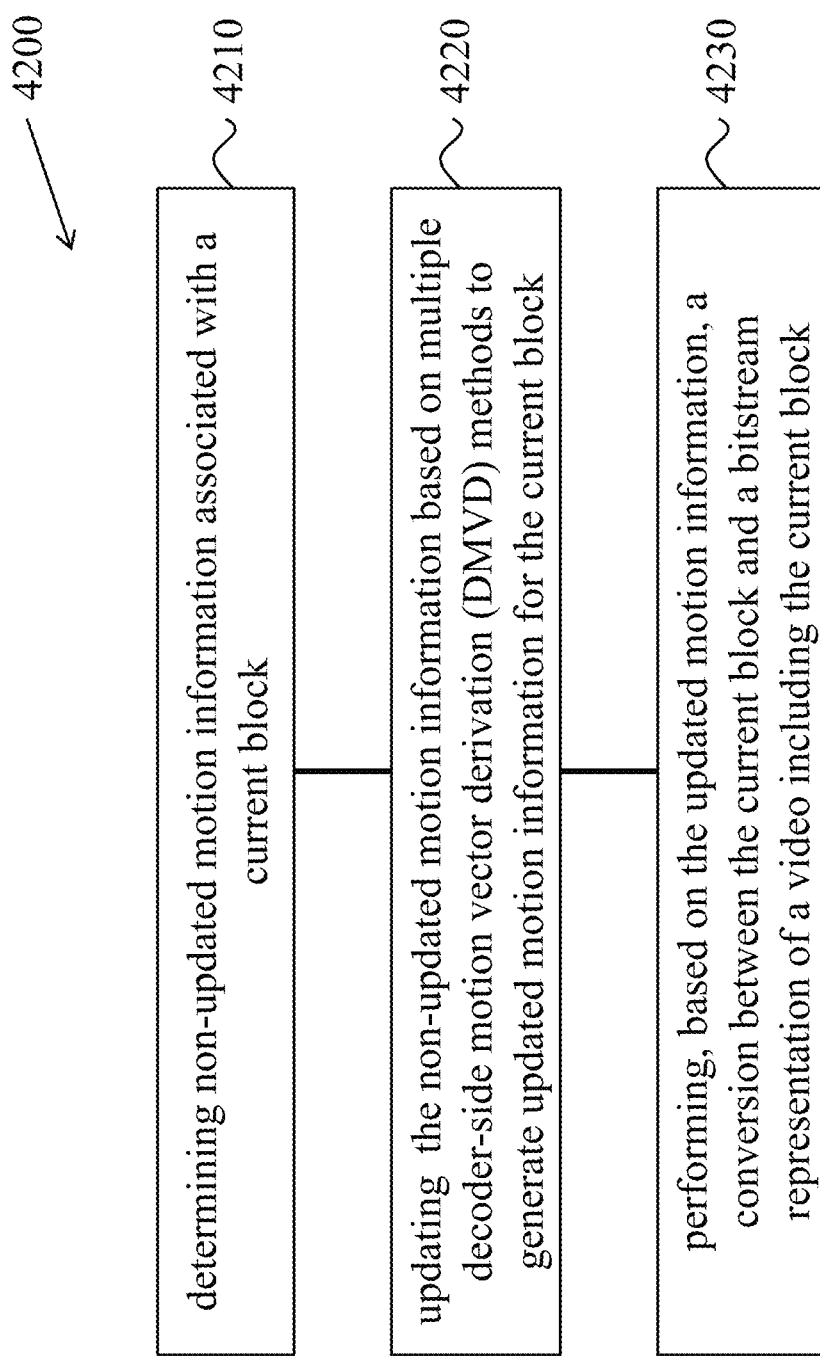
FIG. 42 shows a flowchart of another example method for video processing in accordance with the presently disclosed technology.

FIG. 42 shows a flowchart of an exemplary method for video processing. The method 4200 includes, at step 4210, determining non-updated motion information associated with a current block; at step 4220, updating the non-updated motion information based on multiple decoder-side motion vector derivation (DMVD) methods to generate updated motion information for the current block; at step 4230, performing, based on the updated motion information, a conversion between the current block and a bitstream representation of a video including the current block.

7. Example Implementations of the Disclosed Technology

Figure 37:
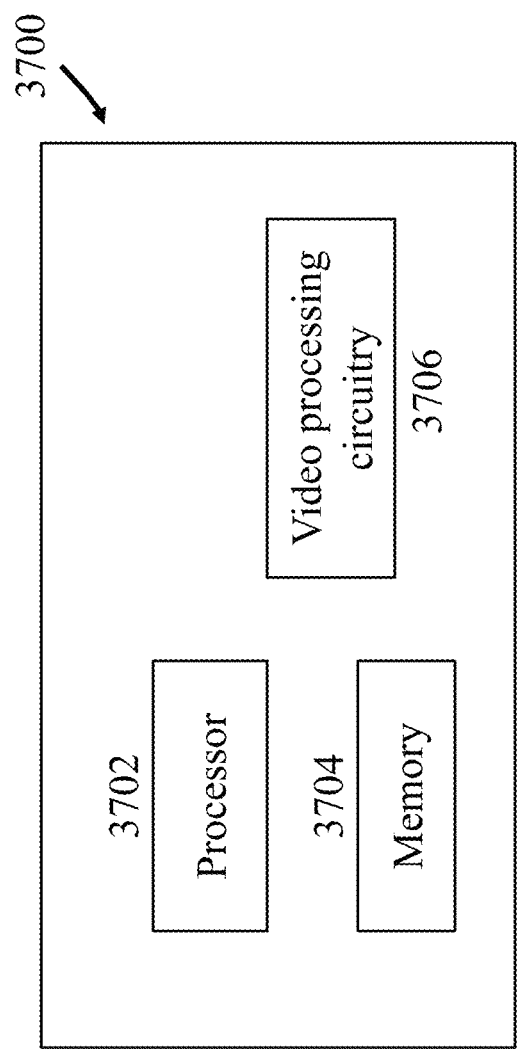
FIG. 37 is a block diagram of an example of a hardware platform for implementing a visual media decoding or a visual media encoding technique described in the present document.

FIG. 37 is a block diagram of a video processing apparatus 3700. The apparatus 3700 may be used to implement one or more of the methods described herein. The apparatus 3700 may be embodied in a smartphone, tablet, computer, Internet of Things (IoT) receiver, and so on. The apparatus 3700 may include one or more processors 3702, one or more memories 3704 and video processing hardware 3706. The processor(s) 3702 may be configured to implement one or more methods (including, but not limited to, methods 2700-3100, 3300-3600 and 3800-4200) described in the present document. The memory (memories) 3704 may be used for storing data and code used for implementing the methods and techniques described herein. The video processing hardware 3706 may be used to implement, in hardware circuitry, some techniques described in the present document.

In some embodiments, the video coding methods may be implemented using an apparatus that is implemented on a hardware platform as described with respect to FIG. 37.

Various embodiments and techniques described throughout the present document may be described using the following clause based format.

1.1. A video processing method, comprising: determining original motion information for a current block; scaling original motion vectors of the original motion information and derived motion vectors derived based on the original motion vectors to a same target precision; generating updated motion vectors from the scaled original and derived motion vectors; and performing a conversion between the current block and a bitstream representation of a video including the current block, based on the updated motion vectors.

1.2. The method of example 1.1, wherein the original motion vectors have a first precision, the derived motion vectors have a second precision different from the first precision, and the target precision is set to a higher precision or a lower precision between the first precision and the second precision.

1.3. The method of example 1.1, wherein the target precision is set to a fixed precision.

1.4. The method of example 1.1, wherein the target precision is higher than a precision of the original motion vectors.

1.5. The method of example 1.4, wherein the original motion vectors are scaled as:

$$mvLX'_x = \text{sign}(mvLX_x)*(\text{abs}(mvLX_x) << N),$$

$$mvLX'_y = \text{sign}(mvLX_y)*(\text{abs}(mvLX_y) << N),$$

wherein ($mvLX_x$, $mvLX_y$) are the original motion vectors, ($mvLX'_x$, $mvLX'_y$) are the scaled original motion vectors, function sign(.) returns a sign of an input parameter, function abs(.) returns absolute value of an input parameter, N=log 2(curr_mv_precision/targ_mv_precision), and wherein curr_mv_precision is the precision of the original motion vectors, and targ_mv_precision is a precision of the derived motion vectors as the target precision.

1.6. The method of example 1.1, wherein the target precision is the same as a precision of the original motion vectors.

1.7. The method of example 1.1, wherein the original motion vectors have a first precision, the derived motion vectors have a second precision different from the first precision, and the target precision is set to the first precision.

1.8. The method of example 1.7, wherein, the derived motion vectors are scaled as:

$$v'_x = (v_x + \text{offset}) >> N, v'_y = (v_y + \text{offset}) >> N; \text{ or}$$

$$v'_x = \text{sign}(v_x)*((\text{abs}(v_x) + \text{offset}) >> N), v'_y = \text{sign}(v_y)*((\text{abs}(v_y) + \text{offset}) >> N)$$

when the derived motion vectors are to be right-shifted by N to achieve the target precision, wherein ($v_x$, $v_y$) are the derived motion vectors, ($v'_x$, $v'_y$) are the scaled derived motion vectors, offset is an offset applied to the derived motion vectors to achieve the target precision, function sign(.) returns a sign of an input parameter, function abs(.) returns absolute value of an input parameter, N=log 2(curr_mv_precision/targ_mv_precision), wherein curr_mv_precision is the first precision, and targ_mv_precision is the second precision.

1.9. The method of example 1.1, wherein the scaling and the generation of the updated motion vectors are performed as:

$$mvL0'_x = -v_x/S_0 + mvL0_x, mvL0'_y = -v_y/S_0 + mvL0_y; \text{ and/or}$$

$$mvL1'_x = v_x/S_1 + mvL1_x, mvL1'_y = v_y/S_1 + mvL1_y$$

wherein, ($mvL0_x$, $mvL0_y$) and ($mvL1_x$, $mvL1_y$) are the original motion vectors, ($mvL0'_x$, $mvL0'_y$) and ($mvL1'_x$, $mvL1'_y$) are the updated motion vectors, ($v_x$, $v_y$) are the derived motion vectors, and $S_0$ and $S_1$ are scaling factors.

1.10. The method of example 1.1, wherein the scaling and the generation of the updated motion vectors are performed as:

$$mvL0'_x = (-v_x + \text{offset0})/S_0 + mvL0_x, mvL0'_y = (-v_y \text{ offset0})/S_0 + mvL0_y, \text{ and/or}$$

$$mvL1'_x = (v_x + \text{offset1})/S_1 + mvL1_x, mvL1'_y = (v_y \text{ offset1})/S_1 + mvL1_y$$

wherein, ($mvL0_x$, $mvL0_y$) and ($mvL1_x$, $mvL1_y$) are the original motion vectors, ($mvL0'_x$, $mvL0'_y$) and ($mvL1'_x$, $mvL1'_y$) are the updated motion vectors, ($v_x$, $v_y$) are the derived motion vectors, offset0 and offset1 are offsets, and $S_0$ and $S_1$ are scaling factors.

1.11. The method of example 1.1, wherein the scaling and the generation of the updated motion vectors are performed as:

$$mvL0'_x = ((-v_x + 1) >> 1) + mvL0_x, mvL0'_y = (-(v_y + 1) >> 1) + mvL0_y, \text{ and/or}$$

$$mvL1'_x = ((v_x + 1) >> 1) + mvL1_x, mvL1'_y = ((v_y + 1) >> 1) + mvL1_y$$

wherein, ($mvL0_x$, $mvL0_y$) and ($mvL1_x$, $mvL1_y$) are the original motion vectors, ($mvL0'_x$, $mvL0'_y$) and ($mvL1'_x$, $mvL1'_y$) are the updated motion vectors, and ($v_x$, $v_y$) are the derived motion vectors.

1.12. The method of anyone of examples 1.9-1.11, wherein the scaling and the generation of the updated motion vectors are performed when $\tau_0 > 0$ and $\tau_1 > 0$, wherein $\tau_0 = \text{POC}(\text{current}) - \text{POC}(\text{Ref}_0)$, $\tau_0 = \text{POC}(\text{Ref}_1) - \text{POC}(\text{current})$, and wherein POC(current), POC($\text{Ref}_0$) and POC($\text{Ref}_1$) are the picture order counts of the current block, a first reference block and a second reference block, respectively.

1.13. The method of example 1.1, wherein the scaling and the generation of the updated motion vectors are performed as:

$$mvL0'_x = -SF_0 * v_x + mvL0_x, mvL0'_y = -v_y * SF_0 + mvL0_y,$$
and/or $$mvL1'_x = -SF_1 * v_x + mvL1_x, mvL1'_y = -SF_1 * v_y + mvL1_y$$

wherein, ($mvL0_x$, $mvL0_y$) and ($mvL1_x$, $mvL1_y$) are the original motion vectors, ($mvL0'_x$, $mvL0'_y$) and ($mvL1'_x$, $mvL1'_y$) are the updated motion vectors, ($v_x$, $v_y$) are the derived motion vectors, and $SF_0$ and $SF_1$ are scaling factors.

1.14. The method of example 1.13, wherein the scaling and the generation of the updated motion vectors are performed when $\tau_0 > 0$, $\tau_1 < 0$ and $\tau_0 > \tau_0 < |\tau_1|$, wherein $\tau_0 = \text{POC}(\text{current}) - \text{POC}(\text{Ref}_0)$, $\tau_1 = \text{POC}(\text{Ref}_1) - \text{POC}(\text{current})$, and wherein POC(current), POC($\text{Ref}_0$) and POC($\text{Ref}_1$) are the picture order counts of the current block, a first reference block and a second reference block, respectively.

1.15. The method of example 1.1, wherein the scaling and the generation of the updated motion vectors are performed as:

$$mvL0'_x = SFACT_0 * v_x + mvL0_x, mvL0'_y = SFACT_0 * v_y + mvL0_y, \text{ and/or}$$

$$mvL1'_x = SFACT_1 * v_x + mvL1_x, mvL1'_y = SFACT_1 * v_y + mvL1_y$$

wherein, ($mvL0_x$, $mvL0_y$) and ($mvL1_x$, $mvL1_y$) are the original motion vectors, ($mvL0'_x$, $mvL0'_y$) and ($mvL1'_x$, $mvL1'_y$) are the updated motion vectors, ($v_x$, $v_y$) are the derived motion vectors, and $SFACT_0$ and $SFACT_1$ are scaling factors.

1.16. The method of example 1.15, wherein the scaling and the generation of the updated motion vectors are performed when $\tau_0 > 0$, $\tau_1 < 0$ and $\tau_0 < |\tau_1|$, wherein $\tau_0 = \text{POC}(\text{current}) - \text{POC}(\text{Ref}_0)$, $\tau_1 = \text{POC}(\text{Ref}_1) - \text{POC}(\text{current})$, and wherein POC(current), POC($\text{Ref}_0$) and POC($\text{Ref}_1$) are the picture order counts of the current block, a first reference block and a second reference block, respectively.

1.17. The method of example 1.1, wherein the derivation of the derived motion vectors and the generation of the updated motion vectors are performed together when $\tau_0>0$ and $\tau_1>0$, wherein $\tau_0$=POC(current)−POC(Ref$_0$), $\tau_1$=POC(Ref$_1$)−POC(current), and wherein POC(current), POC(Ref$_0$) and POC(Ref$_1$) are the picture order counts of the current block, a first reference block and a second reference block, respectively.

1.18. The method of example 1.17, wherein the scaling and the generation of the updated motion vectors are performed as:

$$mvL0'_x=((-v_x+\text{offset})>>(N+1))+mvL0_x, mvL0'_y=((-V_y \text{ offset1})>>(N+1))+mvL0_y, mvL1'_x=((v_x+\text{offset})>>(N+1))+mvL1_x, mvL1'_y=((V_y \text{ offset2})>>(N+1))+mvL1_y,$$

when the derived motion vectors are right-shifted by N to achieve the target precision, wherein (mvL0$_x$, mvL0$_y$) and (mvL1$_x$, mvL1$_y$) are the original motion vectors, (mvL0'$_x$, mvL0'$_y$) and (mvL1'$_x$, mvL1'$_y$) are the updated motion vectors, and (v$_x$, v$_y$) are the derived motion vectors, offset1 and offset 2 are offsets, N=log 2(curr_mv_precision/targ_mv_precision), and wherein curr_mv_precision is a precision of the original motion vectors, and targ_mv_precision is a precision of the derived motion vectors.

1.19. The method of example 1.17, wherein the original motion vectors have a first precision, the derived motion vectors have a second precision different from the first precision, and the original motion vectors are left-shifted by N to achieve the target precision as the second precision.

1.20. The method of example 1.17, wherein the original motion vectors are left-shifted by K and the derived motion vectors are right-shifted by N-K to achieve the target precision.

1.21. The method of example 1.17, wherein, the scaling and the generation of the updated motion vectors are performed as:

$$mvL0'_x=-\text{sign}(v_x)*((\text{abs}(v_x)+\text{offset0})>>(N+1))+mvL0_x,$$

$$mvL0'_y=-\text{sign}(v_y)*((\text{abs}(v_y)+\text{offset0})>>(N+1))+mvL0_y,$$

$$mvL1'_x=\text{sign}(v_x)*((\text{abs}(v_x)+\text{offset1})>>(N+1))+mvL1_x,$$

$$mvL1'_y=\text{sign}(v_y)*((\text{abs}(v_y)+\text{offset1})>>(N+1))+mvL1_y$$

wherein (mvL0$_x$, mvL0$_y$) and (mvL1$_x$, mvL1$_y$) are the original motion vectors, (mvL0'$_x$, mvL0'$_y$) and (mvL1'$_x$, mvL1'$_y$) are the updated motion vectors, (v$_x$, v$_y$) are the derived motion vectors, offset0 and offset1 are offsets, function sign(.) returns a sign of an input parameter, function abs(.) returns absolute value of an input parameter, N=log 2(curr_mv_precision/targ_mv_precision), curr_mv_precision is a precision of the original motion vectors, and targ_mv_precision is a precision of the derived motion vector.

1.22. The method of example 1.1, wherein the updating of the first and second reference motion vectors comprises using a bi-directional optical flow (BIO) refinement.

1.23. The method of anyone of examples 1.1-1.22, wherein the method is not applied in case that the current block meets a certain condition.

1.24. The method of example 1.23, wherein the certain condition specifies at least one of: a size of the current block, a slice type of the current block, a picture type of the current block and a tile type of the current block.

1.25. The method of example 1.23, wherein the certain condition specifies that a sample number that the current block contains is smaller than a first threshold.

1.26. The method of example 1.23, wherein the certain condition specifies that minimum size of a width and a height of the current block is smaller than or no larger than a second threshold.

1.27. The method of example 1.23, wherein the certain condition specifies that a width of the current block is smaller than or no larger than a third threshold, and/or a height of the current block is smaller than or no larger than a fourth threshold.

1.28. The method of example 1.23, wherein the certain condition specifies that a width of the current block is larger than or no smaller than a third threshold, and/or a height of the current block is larger than or no smaller than a fourth threshold.

1.29. The method of example 1.23, wherein the method is applied in a sub-block level, in case that a width and/or a height of a block, to which the sub-block belongs, is equal to or larger than a fifth threshold.

1.30. The method of example 1.29, wherein the current block is split into multiple sub-blocks and each of the multiple sub-blocks further undergoes a bidirectional optical flow (BIO) process, in a same way as a normal coding block with a size equal to the sub-block size.

1.31. The method of anyone of examples 1.25-1.29, wherein each of the first to fifth thresholds is pre-defined or signaled in sequence parameter set (SPS) level, or picture parameter set (PPS) level, or picture level, or slice level, or tile level.

1.32. The method of example 1.31, wherein each of the first to fifth thresholds is defined depending on coded information including at least one of a block size, a picture type, and a temporal layer index.

1.33. An apparatus in a video system comprising a processor and a non-transitory memory with instructions thereon, wherein the instructions upon execution by the processor, cause the processor to implement the method in any one of examples 1.1 to 1.32.

1.34. A computer program product stored on a non-transitory computer readable media, the computer program product including program code for carrying out the method in any one of examples 1.1 to 1.32.

2.1. A video processing method, comprising: determining original motion information for a current block; updating original motion vectors of the original motion information for the current block based on a refining method; clipping the updated motion vectors to be within a range; and performing a conversion between the current block and a bitstream representation of a video including the current block, based on the clipped updated motion vectors.

2.2. The method of example 2.1, wherein the refining method comprises a bi-directional optical flow (BIO) refinement, a decoder-side motion vector refinement (DMVR), a frame-rate up conversion (FRUC) or a template matching.

2.3. The method of example 2.1, wherein the updated motion vectors are clipped to be within a range that is same as an allowed range of the original motion vectors.

2.4. The method of example 2.1, wherein differences between the updated motion vectors and the original motion vectors are clipped to be within a same range or different ranges for different sub-blocks.

2.5. The method of example 2.1, wherein the refining method comprises a bi-directional optical flow (BIO) refinement, and motion vectors derived from the original motion vectors in the BIO refinement are constrained to a first range as:

$$-M_x<v_x<N_x, \text{ and/or } -M_y<v_y<N_y,$$

wherein $(v_x, v_y)$ are the derived motion vectors, and $M_x$, $N_x$, $M_y$, $N_y$ are none-negative integers.

2.6. The method of example 2.1, wherein the refining method comprises a bi-directional optical flow (BIO) refinement, and the updated motion vectors are constrained to a second range as:

$$-M_{L0x} < mvL0'_x < N_{L0x} \text{ and/or}$$

$$-M_{Lx1} < mvL1'_x < N_{L1x}, \text{ and/or}$$

$$-M_{L0y} < mvL0'_y < N_{L0y}, \text{ and/or}$$

$$-M_{L1y} < mvL1'_y < N_{L1y}$$

wherein $(mvL0'_x, mvL0'_y)$ and $(mvL1'_x, mvL1'_y)$ are the updated motion vectors for different reference list, and $M_{L0x}$, $N_{L0x}$, $M_{L1x}$, $N_{L1x}$, $M_{L0y}$, $N_{L0y}$, $M_{L1y}$, $N_{L1y}$ are none-negative integers.

2.7. The method of anyone of examples 2.1-2.6, wherein the method is not applied in case that the current block meets a certain condition.

2.8. The method of example 2.7, wherein the certain condition specifies at least one of: a size of the current block, a slice type of the current block, a picture type of the current block and a tile type of the current block.

2.9. The method of example 2.7, wherein the certain condition specifies that a sample number that the current block contains is smaller than a first threshold.

2.10. The method of example 2.7, wherein the certain condition specifies that minimum size of a width and a height of the current block is smaller than or no larger than a second threshold.

2.11. The method of example 2.7, wherein the certain condition specifies that a width of the current block is smaller than or no larger than a third threshold, and/or a height of the current block is smaller than or no larger than a fourth threshold.

2.12. The method of example 2.7, wherein the certain condition specifies that a width of the current block is larger than or no smaller than a third threshold, and/or a height of the current block is larger than or no smaller than a fourth threshold.

2.13. The method of example 2.7, wherein the method is applied in a sub-block level, in case that a width and/or a height of a block, to which the sub-block belongs, is equal to or larger than a fifth threshold.

2.14. The method of example 2.13, wherein the current block is split into multiple sub-blocks and each of the multiple sub-blocks further undergoes a bidirectional optical flow (BIO) process, in a same way as a normal coding block with a size equal to the sub-block size.

2.15. The method of anyone of examples 2.9-2.13, wherein each of the first to fifth thresholds is pre-defined or signaled in sequence parameter set (SPS) level, or picture parameter set (PPS) level, or picture level, or slice level, or tile level.

2.16. The method of example 2.15, wherein each of the first to fifth thresholds is defined depending on coded information including at least one of a block size, a picture type, and a temporal layer index.

2.17. An apparatus in a video system comprising a processor and a non-transitory memory with instructions thereon, wherein the instructions upon execution by the processor, cause the processor to implement the method in any one of examples 2.1 to 2.16.

2.18. A computer program product stored on a non-transitory computer readable media, the computer program product including program code for carrying out the method in any one of examples 2.1 to 2.16.

3.1. A method for video processing, comprising: determining original motion information associated with a current block; generating updated motion information based on specific prediction mode; and performing, based on the updated motion information, a conversion between the current block and a bitstream representation of a video data including the current block, wherein the specific prediction mode includes one or more of bi-directional optical flow (BIO) refinement, a decoder-side motion vector refinement (DMVR), frame-rate up conversion (FRUC) techniques or a template matching technique.

3.2. The method of example 3.1, wherein the updated motion information comprises updated motion vectors.

3.3. The method of example 3.1, wherein the updated motion vectors are used for motion prediction for coding subsequent video blocks; or the updated motion vectors are used for filtering or overlapped block motion compensation (OBMC).

3.4. The method of example 3.2, wherein the updated motion vectors are used for motion prediction in advanced motion vector prediction (AMVP) mode, merge mode and/or affine mode.

3.5. The method of example 3.3, wherein the filtering includes deblocking filtering.

3.6. The method of any one of examples 3.1-3.5, wherein the updated motion information are used for a first module and original motion information are used for a second module.

3.7. The method of example 3.6, wherein the first module is motion prediction module, and the second module is deblocking module.

3.8. The method of any one of examples 3.2-3.7, wherein the motion prediction is used in processing blocks after the current video block in a current picture or slice.

3.9. The method of any one of examples 3.2-3.7, wherein the motion prediction is used in processing pictures or slices to be processed after a current picture or slice including the current video block.

3.10. The method of any one of examples 3.1-3.9, wherein the updated motion vectors are only used in motion information prediction of coding units (CUs) or prediction units (Pus) that are not immediately following the current video block in processing order.

3.11. The method of any one of examples 3.1-3.10, wherein the updated motion vectors are not used in motion prediction of CUs/PUs that are next to the current video block in processing order.

3.12. The method of any one of examples 3.1-3.11, wherein the updated motion vectors are only used as predictors for processing subsequent pictures/tiles/slices.

3.13. The method of example 3.12, wherein the updated motion vectors are used as temporal motion vector prediction (TMVP) in advanced motion vector prediction (AMVP) mode, merge mode or affine mode.

3.14. The method of example 3.12, wherein the updated motion vectors are only used as predictors for processing subsequent pictures/tiles/slices in alternative temporal motion vector prediction (ATMVP) mode and/or spatial-temporal motion vector prediction (STMVP) mode.

3.15. The method of any one of examples 3.1-3.14, wherein information including whether to update MV for BIO coded blocks and/or use the updated MV for motion prediction and/or how to use the updated MV for motion prediction is signaled from an encoder to a decoder.

3.16. The method of example 3.15, further comprising that the information is signaled in Video Parameter Set (VPS), Sequence Parameter Set (SPS), Picture Parameter Set (PPS), Slice header, coding tree units (CTUs) or CUs.

3.17. The method of example 3.1, further comprising updating motion information that includes updating motion vector and reference picture for each prediction direction at block level.

3.18. The method of example 3.1 or 3.17, wherein the updated motion information is stored for some sub-blocks and for the other remaining sub-blocks, the non-updated motion information is stored within one block.

3.19. The method of example 3.1 or 3.17, the updated motion vectors are only stored for inner sub-blocks that are not at PU/CU/CTU boundary.

3.20. The method of example 3.19, further comprising the updated motion vectors for inner sub-blocks are then used for motion prediction, deblocking, or OBMC.

3.21. The method of example 3.1 or 3.17, the updated motion vectors are only stored for boundary sub-blocks that are at PU/CU/CTU boundary.

3.22. The method of example 3.1 or 3.17, wherein updated motion information from a neighboring block is not used if the neighboring block and the current block are not in a same CTU or a same region with a size of 64×64 or 32×32.

3.23. The method of example 3.22, wherein the neighboring block is marked as unavailable if the neighboring block and the current block are not in the same CTU or the same region with a size of 64×64 or 32×32.

3.24. The method of example 3.22, wherein non-updated motion information is used by the current block if the neighboring block and the current block are not in the same CTU or the same region with a size of 64×64 or 32×32.

3.25. The method of example 3.17, wherein the updated motion vectors from a neighboring block are not used if the neighboring block and the current block are not in a same CTU row or a same row of regions with a size of 64×64 or 32×32.

3.26. The method of example 3.25, wherein the a neighboring block is marked as unavailable if the neighboring block and the current block are not in the same CTU row or the same row of regions with a size of 64×64 or 32×32.

3.27. The method of example 3.25, wherein non-updated motion information from the neighboring block is used by the current block if the neighboring block and the current block are not in the same CTU row or the same row of regions with a size of 64×64 or 32×32.

3.28. The method of example 3.17, wherein the motion information of a block is not updated if a bottom-most row of the block is a bottom-most row of a CTU or a region with a size of 64×64 or 32×32.

3.29. The method of example 3.17, wherein the motion information of a block is not updated if a right-most column of the block is a right-most column of a CTU or a region with a size of 64×64 or 32×32.

3.30. The method of example 3.1 or 3.17, further comprising predicting motion information of blocks/CUs within the current CTU based on the updated motion information or the non-updated motion information of neighboring CTUs or regions.

3.31. The method of example 3.30, wherein the updated motion information from left CTU or left region are used for the current CTU.

3.32. The method of example 3.30 or 3.31, wherein the updated motion information from top-left CTU or top-left region are used for the current CTU.

3.33. The method of any one of examples 3.30-3.32, wherein the updated motion information from top CTU or top region are used for the current CTU.

3.34. The method of any one of examples 3.30-3.33, wherein the updated motion information from top-right CTU or top-right region are used for the current CTU.

3.35. The method of any one of examples 3.30-3.34, wherein each of the one or more regions have a size of 64×64 or 32×32.

3.36. The method of anyone of examples 3.1-3.35, wherein the method is not applied in case that the current block meets a certain condition.

3.37. The method of example 3.36, wherein the certain condition specifies at least one of: a size of the current block, a slice type of the current block, a picture type of the current block and a tile type of the current block.

3.38. The method of example 3.36, wherein the certain condition specifies that a sample number that the current block contains is smaller than a first threshold.

3.39. The method of example 3.36, wherein the certain condition specifies that minimum size of a width and a height of the current block is smaller than or no larger than a second threshold.

3.40. The method of example 3.36, wherein the certain condition specifies that a width of the current block is smaller than or no larger than a third threshold, and/or a height of the current block is smaller than or no larger than a fourth threshold.

3.41. The method of example 3.36, wherein the certain condition specifies that a width of the current block is larger than or no smaller than a third threshold, and/or a height of the current block is larger than or no smaller than a fourth threshold.

3.42. The method of example 3.36, wherein the method is applied in a sub-block level, in case that a width and/or a height of a block, to which the sub-block belongs, is equal to or larger than a fifth threshold.

3.43. The method of example 3.42, wherein the current block is split into multiple sub-blocks and each of the multiple sub-blocks further undergoes a bidirectional optical flow (BIO) process, in a same way as a normal coding block with a size equal to the sub-block size.

3.44. The method of anyone of examples 3.38-3.42, wherein each of the first to fifth thresholds is pre-defined or signaled in sequence parameter set (SPS) level, or picture parameter set (PPS) level, or picture level, or slice level, or tile level.

3.45. The method of example 3.44, wherein each of the first to fifth thresholds is defined depending on coded information including at least one of a block size, a picture type, and a temporal layer index.

3.46. An apparatus in a video system comprising a processor and a non-transitory memory with instructions thereon, wherein the instructions upon execution by the processor, cause the processor to implement the method in any one of examples 3.1 to 3.45.

3.47. A computer program product stored on a non-transitory computer readable media, the computer program product including program code for carrying out the method in any one of examples 3.1 to 3.45.

4.1. A video processing method, comprising: determining a motion vector difference (MVD) precision for a current block processed with affine mode from an MVD precision set; performing, based on the determined MVD precision, a conversion between the current block and a bitstream representation of a video including the current block.

4.2. The method of example 4.1, wherein the MVD represents a difference between a predicted motion vector and an actual motion vector used during motion compensation processing.

4.3. The method of example 4.2, wherein the MVD precision set includes multiple different MVD precisions which construct a geometric sequence.

4.4. The method of example 4.3, wherein the MVD precision set includes ¼, 1 and 4 pixel MVD precisions.

4.5. The method of example 4.3, wherein the MVD precision set includes ¼, ½, 1, 2 and 4 pixel MVD precisions.

4.6. The method of example 4.3, wherein the MVD precision set includes 1/16, ⅛ and ¼ pixel MVD precisions.

4.7. The method of example 4.1, wherein the current block is a coding unit or a prediction unit.

4.8. The method of any one of examples 4.1-4.7, wherein determining the MVD precision further comprises: determining the MVD precision for the current block based on a syntax element indicating the MVD precision.

4.9. The method of example 4.8, wherein the syntax element is present when there is non-zero MVD component of the current block.

4.10. The method of example 4.8, wherein the syntax element is not present when there is no non-zero MVD component of the current block.

4.11. The method of example 4.8, wherein the syntax element is present regardless whether there is any non-zero MVD component of the current block.

4.12. The method of example 4.1, wherein the current block is processed with affine inter mode or affine advanced motion vector prediction (AMVP) mode.

4.13. The method of example 4.12, wherein different MVDs of the current block are associated with different MVD precisions.

4.14. The method of example 4.13, wherein the affine inter mode is a 4-parameter affine inter mode with 2 control points, and one MVD is used for each control point in each prediction direction.

4.15. The method of example 4.14, wherein the 2 control points are associated with different MVD precisions.

4.16. The method of example 4.13, wherein the affine inter mode is a 6-parameter affine inter mode with 3 control points, and one MVD is used for each control point in each prediction direction.

4.17. The method of example 4.16, wherein the 3 control points are associated with different MVD precisions.

4.18. The method of example 4.15, wherein two syntax elements are present to indicate the different MVD precisions for the 2 control points.

4.19. The method of example 4.17, wherein three syntax elements are present to indicate the different MVD precisions for the 3 control points.

4.20. The method of example 4.1, wherein the MVD precision set is determined based on coding information of the current block.

4.21. The method of example 4.20, wherein the coding information includes a quantization level of the current block.

4.22. The method of example 4.21, wherein a set of coarser MVD precision values is selected for a larger quantization level.

4.23. The method of example 4.21, wherein a set of finer MVD precision values is selected for a smaller quantization level.

4.24. The method of anyone of examples 4.1-4.23, wherein the method is not applied in case that the current block meets a certain condition.

4.25. The method of example 4.24, wherein the certain condition specifies at least one of: a size of the current block, a slice type of the current block, a picture type of the current block and a tile type of the current block.

4.26. The method of example 4.24, wherein the certain condition specifies that a sample number that the current block contains is smaller than a first threshold.

4.27. The method of example 4.24, wherein the certain condition specifies that minimum size of a width and a height of the current block is smaller than or no larger than a second threshold.

4.28. The method of example 4.24, wherein the certain condition specifies that a width of the current block is smaller than or no larger than a third threshold, and/or a height of the current block is smaller than or no larger than a fourth threshold.

4.29. The method of example 4.24, wherein the certain condition specifies that a width of the current block is larger than or no smaller than a third threshold, and/or a height of the current block is larger than or no smaller than a fourth threshold.

4.30. The method of example 4.24, wherein the method is applied in a sub-block level, in case that a width and/or a height of a block, to which the sub-block belongs, is equal to or larger than a fifth threshold.

4.31. The method of example 4.30, wherein the current block is split into multiple sub-blocks and each of the multiple sub-blocks further undergoes a bidirectional optical flow (BIO) process, in a same way as a normal coding block with a size equal to the sub-block size.

4.32. The method of anyone of examples 4.26-4.30, wherein each of the first to fifth thresholds is pre-defined or signaled in sequence parameter set (SPS) level, or picture parameter set (PPS) level, or picture level, or slice level, or tile level.

4.33. The method of example 4.32, wherein each of the first to fifth thresholds is defined depending on coded information including at least one of a block size, a picture type, and a temporal layer index.

4.34. An apparatus in a video system comprising a processor and a non-transitory memory with instructions thereon, wherein the instructions upon execution by the processor, cause the processor to implement the method in any one of examples 4.1 to 4.33.

4.35. A computer program product stored on a non-transitory computer readable media, the computer program product including program code for carrying out the method in any one of examples 4.1 to 4.33.

5.1. A video processing method, comprising: determining non-updated motion information associated with a current block; updating the non-updated motion information based on multiple decoder-side motion vector derivation (DMVD) methods to generate updated motion information for the current block; and performing, based on the updated motion information, a conversion between the current block and a bitstream representation of a video including the current block.

5.2. The method of example 5.1, wherein the multiple DMVD methods include at least two of the followings: bi-directional optical flow (BIO) refinement, decoder-side motion vector refinement (DMVR), frame-rate up conversion (FRUC) technique, and template matching technique.

5.3. The method of example 5.2, wherein the multiple DMVD methods are performed in a simultaneous way on the non-updated motion information for the current block, and a non-updated motion vector of the non-updated motion information is input as the searching start-point for each of the multiple DMVD methods.

5.4. The method of example 5.2, wherein the multiple DMVD methods are performed in a cascade way on the non-updated motion information for the current block, and an updated motion vector of the updated motion information generated by one DMVD method is input as the searching start-point of a next DMVD method.

5.5. The method of example 5.4, wherein the one DMVD method is DMVR and the next DMVD method is BIO, wherein DMVR is performed on the non-updated motion information for the current block to generate the updated motion information, and the updated motion vector of the updated motion information is input as the searching start-point of BIO.

5.6. The method of any one of examples 5.1 to 5.5, wherein updating the non-updated motion information based on multiple decoder-side motion vector derivation (DMVD) methods to generate updated motion information for the current block further includes: deriving multiple sets of updated motion information by the multiple DMVD methods, generating a final set of updated motion information from the multiple sets of motion information.

5.7. The method of example 5.6, wherein generating the final set of updated motion information from the multiple sets of motion information further includes: generating the final set of updated motion information based on an average or a weighted average of the multiple sets of motion information.

5.8. The method of example 5.6, wherein generating the final set of updated motion information from the multiple sets of motion information further includes: generating the final set of updated motion information by filtering the multiple sets of motion information using a median filter.

5.9. The method of example 5.6, wherein generating the final set of updated motion information from the multiple sets of motion information further includes: assigning different priorities to the multiple DMVD methods, selecting a set of updated motion information derived by the DMVD method with the highest priority as the final set of updated motion information.

5.10. The method of example 5.9, wherein the decoder-side motion vector refinement (DMVR) is assigned the highest priority.

5.11. The method of any one of examples 5.1 to 5.5, wherein performing, based on the updated motion information, a conversion between the current block and a bitstream representation of a video including the current block further includes: performing motion compensation using multiple sets of updated motion information derived by the multiple DMVD method, respectively, to obtain multiple sets of motion compensation results, generating the current block based on an average or a weighted average of the multiple sets of motion compensation results.

5.12. The method of any one of examples 5.1 to 5.5, wherein performing, based on the updated motion information, a conversion between the current block and a bitstream representation of a video including the current block further includes: performing motion compensation using multiple sets of updated motion information derived by the multiple DMVD method, respectively, to obtain multiple sets of motion compensation results, generating the current block by filtering the multiple sets of motion compensation results using a median filter.

5.13. The method of any one of examples 5.1 to 5.5, wherein updating the non-updated motion information based on multiple decoder-side motion vector derivation (DMVD) methods to generate updated motion information for the current block further includes:
assigning different priorities to the multiple DMVD methods, selecting DMVD methods with the highest N priorities and being valid from the multiple DMVD methods, N being an integer and N>=1, generating, for the current block, updated motion information based on the N DMVD methods.

5.14. The method of any one of examples 5.1 to 5.13, wherein the current block is a prediction unit.

5.15. The method of any one of examples 5.1 to 5.14, wherein the non-updated motion information includes non-updated motion vector and reference picture for each prediction direction.

5.16. The method of anyone of examples 5.1-5.15, wherein the method is not applied in case that the current block meets a certain condition.

5.17. The method of example 5.16, wherein the certain condition specifies at least one of: a size of the current block, a slice type of the current block, a picture type of the current block and a tile type of the current block.

5.18. The method of example 5.16, wherein the certain condition specifies that a sample number that the current block contains is smaller than a first threshold.

5.19. The method of example 5.16, wherein the certain condition specifies that minimum size of a width and a height of the current block is smaller than or no larger than a second threshold.

5.20. The method of example 5.16, wherein the certain condition specifies that a width of the current block is smaller than or no larger than a third threshold, and/or a height of the current block is smaller than or no larger than a fourth threshold.

5.21. The method of example 5.16, wherein the certain condition specifies that a width of the current block is larger than or no smaller than a third threshold, and/or a height of the current block is larger than or no smaller than a fourth threshold.

5.22. The method of example 5.16, wherein the method is applied in a sub-block level, in case that a width and/or a height of a block, to which the sub-block belongs, is equal to or larger than a fifth threshold.

5.23. The method of example 5.22, wherein the current block is split into multiple sub-blocks and each of the multiple sub-blocks further undergoes a bidirectional optical flow (BIO) process, in a same way as a normal coding block with a size equal to the sub-block size.

5.24. The method of anyone of examples 5.18-5.22, wherein each of the first to fifth thresholds is pre-defined or signaled in sequence parameter set (SPS) level, or picture parameter set (PPS) level, or picture level, or slice level, or tile level.

5.25. The method of example 5.24, wherein each of the first to fifth thresholds is defined depending on coded information including at least one of a block size, a picture type, and a temporal layer index.

5.26. An apparatus in a video system comprising a processor and a non-transitory memory with instructions thereon, wherein the instructions upon execution by the processor, cause the processor to implement the method in any one of examples 5.1 to 5.25.

5.27. A computer program product stored on a non-transitory computer readable media, the computer program product including program code for carrying out the method in any one of examples 5.1 to 5.25.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:
1. A video processing method, comprising:
  determining original motion information for a current block;
  updating original motion vectors of the original motion information based on a decoder-side motion vector refinement (DMVR) method;
  clipping the updated motion vectors to be within a first range; and
  performing a conversion between the current block and a bitstream representation of a video including the current block, based on the clipped updated motion vectors,
  wherein the performing a conversion comprises: decoding the current block from the bitstream representation or encoding the current block into the bitstream representation, wherein the updating original motion vectors and the clipping the updated motion vectors are performed for each sub-block of the current block, and wherein in case that a width and/or a height of the video block, to which the sub-block belongs, is larger than a fourth threshold, the current block is split into multiple sub-blocks.

2. The method of claim 1, wherein the first range is same as an allowed range of the original motion vectors.

3. The method of claim 1, wherein the performing a conversion comprises:
determining reference samples based on the updated motion vectors; and
adjusting the reference samples based on a motion vector field ($v_x$, $v_y$) derived during a bi-directional optical flow refinement;
wherein in the bi-directional optical flow refinement, at least one of $v_x$ and $v_y$ in the motion vector field is clipped to a second range.

4. The method of claim 3, wherein at least one of $v_x$ and $v_y$ is constrained to the second range as:

$$-M_x < v_x < N_x, \text{ and/or } -M_y < v_y < N_y,$$

wherein $M_x$, $N_x$, $M_y$, $N_y$ are none-negative integers.

5. The method of claim 3, wherein the motion vector field ($v_x$, $v_y$) is determined based on at least one gradient value corresponding to the reference sample.

6. The method of claim 1, wherein the method is not applied in case that the current block meets a certain condition, wherein the certain condition specifies at least one of: a size of the current block, a slice type of the current block, a picture type of the current block and a tile type of the current block.

7. The method of claim 6, wherein the certain condition specifies at least one of:
a sample number that the current block contains is smaller than a first threshold,
a width of the current block is smaller than or no larger than a second threshold, or
a height of the current block is smaller than or no larger than a third threshold.

8. The method of claim 1, wherein each of the multiple sub-blocks undergoes decoder-side motion vector refinement or/and bi-directional optical flow in the same way as a normal video block with size equal to the sub-block size.

9. The method of claim 7, wherein at least one of the first threshold, the second threshold, or the third threshold is pre-defined.

10. The method of claim 1, wherein the determining original motion information comprises:
constructing a candidate list for the current block; and
determining the original motion information from the candidate list.

11. The method of claim 1, wherein the performing a conversion comprises:
decoding the current block from the bitstream representation.

12. The method of claim 1, wherein the performing a conversion comprises:
encoding the current block into the bitstream representation.

13. An apparatus for processing video data comprising a processor and a non-transitory memory with instructions thereon, wherein the instructions upon execution by the processor, cause the processor to:
determine original motion information for a current block;
update original motion vectors of the original motion information based on a decoder-side motion vector refinement (DMVR) method;
clip the updated motion vectors to be within a first range; and
perform a conversion between the current block and a bitstream representation of a video including the current block, based on the clipped updated motion vectors,
wherein the performing a conversion comprises: decoding the current block from the bitstream representation or encoding the current block into the bitstream representation,
wherein the updating original motion vectors and the clipping the updated motion vectors are performed for each sub-block of the current block, and
wherein in case that a width and/or a height of the video block, to which the sub-block belongs, is larger than a fourth threshold, the current block is split into multiple sub-blocks.

14. The apparatus of claim 13, wherein the first range is same as an allowed range of the original motion vectors.

15. The apparatus of claim 13, wherein the instructions upon execution by the processor further cause the processor to:
decode the current block from the bitstream representation.

16. The apparatus of claim 13, wherein the instructions upon execution by the processor further cause the processor to:
encode the current block into the bitstream representation.

17. A non-transitory computer-readable storage medium storing instructions that cause a processor to:
determine original motion information for a current block;
update original motion vectors of the original motion information based on a decoder-side motion vector refinement (DMVR) method;
clip the updated motion vectors to be within a first range; and
perform a conversion between the current block and a bitstream representation of a video including the current block, based on the clipped updated motion vectors,
wherein the performing a conversion comprises: decoding the current block from the bitstream representation or encoding the current block into the bitstream representation,
wherein the updating original motion vectors and the clipping the updated motion vectors are performed for each sub-block of the current block, and
wherein in case that a width and/or a height of the video block, to which the sub-block belongs, is larger than a fourth threshold, the current block is split into multiple sub-blocks.

18. A non-transitory computer-readable recording medium storing a bitstream representation which is generated by a method performed by a video processing apparatus, wherein the method comprises:
determining original motion information for a current block;
updating original motion vectors of the original motion information based on a decoder-side motion vector refinement (DMVR) method;
clipping the updated motion vectors to be within a first range; and encoding the current block into the bitstream representation of a video including the current block, based on the clipped updated motion vectors, wherein the performing a conversion comprises: decoding the current block from the bitstream representation or encoding the current block into the bitstream representation, wherein the updating original motion vectors and the clipping the updated motion vectors are performed for each sub-block of the current block, and wherein in case that a width and/or a height of the video block, to which the sub-block belongs, is larger than a fourth threshold, the current block is split into multiple sub-blocks.

* * * * *